United States Patent
Nakahara

(10) Patent No.: US 8,276,116 B2
(45) Date of Patent: Sep. 25, 2012

(54) ALGEBRA OPERATION METHOD, APPARATUS, AND STORAGE MEDIUM THEREOF

(75) Inventor: Yasuhiro Nakahara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 1447 days.

(21) Appl. No.: 11/759,643

(22) Filed: Jun. 7, 2007

(65) Prior Publication Data
US 2007/0299892 A1    Dec. 27, 2007

(30) Foreign Application Priority Data
Jun. 9, 2006    (JP) ................................ 2006-161031

(51) Int. Cl.
*G06F 9/44* (2006.01)
(52) U.S. Cl. .......... 717/110; 717/139; 717/114; 712/11; 712/16; 712/221
(58) Field of Classification Search .................. None
See application file for complete search history.

(56) References Cited

U.S. PATENT DOCUMENTS

| | | | | |
|---|---|---|---|---|
| 4,396,974 A | * | 8/1983 | Imazeki et al. ................. 700/9 |
| 4,885,714 A | * | 12/1989 | Eisenstein et al. ............. 708/131 |
| 5,263,126 A | * | 11/1993 | Chang ............................ 706/46 |
| 5,448,727 A | * | 9/1995 | Annevelink ...................... 1/1 |
| 5,499,371 A | * | 3/1996 | Henninger et al. ............ 717/108 |
| 5,598,545 A | * | 1/1997 | Childers et al. ................ 712/221 |
| 5,606,699 A | * | 2/1997 | De Pauw et al. .............. 719/315 |
| 5,615,362 A | * | 3/1997 | Jensen et al. .................... 1/1 |
| 5,696,954 A | * | 12/1997 | Guttag et al. .................. 712/221 |
| 5,787,283 A | * | 7/1998 | Chin et al. ...................... 717/101 |
| 6,011,919 A | * | 1/2000 | Politis et al. ................... 717/114 |
| 6,105,035 A | * | 8/2000 | Monge et al. .................... 1/1 |
| 6,839,726 B2 | | 1/2005 | Kawamoto |
| 7,810,080 B2 | * | 10/2010 | Plum et al. ..................... 717/140 |
| 8,010,943 B2 | * | 8/2011 | Rouson .......................... 717/114 |
| 8,079,023 B2 | * | 12/2011 | Chen .............................. 717/140 |
| 2002/0100014 A1 | * | 7/2002 | Iborra et al. ................... 717/104 |
| 2004/0260706 A1 | * | 12/2004 | Anonsen et al. ............... 707/100 |
| 2006/0259744 A1 | * | 11/2006 | Matthes .......................... 712/220 |
| 2007/0174812 A1 | * | 7/2007 | Yang ............................. 717/114 |
| 2008/0209391 A1 | * | 8/2008 | Iborra et al. ................... 717/105 |
| 2008/0244025 A1 | * | 10/2008 | Ginis et al. .................... 709/206 |

FOREIGN PATENT DOCUMENTS

JP    2003-186737 A    7/2003

OTHER PUBLICATIONS

Title: Flag-algebra: a new concept for the realisation of fully parallel associative architectures, author: Tavangarian, D. dated: Sep. 1989, source: IEEE.*

Title: Association algebra: a mathematical foundation for object-oriented databases, author: Su, S.Y.W et al, dated: 1993, source: IEEE.*

* cited by examiner

*Primary Examiner* — Chameli Das
(74) *Attorney, Agent, or Firm* — Fitzpatrick, Cella, Harper & Scinto

(57) ABSTRACT

An algebra operation method includes the steps of converting algebra operations for a plurality of objects which appear in a program into an algebra operation sequence object described using object access data used to access the plurality of objects and object state data used to store states associated with the plurality of objects without immediately evaluating the algebra operations, determining a function to be applied to the algebra operation sequence object, and evaluating the algebra operations by executing the function by designating an argument group required for the function in response to a call of a substitute operator.

12 Claims, 82 Drawing Sheets

FIG. 1

EXAMPLE OF PROGRAM DESCRIBED IN C

```
double A[1000] [1000] ;
double B[1000] [1000] ;
double C[1000] [1000] ;
double V[1000] ;
double W[1000] ;
double m, n ;
. . .
for (int i = 0 ; i < 1000 ;++i) {
    for (int j = 0 ; j < 1000 ;++j) {
        c [i] [j] *= n ;
        for (int k = 0 ; k < 1000 ;++k) {
            c [i] [j] += m * A [i] [k] * B [k] [j] ;
        }
    }
} for (int i = 0 ; i < 1000 ;++i) {
    V [i] *= n ;
    for (int k = 0 ; k < 1000 ;++k) {
        V [i] += m * A [i] [k] * W [k] ;
    }
}
```

FIG. 2

EXAMPLE OF PROGRAM DESCRIBED IN C++

```
Matrix A(1000, 1000) ;
Matrix B(1000, 1000) ;
Matrix C(1000, 1000) ;
Vector V(1000) ;
Vector W(1000) ;
Complex m, n ;
 . . .
    C=m*A*B*+n*C
 . . .
    V=m*A*W*+n*W
```

FIG. 3

| STEP 1 | T←m*A | : COPY CONSTRUCTOR GENERATES TEMPORAL OBJECT T (=A) TO STORE m*A |
|---|---|---|
| STEP 2 | U←T*B | : CONSTRUCTOR GENERATES TEMPORAL OBJECT U (=T) TO STORE T*B |
| STEP 3 | V←n*C | : COPY CONSTRUCTOR GENERATES TEMPORAL OBJECT V (=C) TO STORE n*C |
| STEP 4 | W←U+V | : COPY CONSTRUCTOR GENERATES TEMPORAL OBJECT W (=U) TO STORE U+V |
| STEP 5 | C←W | : SUBSTITUTE OPERATOR (=) STORES W IN C |
| STEP 6 | DESTRUCT T, U, V, AND W | |

FIG. 5

$$G = (m * A.\text{Trans}() * B + n * C).\text{Trans}() * p * E + p * F$$

| VALUE | MEANING |
| --- | --- |
| RelationNormal | THIS OBJECT INCLUDES NEITHER MULTIPLYING OBJECT NOR ADDING OBJECT. FURTHERMORE, THIS OBJECT IS NEITHER MULTIPLYING OBJECT NOR ADDING OBJECT OF ANOTHER OBJECT |
| Multiplying | THIS OBJECT INCLUDES MULTIPLYING OBJECT AND NO ADDING OBJECT |
| Adding | THIS OBJECT INCLUDES NO MULTIPLYING OBJECT AND ADDING OBJECT |
| MultiplyingAndAdding | THIS OBJECT INCLUDES MULTIPLYING OBJECT AND ADDING OBJECT |
| MultipliedOrAdded | THIS OBJECT IS MULTIPLYING OBJECT OR ADDING OBJECT OF ANOTHER OBJECT |

FIG. 9A

| VALUE | BIT VALUE | MEANING |
|---|---|---|
| Transpose | 0 | THIS OBJECT IS NOT HERMITIAN CONJUGATE |
| Transpose | 1 | THIS OBJECT IS HERMITIAN CONJUGATE |
| MulReverse | 0 | THIS OBJECT ACTS FROM LEFT TO RIGHT TO MULTIPLYING OBJECT |
| MulReverse | 1 | THIS OBJECT ACTS FROM RIGHT TO LEFT TO MULTIPLYING OBJECT |

FIG. 9B

| VALUE | BIT VALUE | MEANING |
|---|---|---|
| TemporalOwner | 0 | THIS OBJECT IS NOT OBJECT THAT TEMPORARILY POSSESSES ARRAY ELEMENT MEMORY AREA |
| TemporalOwner | 1 | THIS OBJECT IS OBJECT THAT TEMPORARILY POSSESSES ARRAY ELEMENT MEMORY AREA |
| UnEvaluated | 0 | THIS OBJECT IS OBJECT WHOSE OPERATION IS COMPLETE |
| UnEvaluated | 1 | THIS OBJECT IS OBJECT WHOSE OPERATION IS NOT COMPLETE YET |

FIG. 11

| FUNCTION NAME | ACTION |
|---|---|
| zcopy | THIS FUNCTION NAME ALLOWS TO COPY CONTENTS OF A TO B FOR ARRAYS A AND B OF TWO COMPLEX NUMBERS |
| zscal | THIS FUNCTION NAME ALLOWS TO CONVERT CONTENTS OF A TO m∗A FOR ONE COMPLEX NUMBER m AND ONE COMPLEX NUMBER ARRAY A |
| zaxpy | THIS FUNCTION NAME ALLOWS TO CONVERT CONTENTS OF A TO m∗B+A FOR ONE COMPLEX NUMBER m AND TWO COMPLEX NUMBER ARRAYS A AND B |
| zgemm | THIS FUNCTION NAME ALLOWS TO CONVERT CONTENTS OF A TO m∗op(B)∗op(C)+n∗A FOR TWO COMPLEX NUMBERS m AND n AND THREE COMPLEX NUMBER Matrices A, B, AND C. NOTE THAT AS FOR Matrix A, op(A) MEANS op(A)=A OR op(A)=$A^H$, AND SUPERSCRIPT "H" MEANS HERMITIAN CONJUGATE |
| zgerc | THIS FUNCTION NAME ALLOWS TO CONVERT CONTENTS OF A TO m∗X∗$Y^H$+A FOR ONE COMPLEX NUMBER m, TWO Vectors X AND Y, AND ONE Matrix A |
| zgemv | THIS FUNCTION NAME ALLOWS TO CONVERT CONTENTS OF X INTO m∗op(A)∗Y+n∗X FOR TWO COMPLEX NUMBERS m AND n, TWO Vectors X AND Y, AND ONE Matrix A |
| dznrm2 | THIS FUNCTION NAME ALLOWS TO CALCULATE L2 NORM OF ARRAY |
| zdotu_sub | THIS FUNCTION NAME ALLOWS TO CALCULATE COMPLEX NUMBER VALUE ($X^T$∗Y) OF TWO Vectors X AND Y |
| zdotc_sub | THIS FUNCTION NAME ALLOWS TO CALCULATE COMPLEX NUMBER VALUE ($X^H$∗Y) OF TWO Vectors X AND Y |

FIG. 12

+ Array() <<constructor>>
+ Array(const int in_NumElm) <<constructor>>
+ Array(const Array& argArray) <<constructor>>
+ ~Array() <<destructor>>

+ initializeArray()
+ getMemory()
+ freeMemory()
+ copyElement(const Array& argArray)
+ copyArray(const Array& argArray)
+ resetArray()

+ divideFactor(const Complex &argComplex)
+ multiplyFactor(const Complex &argComplex)

+ getEvaluationType()
+ makeRelationMultiply(Array& AssociatedArray)
+ makeRelationAdd(Array& AssociatedArray)
+ makeRelationSubtract(Array& AssociatedArray)
+ makeTransposeThis()

+ setMultiplyingObj(Array &argArray)
+ setAddingObj(Array &argArray)
+ setOwner(Array &argArray)

+ resetMultiplyingObj()
+ resetAddingObj()
+ resetMultiplyingAndAddingObj()
+ resetOwner()
+ isOwner()

FIG. 13

+ Matrix() <<constructor>>
+ Matrix(const int in_NxMax, const int in_NyMax) <<constructor>>
+ Matrix(const Matrix& argMatrix) <<constructor>>
+ −Matrix() <<destructor>>
+ operator=(const Matrix& argMatrix)
+ operator+(LeftMatrix : const Matrix&, RightMatrix : const Matrix&) : Matrix <<friend>>
+ operator−(LeftMatrix : const Matrix&, RightMatrix : const Matrix&) : Matrix <<friend>>
+ operator * (LeftMatrix : const Matrix&, RightMatrix : const Matrix&) : Matrix <<friend>>
+ operator * (argComplex : const Complex&, argMatrix : const Matrix&) : Matrix <<friend>>
+ operator * (argMatrix : const Matrix&, argComplex : const Complex&) : Matrix <<friend>>
+ operator / (argMatrix : const Matrix&, argComplex : const Complex&) : Matrix <<friend>>
+ operator−() : Matrix
+ operator+() : Matrix
+ Trans() : Matrix
+ NormL2() : Complex
+ evaluate()
+ evaluate(argMatrix : Matrix&)

FIG. 14

+ Vector() <<constructor>>
+ Vector(const int in_NxMax) <<constructor>>
+ Vector(const Vector& argVector) <<constructor>>
+ −Vector() <<destructor>>
+ operator=(argVector : const Vector&)
+ operator+(LeftVector : const Vector&, RightVector : const Vector&) : Vector <<friend>>
+ operator−(LeftVector : const Vector&, RightVector : const Vector&) : Vector <<friend>>
+ operator * (LeftMatrix : const Matrix&, RightVector : const Vector&) : Vector <<friend>>
+ operator * (argComplex : const Complex&, argVector : const Vector&) : Vector <<friend>>
+ operator * (argVector : const Vector&, argComplex : const Complex&) : Vector <<friend>>
+ operator / (argVector : const Vector&, argComplex : const Complex&) : Vector <<friend>>
+ operator+() : Vector
+ operator−() : Vector
+ Trans() : Vector
+ NormL2() : double
+ Dot(LeftVector : const Vector&, RightVector : const Vector&) : Complex
+ evaluate()
+ evaluate(argVector : Vector&)

F I G. 51
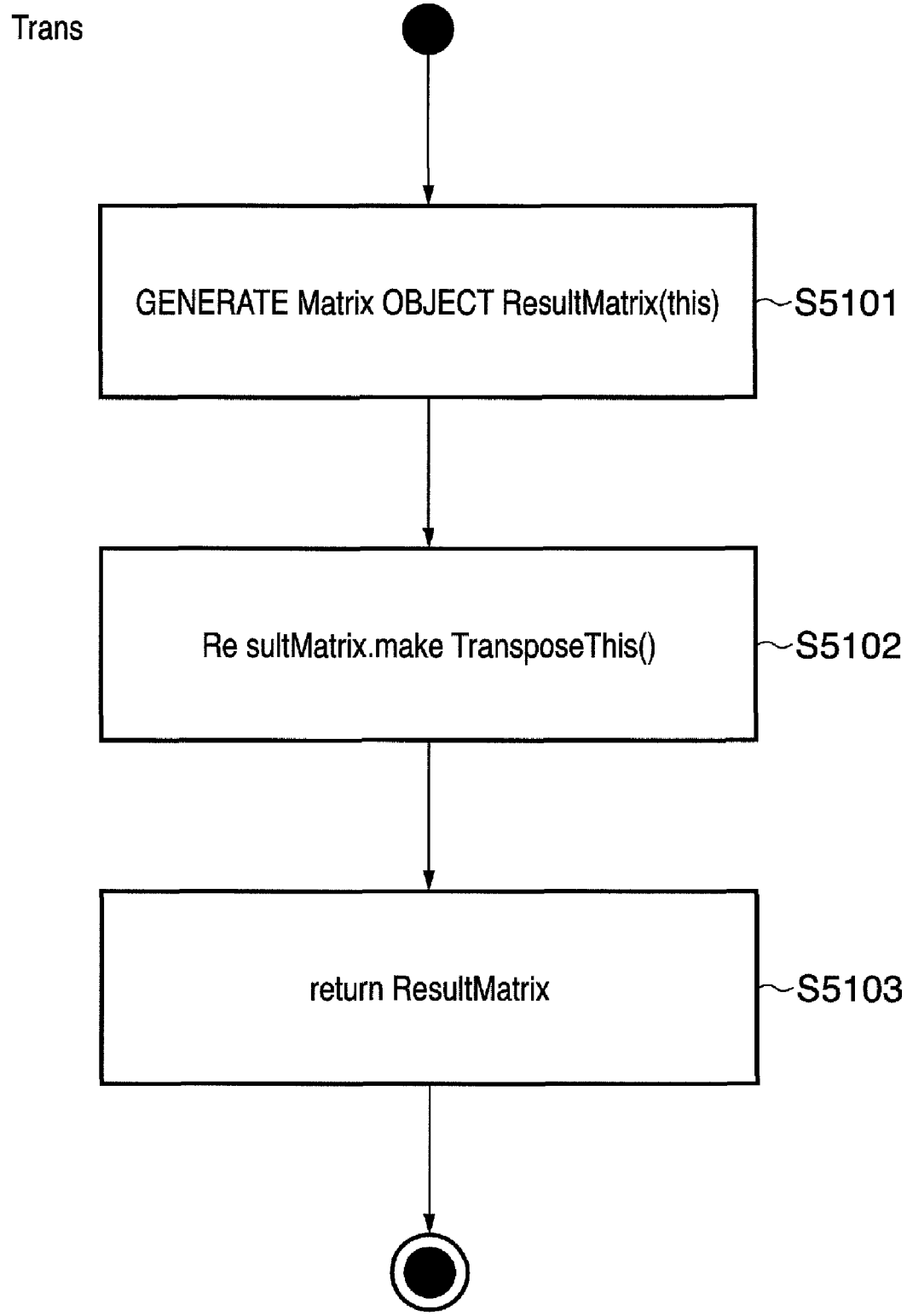

F I G. 57
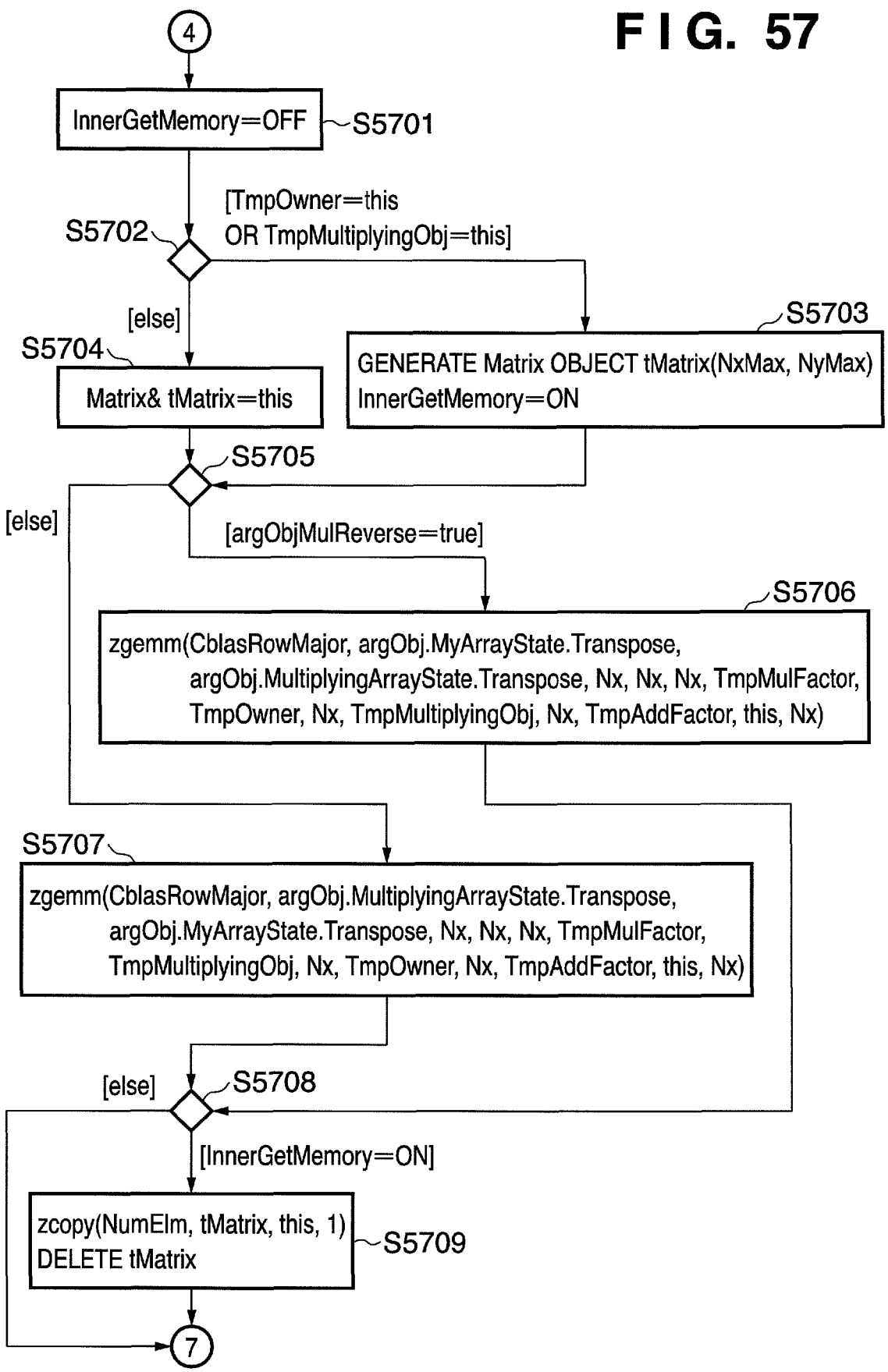

F I G. 68
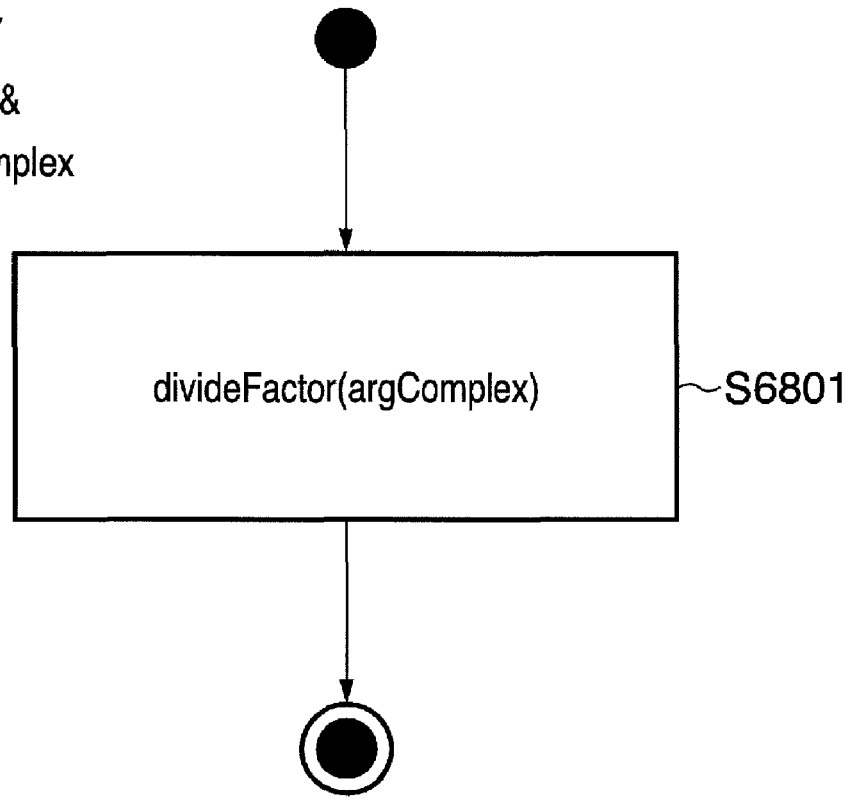

ALGEBRA OPERATION METHOD, APPARATUS, AND STORAGE MEDIUM THEREOF

BACKGROUND OF THE INVENTION

1. Field of the Invention

This application claims the benefit of Japanese Patent Application No. 2006-161031 filed on Jun. 9, 2006, which is hereby incorporated by reference in its entirety.

The present invention relates to an algebra operation method and apparatus thereof, which can be used in an object-oriented programming language having an operator overloading function.

2. Description of the Related Art

Conventionally, in order to efficiently develop linear algebra operation programs, linear algebra programs and libraries which overload a Matrix class, Vector class, and binary operators having them as operands using an object-oriented programming language such as C++ or the like are used.

According to the object-oriented programming language, a program written in C, as shown in FIG. 1, can be described, as shown in FIG. 2, when operator overloading by C++ is used. For example, please refer to Bjarne Stroustrup: The C++ Programming Language, Addison-Wesley, 2000.

By overloading operators, operations between Matrices and conversions of Vectors by means of Matrices can be simply described without describing any loop processing about suffices.

The object-oriented programming has a merit that allows the user to intuitively recognize correspondence with mathematical expressions in the linear algebra, and to reduce cost required for creating and testing programs.

On the other hand, programming using a non-object-oriented programming language such as C or Fortran normally uses the linear algebra library BLAS for large-scale, high-speed linear algebra programming. For example, please refer to the world-wide-web URL:netlib.org/blas/.

However, since Matrix and Vector operations using overloading of C++ are normally of a scheme that completes a calculation for each binary operation, an overhead readily becomes large. For example, upon calculating C=m*A*B+n*C, processes from step 1 to step 6 are made, as shown in FIG. 3.

For this reason, operations using overloading of C++ have poor memory use efficiency since a memory area for an array is assured every binary operation. Also, in consideration of even an object which is automatically generated by a compiler and is used to store an object returned from an operator, the number of objects which are generated temporarily becomes still larger.

Also, the number of loop processes in the aforementioned programming is apparently larger than the minimum required number of loop processes (FIG. 4). Since data once loaded from a memory may be loaded a number of times, this may cause an increase in calculation time.

Bjarne Stroustrup: The C++ Programming Language, Addison-Wesley, 2000 describes such problem. As a solution to that problem, this reference proposes that for an operation W=M*V+X (W, V, X: Vector, M: Matrix), an object of a new class having a reference to two objects as a member variable (attribute) is generated to be set as a return value of an operation M*V.

However, this method cannot cope with, for example, general operations such as C=m*A*B+n*C and C=m*A*B+n*C. Note that A is the Hermitian conjugate of Matrix A. A problem that a memory area of temporary objects increases when a mathematical expression becomes long like C=m*A*B+n*C*(m*A*B+n*C) remains unsolved. In this manner, the prior art cannot always sufficiently cope with all types of operations in the linear algebra.

On the other hand, the above BLAS normally comes on the market after it is tuned to be suited to the computer architectures. However, the BLAS is not provided to have an interface suited to the object-oriented programming language such as C++ or the like.

The BLAS can implement an operation like equation (1) below by calling only one function. However, it is difficult for the method based on object-oriented programming that completes a calculation every binary operation to calculate that equation by only one function call like in the BLAS.

$$C = \alpha AB + \beta C \qquad (1)$$

where A, B, and C are Matrices, and $\alpha$ and $\beta$ are complex numbers.

For this reason, a high-speed linear algebra operation program equivalent to the BLAS cannot be described using operator overloading by the object-oriented programming language such as C++ or the like.

SUMMARY OF THE INVENTION

The present invention provides a technique that can achieve the performance (high-speed performance) equivalent to a non-object-oriented linear algebra operation program using the BLAS or the like even by a linear algebra operation program based on the object-oriented programming language using operators.

An algebra operation method according to an aspect of the present invention includes the steps of converting algebra operations for a plurality of objects which appear in a program into an algebra operation sequence object described using object access data used to access the plurality of objects and object state data used to store states associated with the plurality of objects without immediately evaluating the algebra operations, determining a function to be applied to the algebra operation sequence object, and evaluating the algebra operations by executing the function by designating an argument group required for the function in response to a call of a substitute operator.

An algebra operation apparatus according to another aspect of the present invention includes a storage unit configured to store object access data required to access a plurality of objects, and object state data required to store states associated with the plurality of objects, an algebra operation conversion unit configured to convert algebra operations for the plurality of objects which appear in a program into an algebra operation sequence object described using the object access data and the object state data without immediately evaluating the algebra operations, a function determination unit configured to determine a function to be applied to the algebra operation sequence object, and an evaluation unit configured to evaluate the algebra operations by executing the function by designating an argument group required for the function in response to a call of a substitute operator.

A storage medium according to still another aspect of the present invention computer-readably storing a program for implementing an algebra operation method, said program making a computer execute the steps of converting algebra operations for a plurality of objects which appear in a program into an algebra operation sequence object described using object access data used to access the plurality of objects and object state data used to store states associated with the plurality of objects without immediately evaluating the algebra operations, determining a function to be applied to the algebra operation sequence object, and evaluating the algebra operations by executing the function by designating an argument group required for the function in response to a call of a substitute operator.

Further features of the present invention will become apparent from the following description of exemplary embodiments with reference to the attached drawings.

BRIEF DESCRIPTION OF THE DRAWINGS

FIG. 1 shows an example of a program described in C.

FIG. 2 shows an example of a program described in C++.

FIG. 3 shows generation of temporary objects in the prior art.

FIG. 5 shows the actual execution timings of linear algebra operations in a long mathematical expression.

FIG. 8 is a table showing values that a member variable RelationState, which indicates the state of an Array class object, can assume.

FIGS. 9A and 9B are tables showing element names and meanings of variables as sets of bits which represent the state of an Array class object.

FIG. 11 is a table showing function names of the BLAS library used in the embodiment.

FIG. 12 shows a list of methods of Array class.

FIG. 13 shows a list of methods of Matrix class.

FIG. 14 shows a list of methods of Vector class.

FIG. 51 shows processing to be executed by a method Trans of Matrix class.

FIG. 57 shows processing to be executed by the method evaluate of Matrix class having a reference to a Matrix object as an argument.

FIG. 68 shows processing to be executed by a / operator used to calculate "Vector object/Complex object".

DESCRIPTION OF THE EMBODIMENTS

Embodiments of the present invention will be described hereinafter with reference to the accompanying drawings.

This embodiment has the following characteristic features. (1) Delay evaluation programming is adopted to delay actual calculation timings. (2) An operation between objects is allowed to be completed by making an association between the objects. (3) Upon making an operation, whether or not an array element is to be updated is determined by checking the state of an object as an argument of an operand. (4) An array memory area of an object which becomes unnecessary after it is used in an operation process is immediately released.

The present embodiment can implement programming using operator overloading with a sufficiently negligible overhead compared to direct use of a high-speed operation library such as BLAS or the like for the non-object-oriented programming language in large-scale linear algebra operations. For example, C++ compatible BLAS with a sufficiently negligible overhead, which is described in C++ such as operator overloading and the like is implemented.

For example, a temporary array memory area generated during a calculation process in the following operations is not required (for V, W: Vector, A, B, C: Matrix, m, n: Complex). This is equivalent to a case in which calculations are made by directly using BLAS.

$$V=m*A*W+n*V \tag{a}$$

$$C=m*A*B+n*C \tag{b}$$

Also, an increase in overhead such as memory copy to a temporary memory area or the like and an increase in required memory size upon repeating an operation between two terms can be suppressed.

With the method of this embodiment, calculations of Matrix elements and Vector components are postponed. However, the calculation is made in practice at timings when an object can no longer be expressed in the form of the right side of equation (1), when an = operator (substitute operator) is launched, and when a method (Dot, NormL2, etc.) that immediately requires a result is executed.

Figure 5:
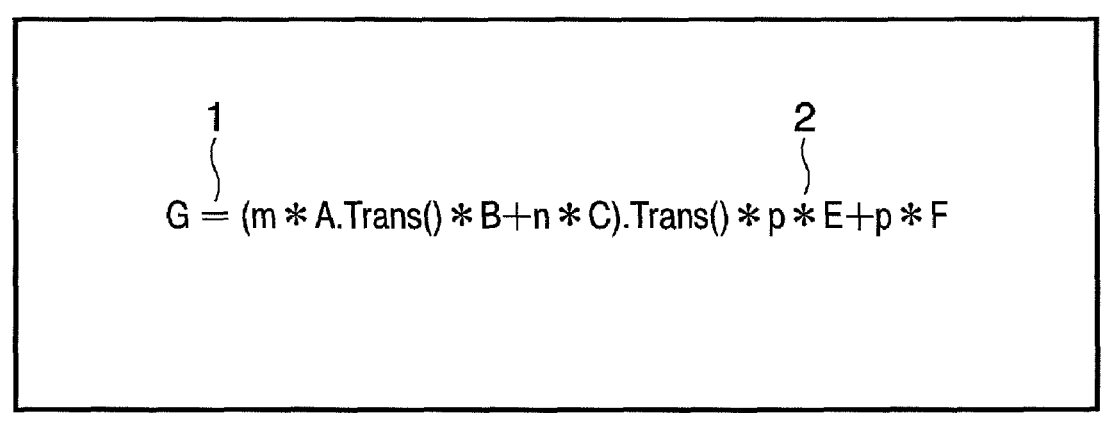

For example, in case of equation (2) below, postponed operations are calculated in practice at operation positions 1 and 2 shown in FIG. 5. Note that upper-case alphabets are Matrix objects, and lower-case alphabets are Complex objects. Also, Trans( ) is a method of converting into a Hermitian conjugate.

$$G=(m*A.\text{Trans}(\,)*B+n*C).\text{Trans}(\,)*p*E+p*F \tag{2}$$

Figure 4:
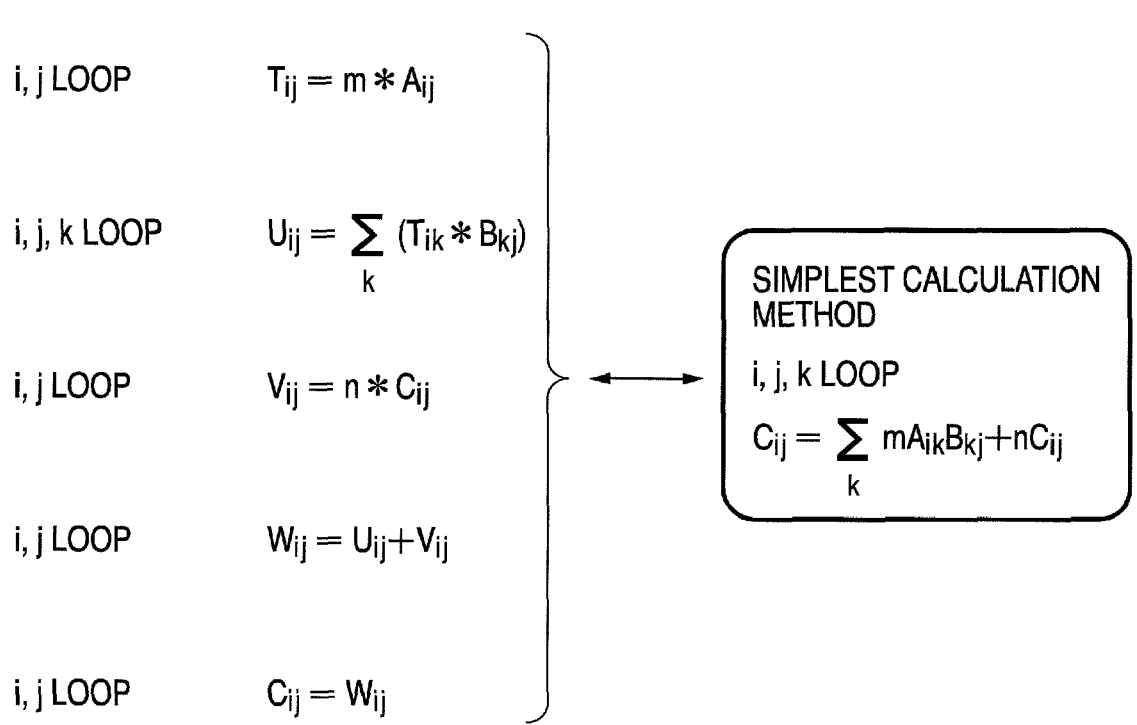
FIG. 4 compares an operation method of the prior art and the simplest operation method.
Figure 6:
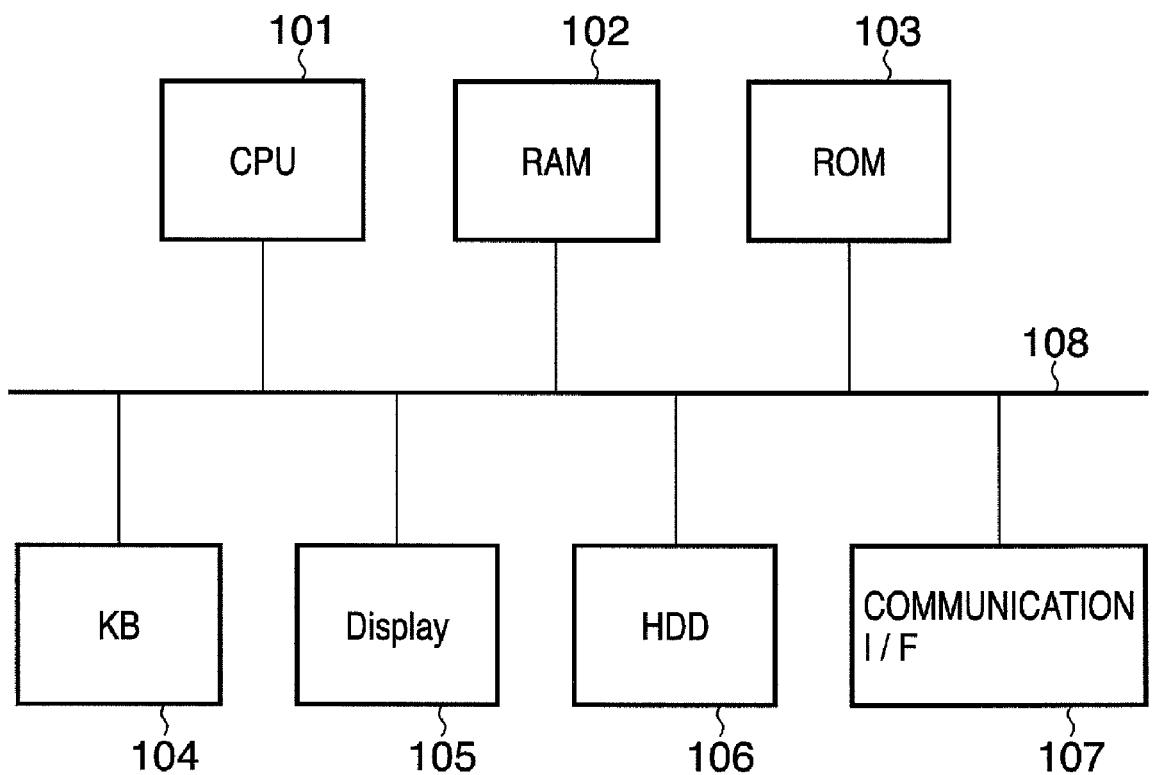
FIG. 6 is a block diagram showing the hardware arrangement of an operation apparatus according to one embodiment.

FIG. 6 is a block diagram showing the hardware arrangement of an operation apparatus according to the present embodiment.

Referring to FIG. 6, a CPU 101 executes various programs including processing sequences to be described with reference to flowcharts, and controls respective units of the apparatus connected via a system bus 108. A RAM 102 temporarily stores data and programs. A ROM 103 stores permanent data and programs. A keyboard (KB) 104 includes keys used to input characters and to select functions. Furthermore, a mouse is equipped as a pointing device used to instruct the position on a screen.

A display 105 displays numerical values and graphs of calculation results and provides a user interface (UI). A hard disk drive (HDD) 106 is a storage device which permanently stores programs and data. Furthermore, storage devices using recording media such as a DVD, CD, FD, and the like may be connected. A communication I/F 107 is an interface used to communicate with a device outside the apparatus via a LAN, Internet, or the like. The system bus 108 is used as a medium that connects the above units of the apparatus and exchanges data, addresses, and control signals among the units.

Various programs including the processing sequences to be described with reference to the flowcharts may be stored in the ROM 103 or may be loaded from the HDD 106 to the RAM 102 prior to processing or during execution of processing as needed.

Data required for calculations can be obtained by inputting them from the keyboard 104, reading them out from the storage device such as the HDD 106 or the like, externally receiving them via the communication I/F 107, and so forth.

The present embodiment allows to use the library "BLAS" not suitable for object-oriented programming even in object-oriented programming using operator overloading.

Linear algebra operations of the present embodiment are related to complex Matrices and complex Vectors. A Matrix has the same numbers of rows and columns. A class (Complex) that implements operations of complex numbers will not be described. As for this class, a Complex class or equivalent of an STL (Standard Template Library) is prepared in advance.

The drawings follow the description method of the UNL (Unified Modeling Language). Especially, Class diagrams, State machine diagrams, and Activity diagrams are used. In the Activity diagrams, a description close to the source codes of C++ is used to allow easy understanding of correspondence with programs.

Figure 7:
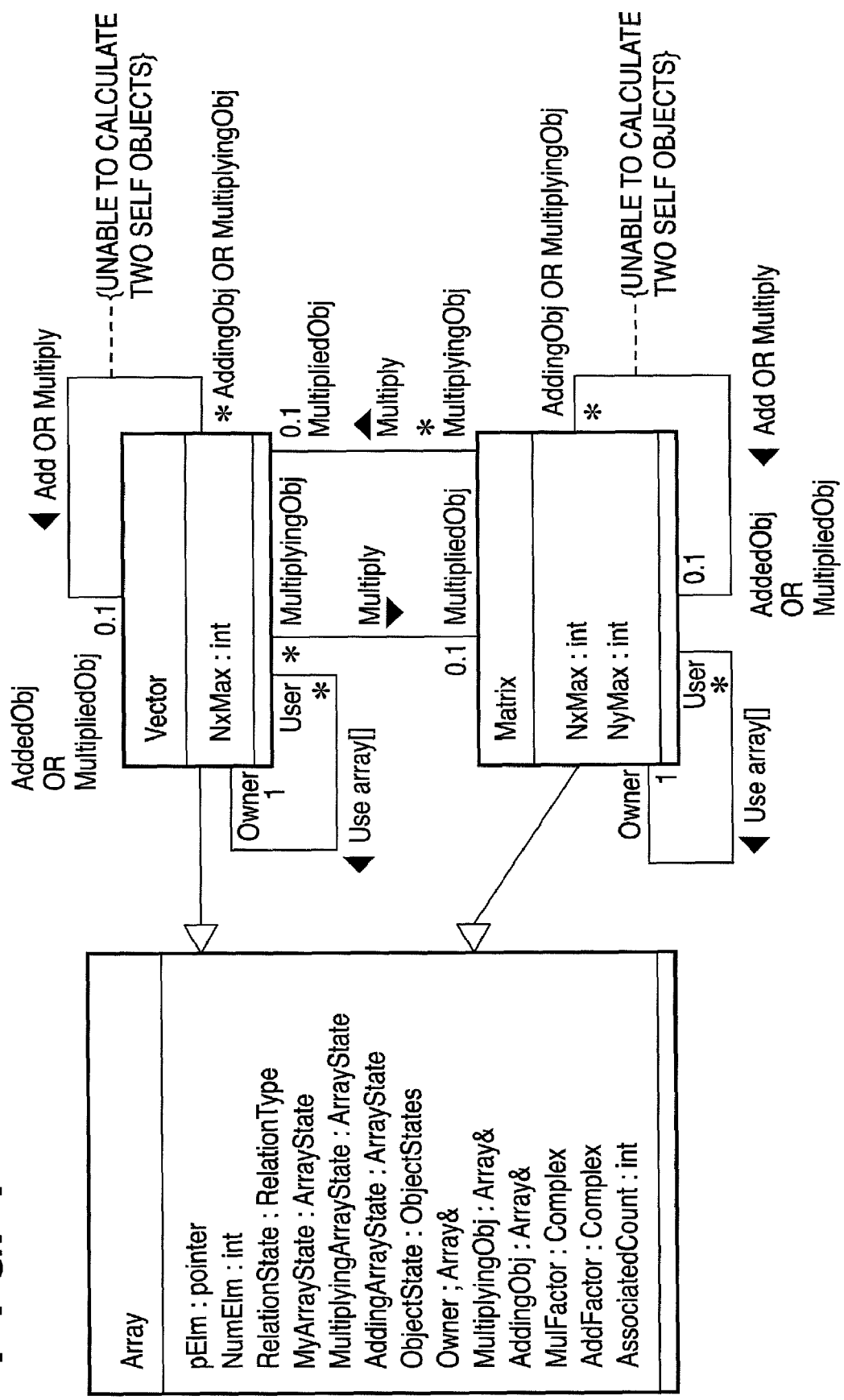
FIG. 7 is a view for explaining the inheritance relationship among an Array class, Matrix class, and Vector class.

FIG. 7 is a Class diagram for explaining the inheritance relationship among the Array class, Matrix class, and Vector class in the present embodiment. Note that a description about methods will not be given. The Array class is an abstract class having member variables and methods common to the Matrix class and Vector class.

In the Array class, pElm indicates the pointer of an array element. NumElm indicates the length of an array. RelationState indicates a relation with another object. MyArrayState indicates the state of a self Array object. MultiplyingArrayState indicates the state of an Array object which makes a product operation (to be referred to as a multiplying Array object hereinafter). AddingArrayState indicates the state of an Array object which makes a sum operation (to be referred to as an adding Array object hereinafter). ObjectState indicates the state of an object. Owner is a reference to an Array object which possesses an array element. MultiplyingObj is a reference to a multiplying Array object. AddingObj is a reference to an adding Array object. "Reference" is an alias of an existing object, and may be a pointer to the existing object.

MulFactor is a coefficient α when a matrix is expressed by equation (3) below. AddFactor is a coefficient β when a matrix is expressed by equation (3) below.

$$D = \alpha AB + \beta C \quad (3)$$

AssociatedCount is the sum of the number of other objects which have the object of interest as a multiplying object, and that of other objects which have the object of interest as an adding object.

A Matrix object can have another Matrix object up to a maximum of one object as a multiplying object. A Matrix object can have another Matrix object up to a maximum of one object as an adding object.

A Vector object can have another Vector object up to a maximum of one object as a multiplying object. A Vector object can have another Vector object up to a maximum of one object as an adding object. The self object cannot have the self object as a multiplying or adding object. A Vector object can have another Matrix object up to a maximum of one object as a multiplying object.

An Array object can use an array element of another Array object. In this case, an object which uses an array element of another object will be referred to as "User" hereinafter, and an object whose array element is used will be referred to as "Owner" hereinafter. In the product operation relation, an object which makes a product operation will be referred to as "MultiplyingObj" hereinafter, and an object which undergoes a product operation will be referred to as "MultipliedObj" hereinafter. In the sum operation relation, an object which makes a sum operation will be referred to as "AddingObj" hereinafter, and an object which undergoes a sum operation will be referred to as "AddedObj" hereinafter. An Array object can hold information in the form of a mathematical expression like the right-hand side of equation (3). Correspondence with attributes of the Array class is as follows.

α: MulFactor
β: AddFactor
A: Owner
B: MultiplyingObj
C: AddingObj

Note that MultiplyingObj=0 defines that there is no multiplying object, and AddingObj=0 defines that there is no adding object.

FIG. 8 is a table showing values that the member variable RelationState, which indicates the state of an object of Array class, can assume. A type RelationType in the member variable of Array class is a variable type having any one of the values shown in FIG. 8. An Array object indispensably has one of the values shown in FIG. 8 as the value of RelationState, and has a state in which it copes with the value of RelationState.

FIGS. 9A and 9B are tables showing element names and meanings of variables as sets of bits, which represent the states of an object of Array class. FIG. 9A is a table for explaining an ArrayState type including two flags required to indicate the object state.

If a flag Transpose is ON (bit value is "1"), this means that the object of interest is a Hermitian conjugate. If a flag MulReverse is OFF, in a product operation of an Owner object and a MultiplyingObj object as a multiplying object, the Owner object is located on the left side and the MultiplyingObj object is located on the right side (Owner*MultiplyingObj). If MulReverse is ON, the order of this product operation is replaced (MultiplyingObj*Owner).

FIG. 9B is a table for explaining an ObjectState Type including two flags required to indicate the object state.

If TemporalOwner is ON, the object of interest is an object which temporarily possesses an array memory area. The array memory area of the object in this state is temporarily used in a calculation process, and is released immediately after it is used. In the following description, ObjectState.TemporalOwner will be simply described as TemporalOwner.

If UnEvaluated is ON, an actual calculation of an operation of the object of interest is postponed. Therefore, before reference to an element (Matrix component or Vector component) of that object, the actual calculation must be completed. In the following description, ObjectState.UnEvaluated will be simply described as UnEvaluated.

The reason why the flags indicating the object states are classified into ObjectState and ArrayState will be described below. That is, as for ArrayState, upon making a product or sum operation, an object which makes the product or sum operation must copy and retain the state MyArrayState of an object which undergoes the product or sum operation. On the other hand, ObjectState does not require any copy.

Figure 10:
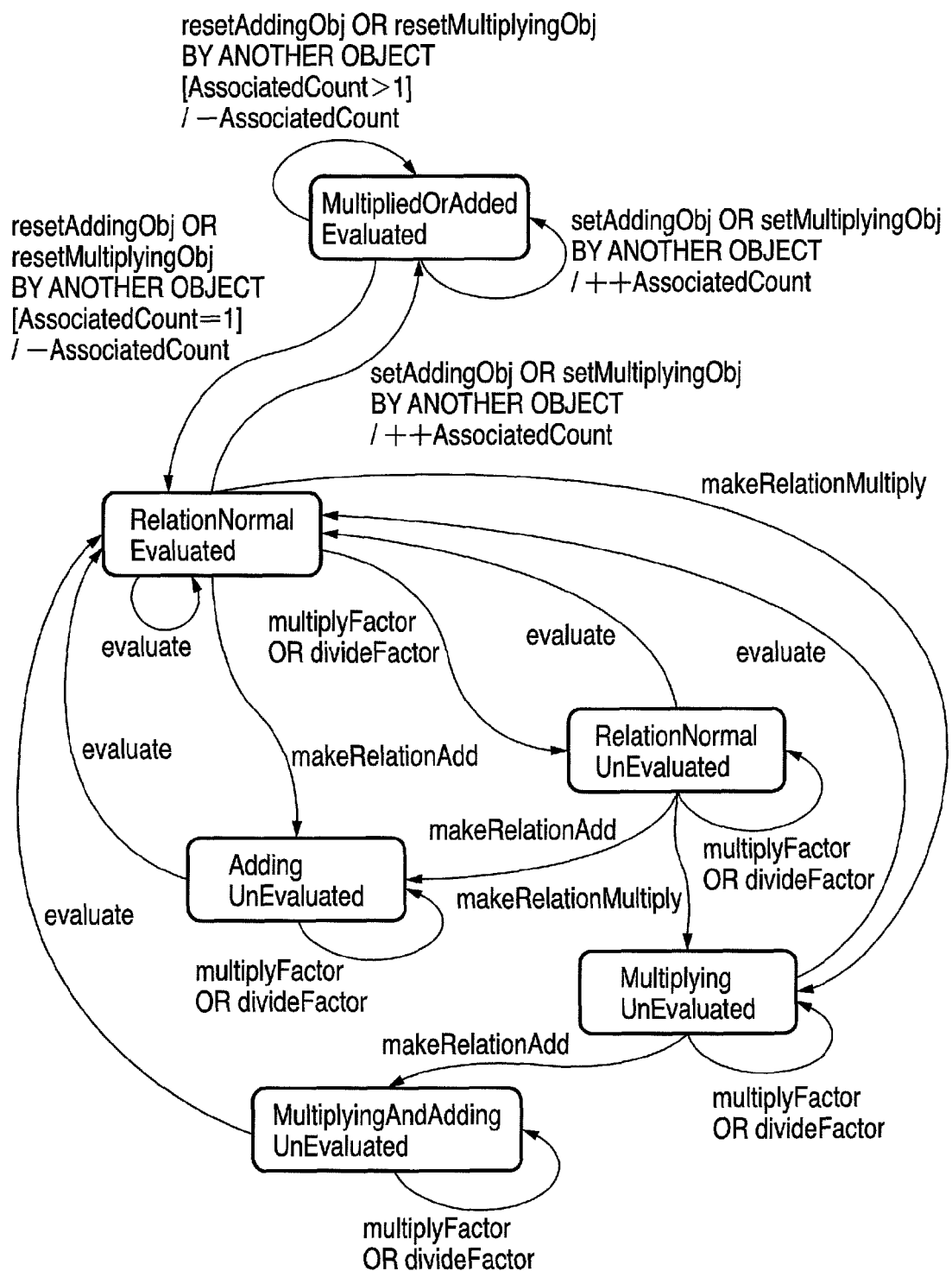
FIG. 10 shows the state transition of objects of Array class.

FIG. 10 is a State Machine Diagram showing the state changes of Array objects. Note that the state shown in FIG. 10 is a combination {RelationState, ObjectState} of RelationState and ObjectState.

When an Array object is generated by designating a size, an initial state {RelationNormal, Evaluated} is set. This state is a state which has no relation to other objects, and allows to use the contents of a memory area indicated by the pointer pElm intact. In a state Evaluated, MulFactor of an Array object is 1, AddFactor is 0, MultiplyingObj=0, and AddingObj=0.

The state {RelationNormal, Evaluated} changes to a state {RelationNormal, UnEvaluated} by a manipulation multiplyFactor or divideFactor. In the state UnEvaluated, a calculation is not completed. Therefore, if an element (Matrix element or Vector element) of a true object is required, the calculation needs to be completed.

The state {RelationNormal, Evaluated} changes to a state {Multiplying, UnEvaluated} by a manipulation makeRelationMultiply. In this state, another object is a multiplying object, and a calculation is yet to be completed. The state {RelationNormal, Evaluated} changes to a state {Adding, Unevaluated} by a manipulation makeRelationAdd. In this state, another object is an adding object, and a calculation is yet to be completed.

The state {RelationNormal, UnEvaluated} returns to the state {RelationNormal, UnEvaluated} by a manipulation multiplyFactor or divideFactor. The state {RelationNormal, UnEvaluated} changes to the state {Multiplying, UnEvaluated} by makeRelationMultiply. The state {RelationNormal, UnEvaluated} changes to the state {Adding, UnEvaluated} by makeRelationAdd.

The state {Adding, UnEvaluated} returns to the state {Adding, UnEvaluated} by a manipulation multiplyFactor or divideFactor.

The state {Multiplying, UnEvaluated} changes to a state {MultiplyingAndAdding, UnEvaluated} by a manipulation makeRelationAdd. The state {MultiplyingAndAdding, UnEvaluated} returns to the state {MultiplyingAndAdding, UnEvaluated} by a manipulation multiplyFactor or divideFactor.

All the states except for a state {MultipliedOrAdded, Evaluated} change to the state {RelationNormal, Evaluated} by a manipulation evaluate.

The state {RelationNormal, Evaluated} returns to the state {MultipliedOrAdded, Evaluated} when another object makes a manipulation setMultiplyingObj or setAddingObj.

FIG. 11 shows the functions and actions of the library BLAS used in the present embodiment. Details of these functions and their arguments are described at the world-wide-web URL:netlib.org/blas/. In the present embodiment, assume that functions CBLAS for C are called in place of directly calling functions in the form of Fortran. CELAS is designed to allow even C to easily use BLAS function, and is the same as BLAS except that it has an argument that designates the way an array is allocated on a memory. Of course, BLAS subroutine objects generated in Fortran can be linked with attention to arguments.

FIG. 12 shows a list of methods (member functions) of Array class. Details of respective methods will be described later with reference to FIGS. 15 to 39.

FIG. 13 shows a list of methods of Matrix class. Details of respective methods will be described later with reference to FIGS. 40 to 61.

FIG. 14 shows a list of methods of Vector class. Details of respective methods will be described later with reference to FIGS. 62 to 81.

Figure 15:
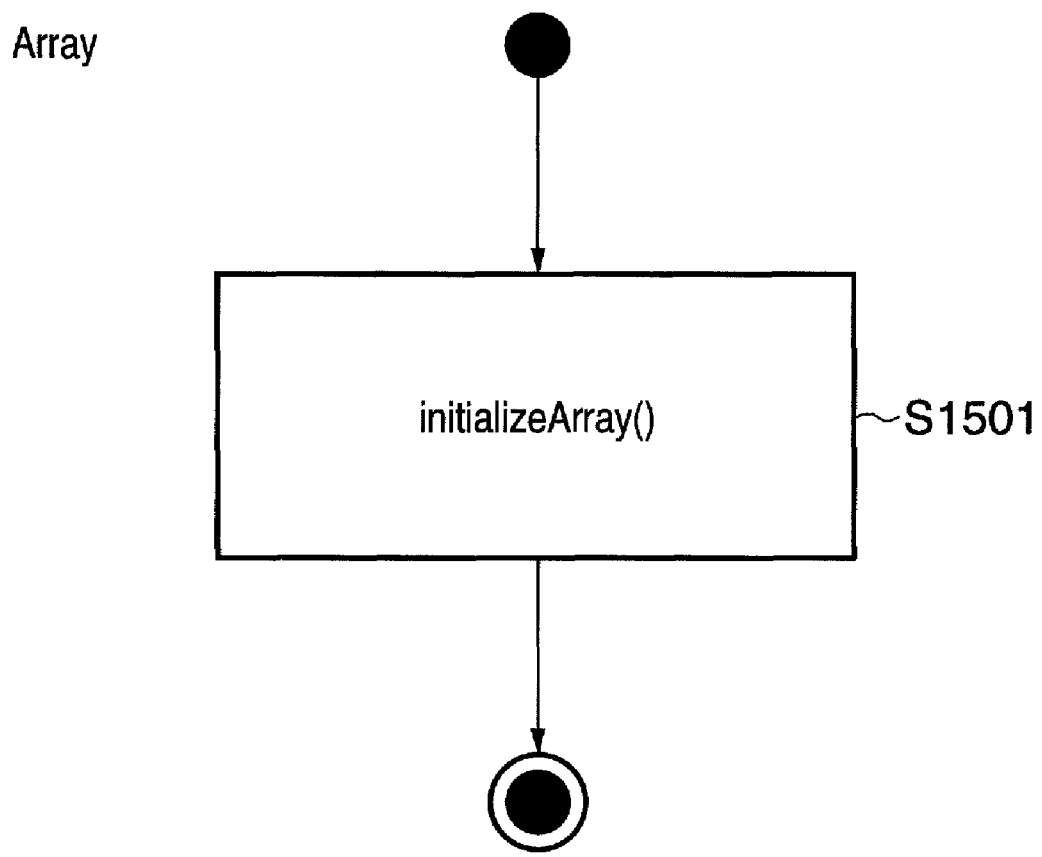
FIG. 15 shows processing to be executed by a default constructor of Array class.

FIG. 15 is an activity diagram of a default constructor of Array class without any argument. In step S1501, a method initializeArray is executed.

Figure 16:
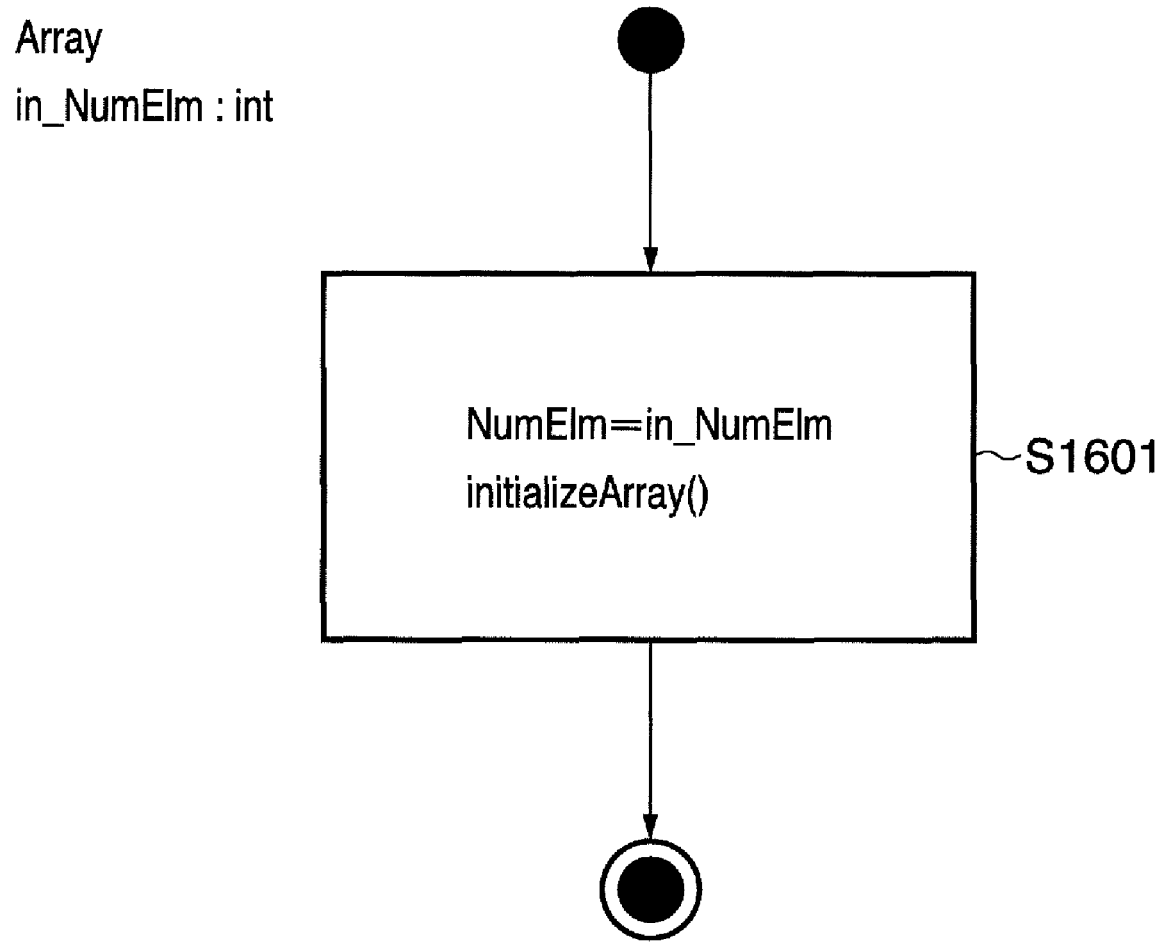
FIG. 16 shows processing to be executed by a constructor of Array class having an int type as an argument.

FIG. 16 is an activity diagram of a constructor of Array class having one integer (int type) as an argument. The argument of this method is an int type variable in_NumElm. This is the number of elements of an array. In step S1601, in_NumElm is set in a member variable, and the method initializeArray is executed.

Figure 17:
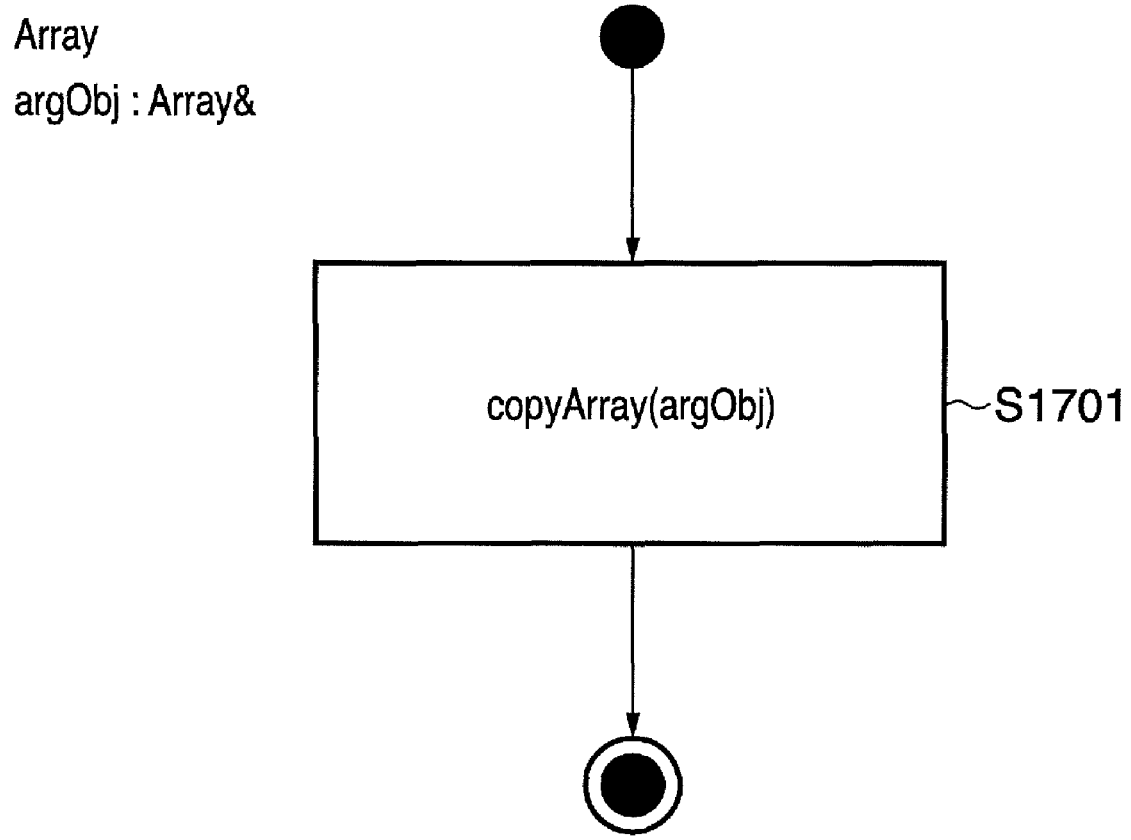
FIG. 17 shows processing to be executed by a constructor of Array class having a reference to an Array object as an argument.

FIG. 17 is an activity diagram of a constructor of Array class having a reference to an Array object as an argument. The argument of this method is a reference argObj to an Array object. In step S1701, a method copyArray is executed with the argument argObj.

Figure 18:
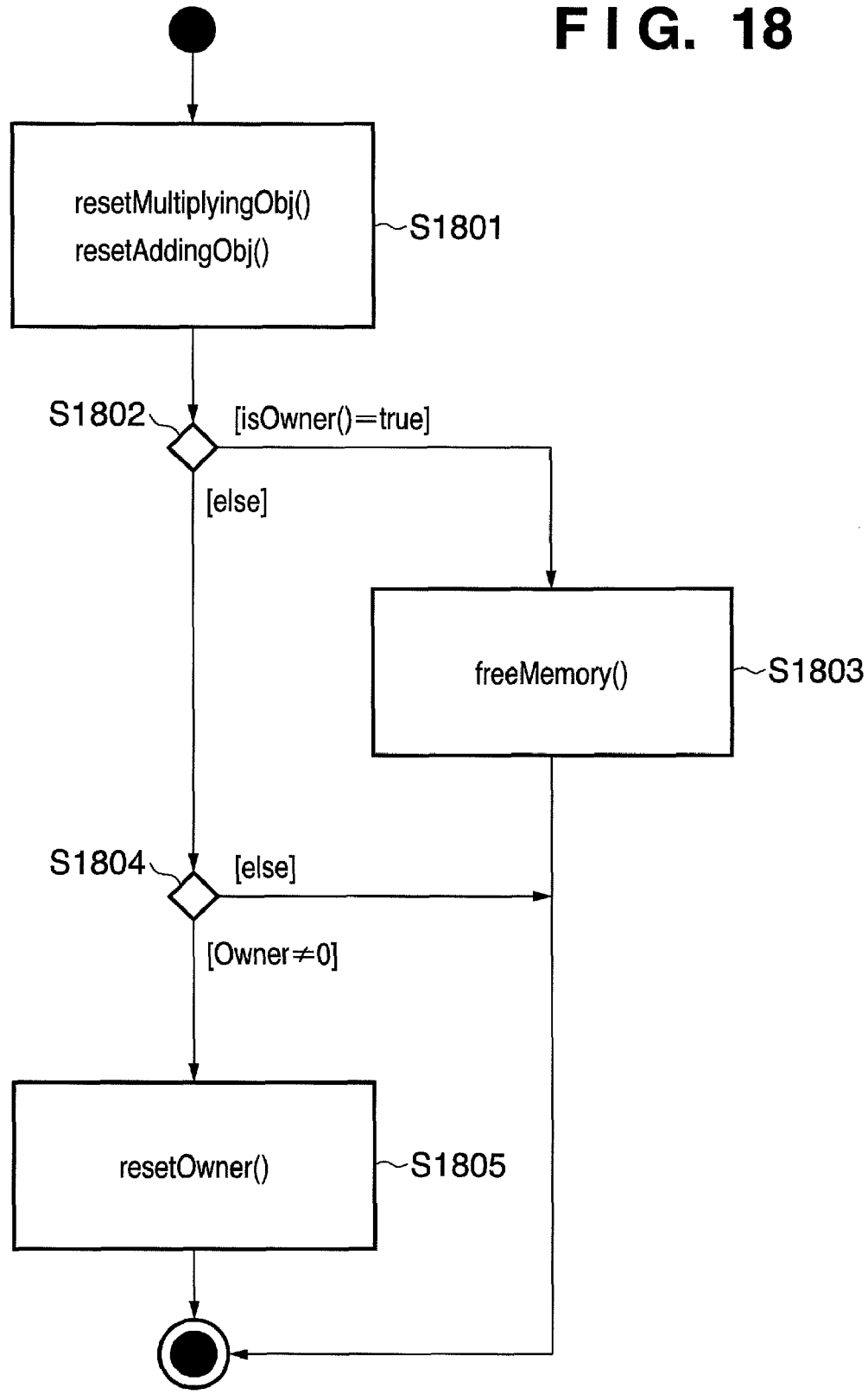
FIG. 18 shows processing to be executed by a destructor of Array class.

FIG. 18 is an activity diagram of a destructor ~Array of Array class.

In step S1801, a method resetMultiplyingObj is executed, and a method resetAddingObj is executed. If the return value of a method isOwner is false in step S1802, the process advances to step S1803; if it is true, the process jumps to step S1804.

In step S1803, array element release processing (freeMemory) is executed. If Owner≠0 in step S1804, the process advances to step S1805; if Owner=0, the process ends. In step S1805, a method resetOwner (reset the Owner-User relationship) is executed.

Figure 19:
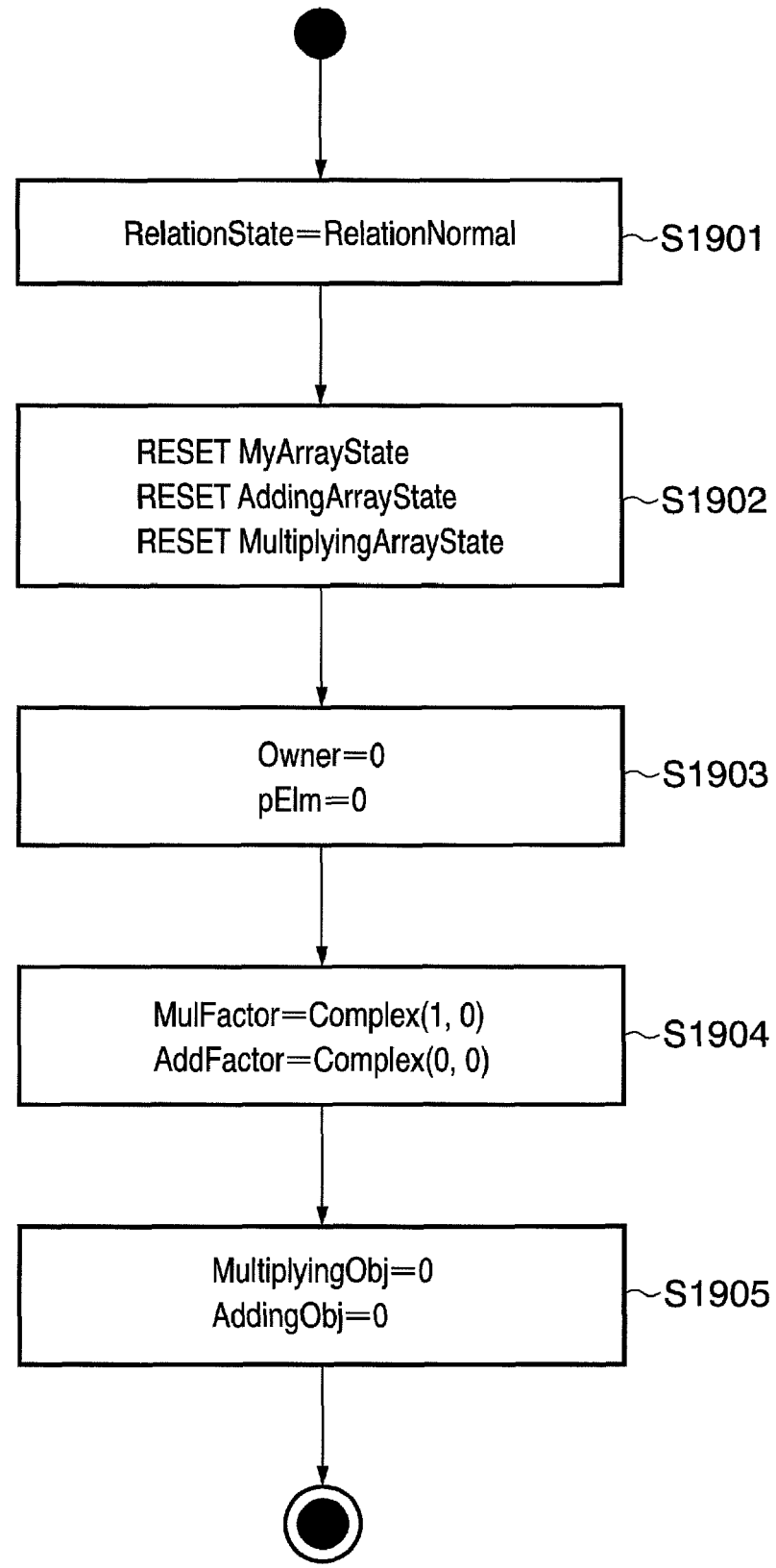
FIG. 19 shows processing to be executed by a method initializeArray of Array class.

FIG. 19 is an activity diagram of the method initializeArray that initializes an Array object.

In step S1901, a value RelationNormal is set in RelationState. In step S1902, MyArrayState, AddingArrayState, and MultiplyingArrayState are reset. Note that "resetting" is to set all flags to OFF.

In step S1903, "0" is set in Owner, and "0" is set in pElm. In step S1904, a value "1" is set as a complex number in MulFactor, and a value "0" is set as a complex number in AddFactor. In step S1905, "0" is set in MultiplyingObj, and "0" is set in AddingObj.

Figure 20:
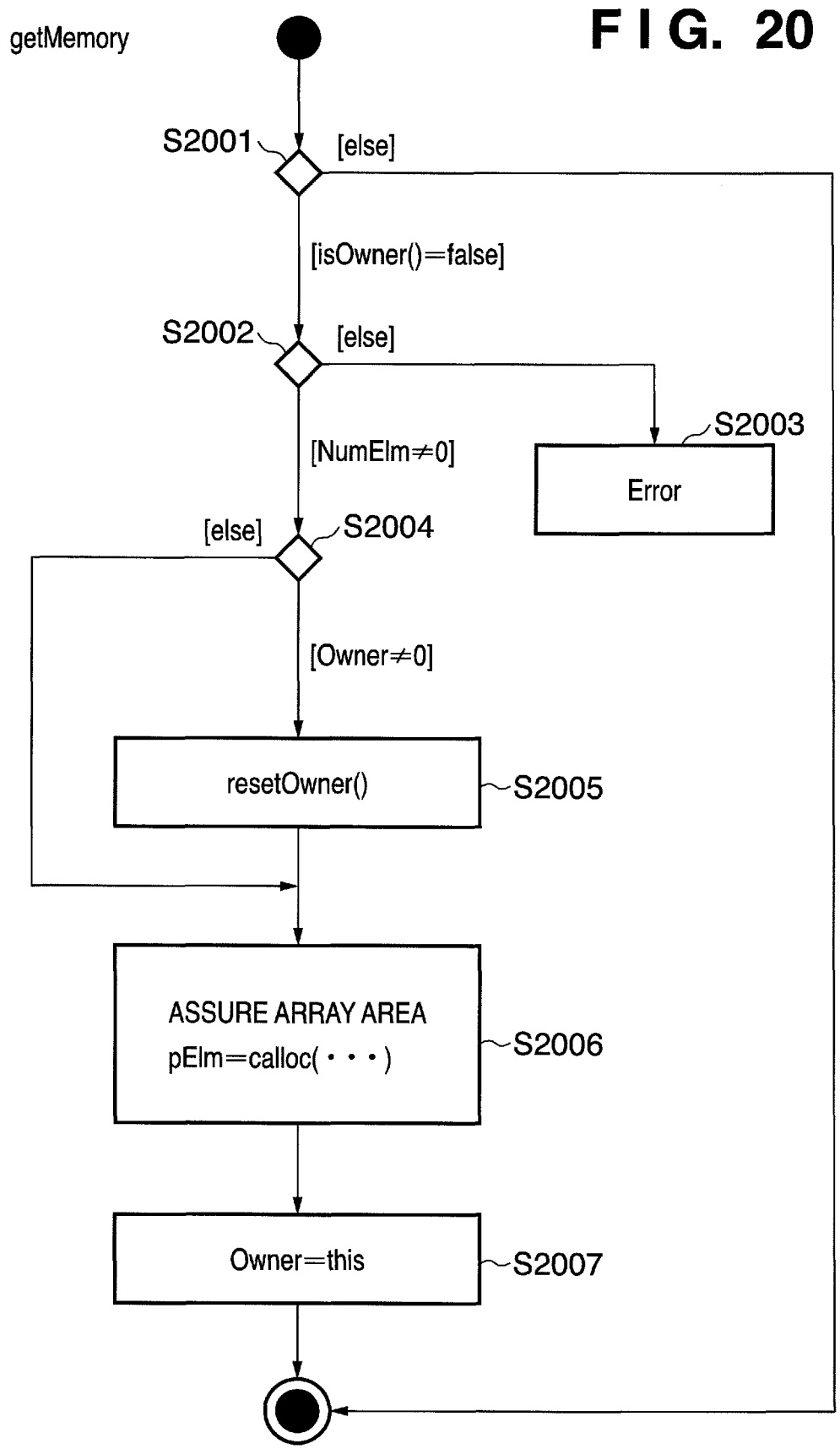
FIG. 20 shows processing to be executed by a method getMemory of Array class.

FIG. 20 is an activity diagram of a method getMemory of Array class, which assures a memory area of an array element.

If the return value of the method isOwner is false in step S2001, the process advances to step S2002; if it is true, the process ends. If NumElm≠0 in step S2002, the process advances to step S2004; if NumElm=0, the process advances to step S2003 to terminate as an error. If Owner≠0 in step S2004, the process advances to step S2005; if Owner=0, the process jumps to step S2006.

In step S2005, the method resetOwner is executed. In step S2006, an array area is assured. This area is a memory area used to store Matrix elements or Vector elements, and "calloc" is a system call that assures a memory area.

In step S2007, "this" is set in Owner. Note that "this" is an identifier indicating the self object. C++ has a specification in that a pointer to the self object is set in "this". Setting "this" in Owner as the reference to an object is that the member variable of Owner indicates that of the self object. This means that the owner (Owner) of an array element is the self object.

Figure 21:
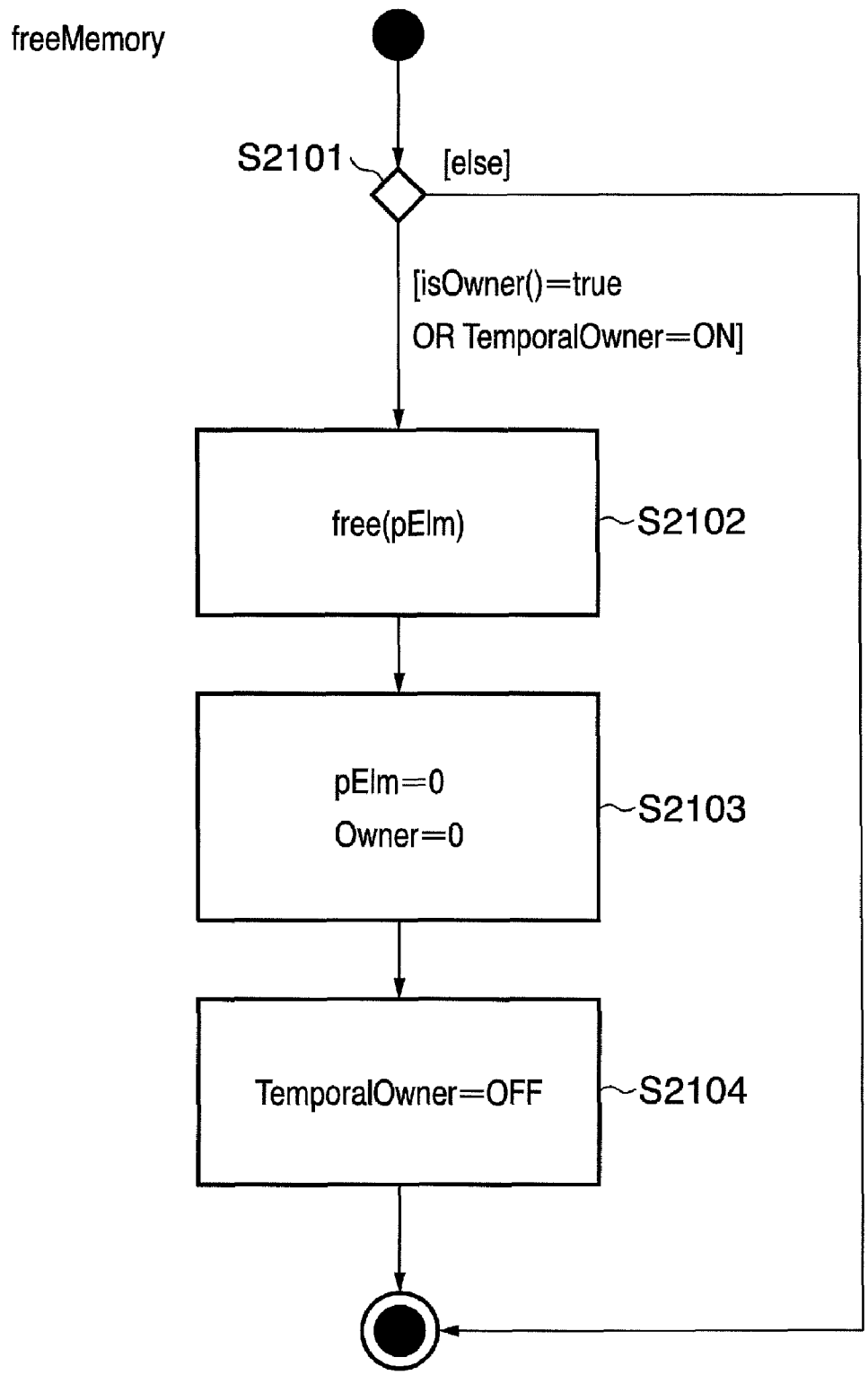
FIG. 21 shows processing to be executed by a method freeMemory of Array class.

FIG. 21 is an activity diagram of a method freeMemory of Array class, which releases a memory area for an array element.

If the return value of the method isOwner is true or TemporalOwner is ON (in case of a temporal owner) in step S2101, the process advances to step S2102; otherwise, the process ends. In step S2102, a memory area having pElm as the start address is released, and "free" is a system call used to release a memory.

In step S2103, "0" is set in pElm and "0" is set in Owner. In step S2104, TemporalOwner is set to OFF.

Figure 22:
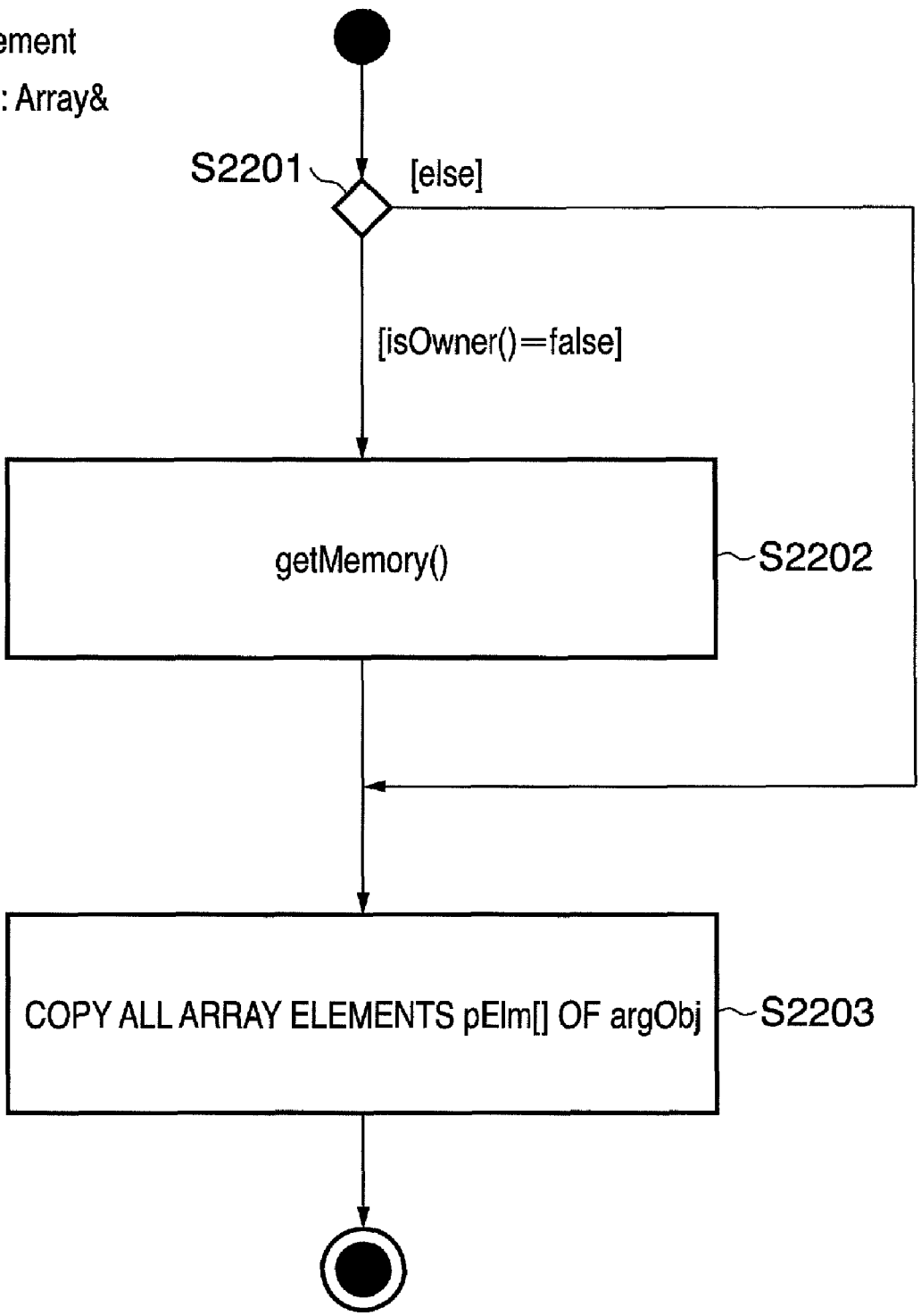
FIG. 22 shows processing to be executed by a method copyElement of Array class.

FIG. 22 is an activity diagram of a method copyElement of Array class, which copies an array element.

If the return value of the method isOwner is false in step S2201, the process advances to step S2202; if it is true, the process advances to step S2203. In step S2202, the method getMemory is executed. In step S2203, all array elements of an object argObj as a copy source are copied to element arrays of the self object.

Figure 23:
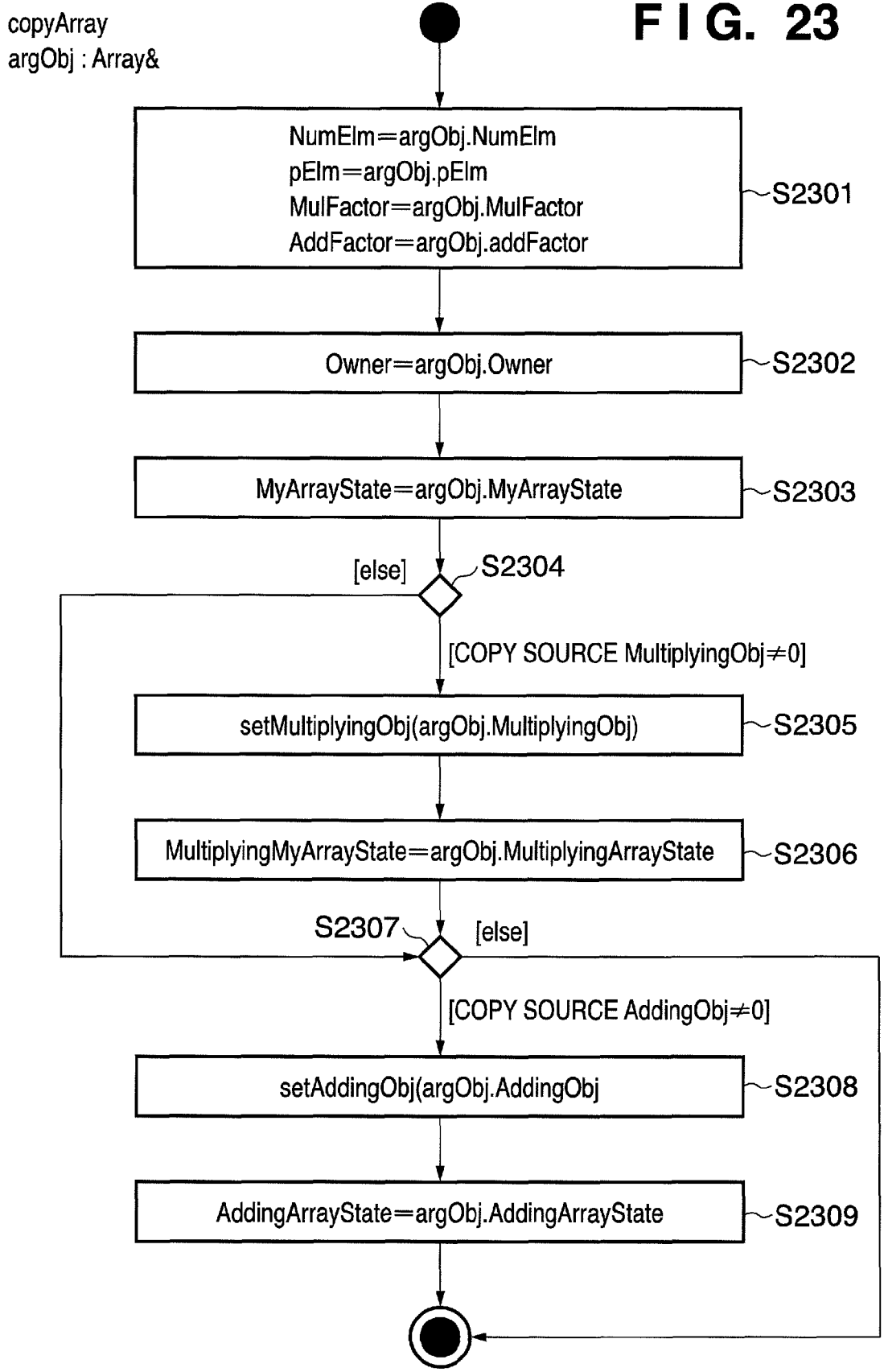
FIG. 23 shows processing to be executed by a method copyArray of Array class.

FIG. 23 is an activity diagram of the method copyArray of an Array object, which is used to copy some member variables of the Array object.

In step S2301, member variables NumElm, pElm, MulFactor, and AddFactor of an Array object argObj as a copy source are copied to the corresponding member variables of the self object. In step S2302, a member variable Owner of argObj is copied to Owner of the self object. In this way, Owner of the self object matches that of argObj.

In step S2303, a member variable MyArrayState of argObj is copied to MyArrayState of the self object. If a member variable MultiplyingObj of argObj is not "0" in step S2304, the process advances to step S2305; if it is "0", the process jumps to step S2307.

In step S2305, a method setMultiplyingObj is executed with an argument argObj.MultiplyingObj. As a result, MultiplyingObj of the self object matches MultiplyingObj of the object argObj as the copy source. In step S2306, a member variable MultiplyingArrayState of argObj is copied to MultiplyingArrayState of the self object.

If a member variable AddingObj of argObj is not "0" in step S2307, the process advances to step S2308; if it is "0", the process ends. In step S2308, a method setAddingObj is executed with an argument argObj.AddingObj. As a result, AddingObj of the self object matches AddingObj of the object argObj as the copy source.

In step S2309, a member variable AddingArrayState of argObj is copied to AddingArrayState of the self object. Note that the method copyArray does not copy array elements (successive data having pElm as the start address). In order to copy array elements, the method copyElement is executed.

Figure 24:
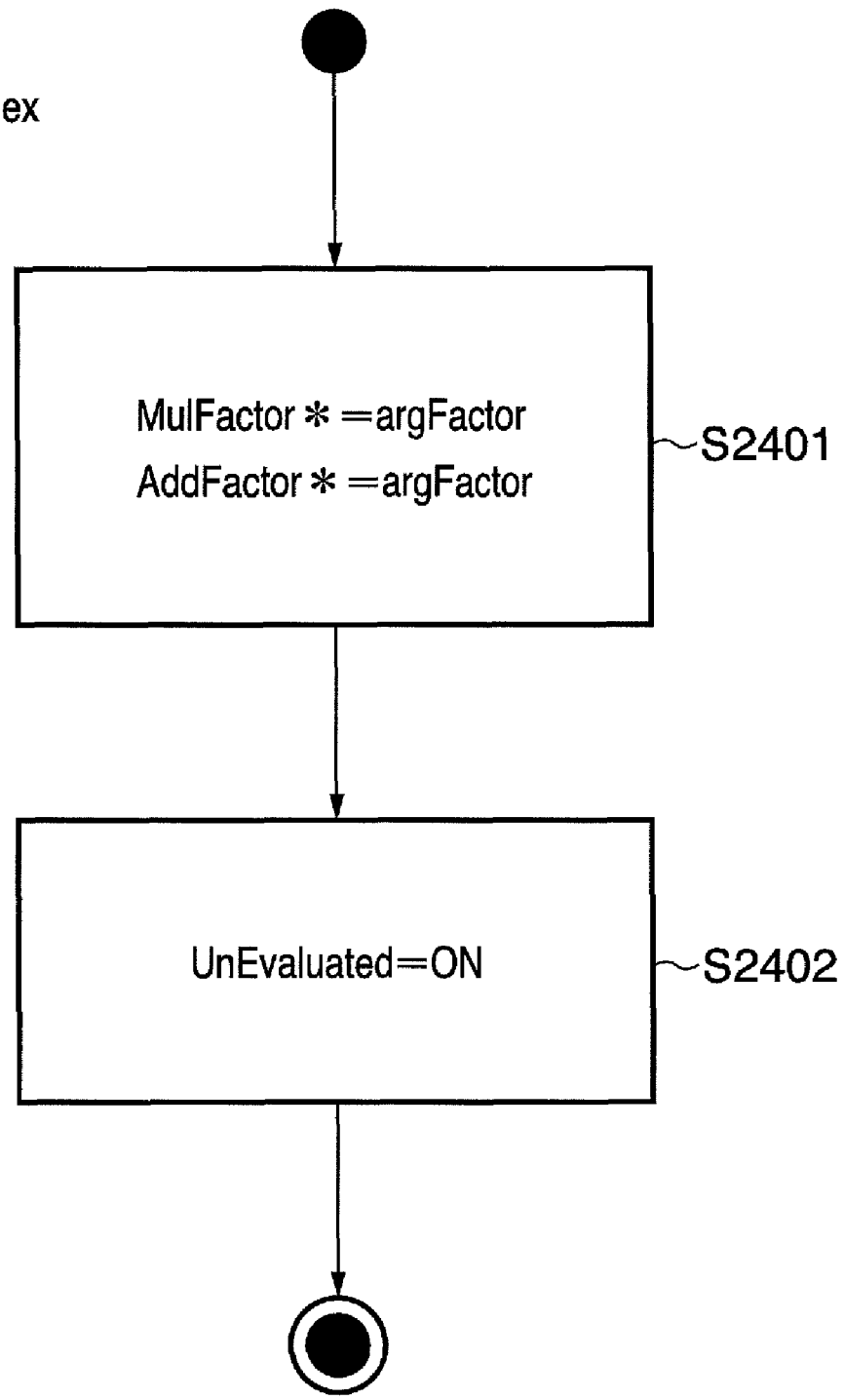
FIG. 24 shows processing to be executed by a method multiplyFactor of Array class.

FIG. 24 is an activity diagram of a method multiplyFactor used to execute a product operation with Complex for an Array object (Matrix or Vector object). An argument of this method is a Complex object argFactor.

In step S2401, MulFactor is multiplied by argFactor, and AddFactor is multiplied by argFactor. In step S2402, UnEvaluated is set to ON.

Figure 25:
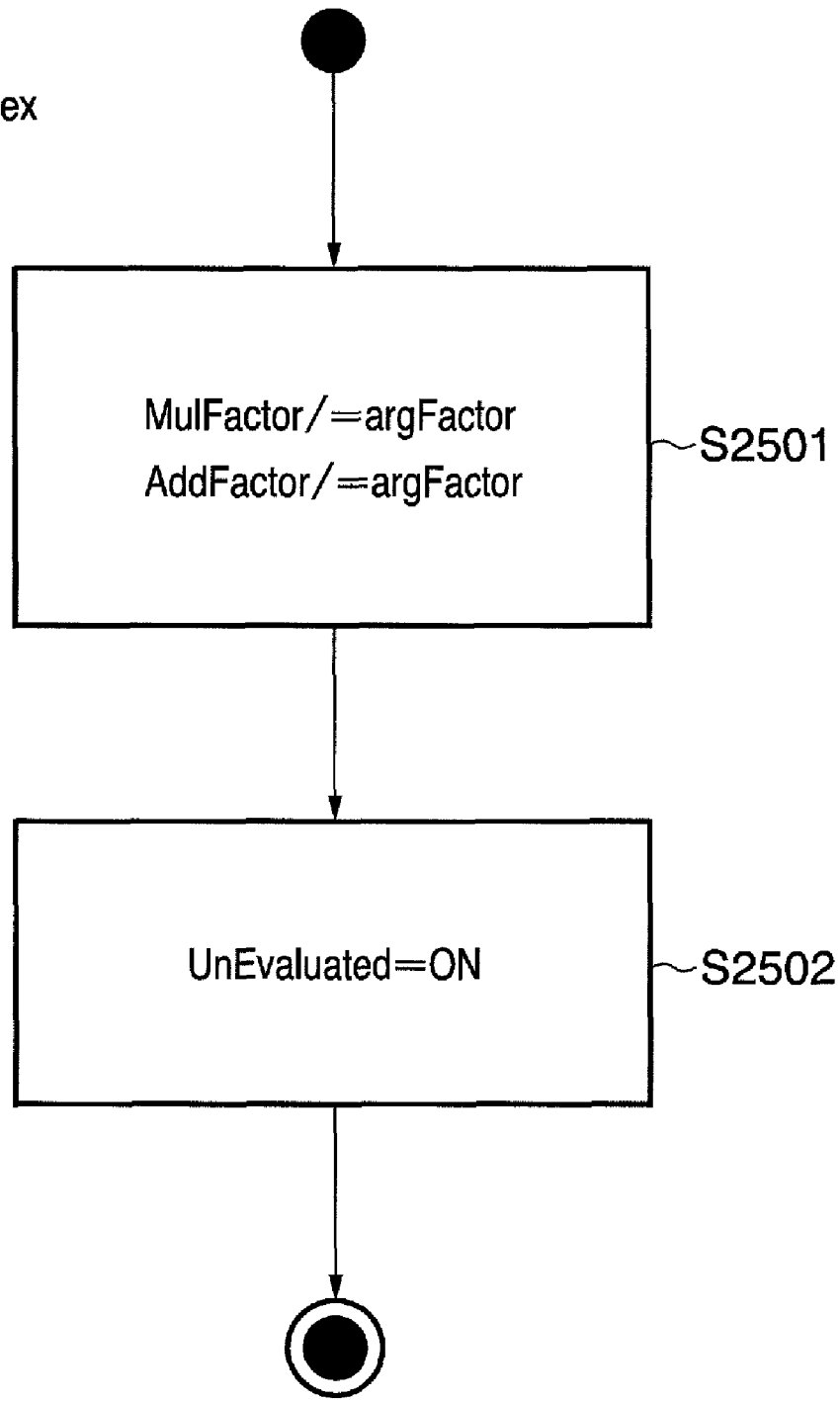
FIG. 25 shows processing to be executed by a method divideFactor of Array class.

FIG. 25 is an activity diagram of a method divideFactor used to execute a quotient operation with a Complex object for an Array object (Matrix or Vector object). An argument of this method is a Complex object argFactor.

In step S2501, MulFactor is divided by argFactor, and AddFactor is divided by argFactor. In step S2502, UnEvaluated is set to ON.

Figure 26:
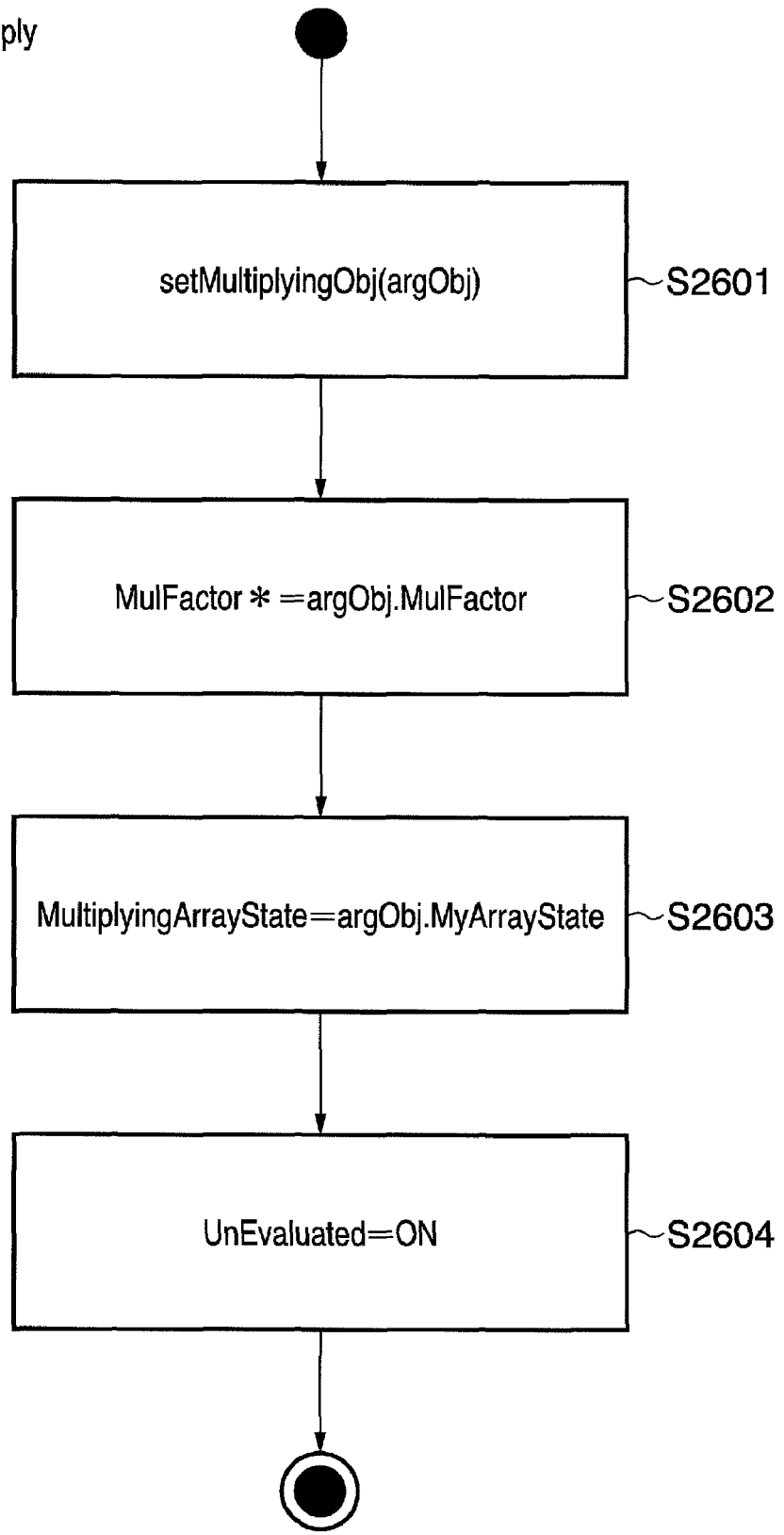
FIG. 26 shows processing to be executed by a method makeRelationMultiply of Array class.

FIG. 26 is an activity diagram of a method makeRelationMultiply used to associate two Array objects by a product operation. An argument of this method is the reference argObj to an Array object.

In step S2601, a method setMultiplyingObj is called by the argument argObj. In step S2602, MulFactor of the self object is multiplied by MulFactor of argObj. In step S2603, MyArrayState of argObj is set in MultiplyingArrayState. In step S2604, ON is set in UnEvaluated.

Figure 27:
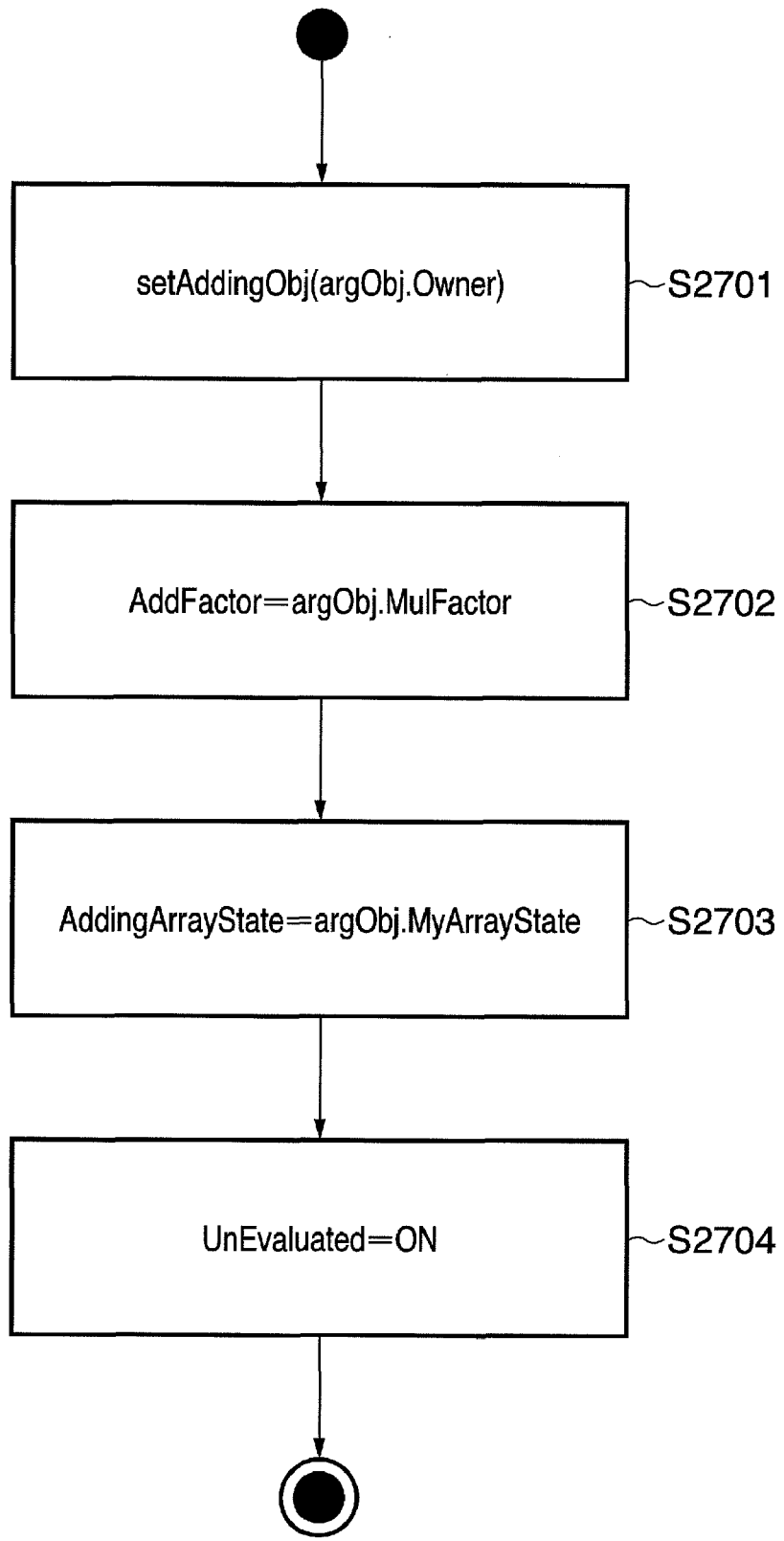
FIG. 27 shows processing to be executed by a method makeRelationAdd of Array class.

FIG. 27 is an activity diagram of a method makeRelationAdd used to associate two Array objects by a sum operation. An argument of this method is the reference argObj to an Array object.

In step S2701, the method setAddingObj is executed with an argument argObj.Owner. In step S2702, MulFactor of argObj is set in AddFactor of the self object. In step S2703, MyArrayState of argObj is set in AddingArrayState of the self object. In step S2704, ON is set in UnEvaluated.

Figure 28:
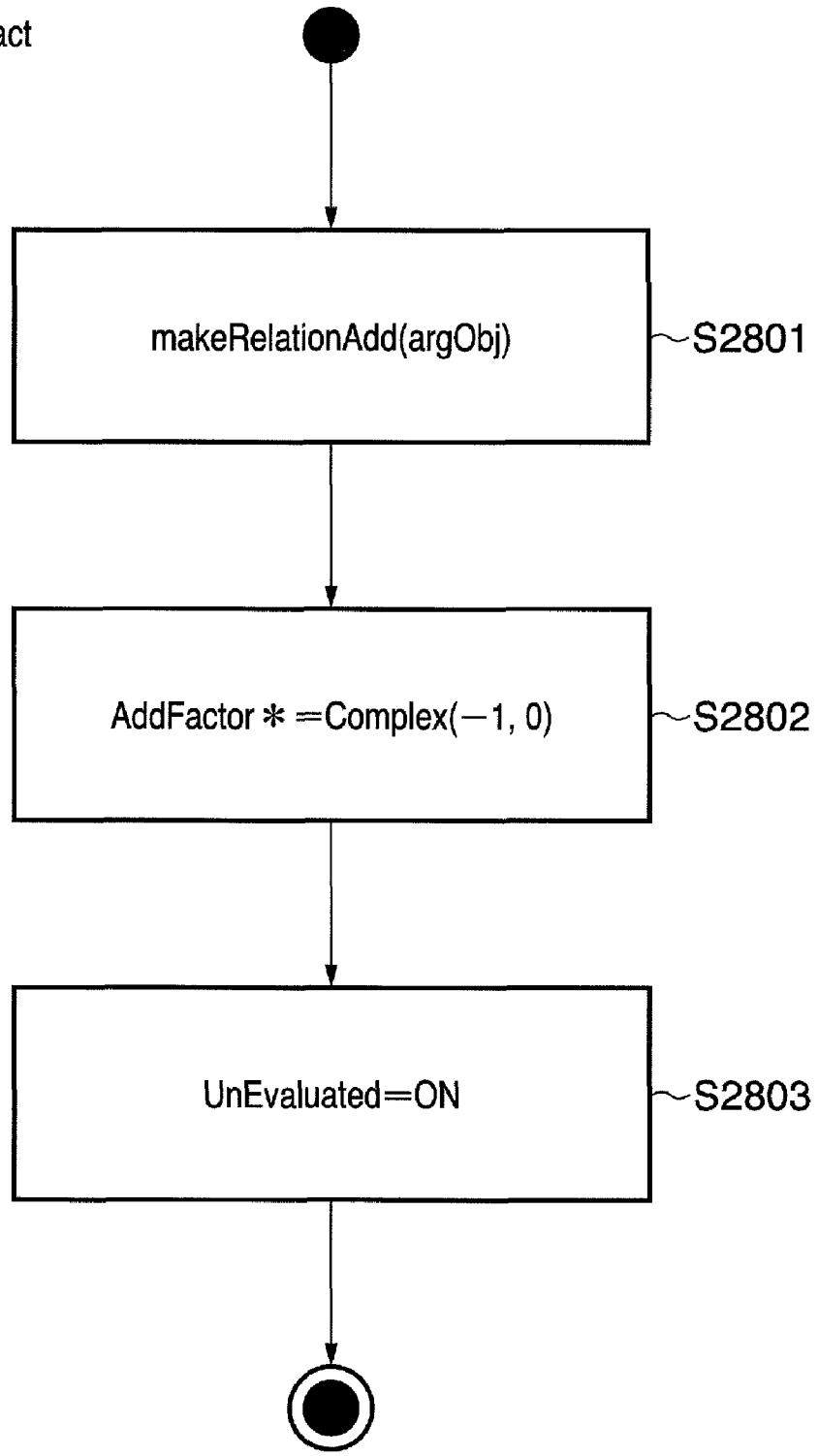
FIG. 28 shows processing to be executed by a method makeRelationSubtract of Array class.

FIG. 28 is an activity diagram of a method makeRelationSubtract used to implement the difference between two Array objects by association between the two objects. An argument of this method is the reference argObj to an Array object.

In step S2801, the method makeRelationAdd is executed with the argument argObj. In step S2802, AddFactor of the self object is multiplied by Complex (−1, 0). Note that Complex(re, im) is a complex number object having "re" as a real number part and "im" as an imaginary number part. In step S2803, ON is set in UnEvaluated.

Figure 29:
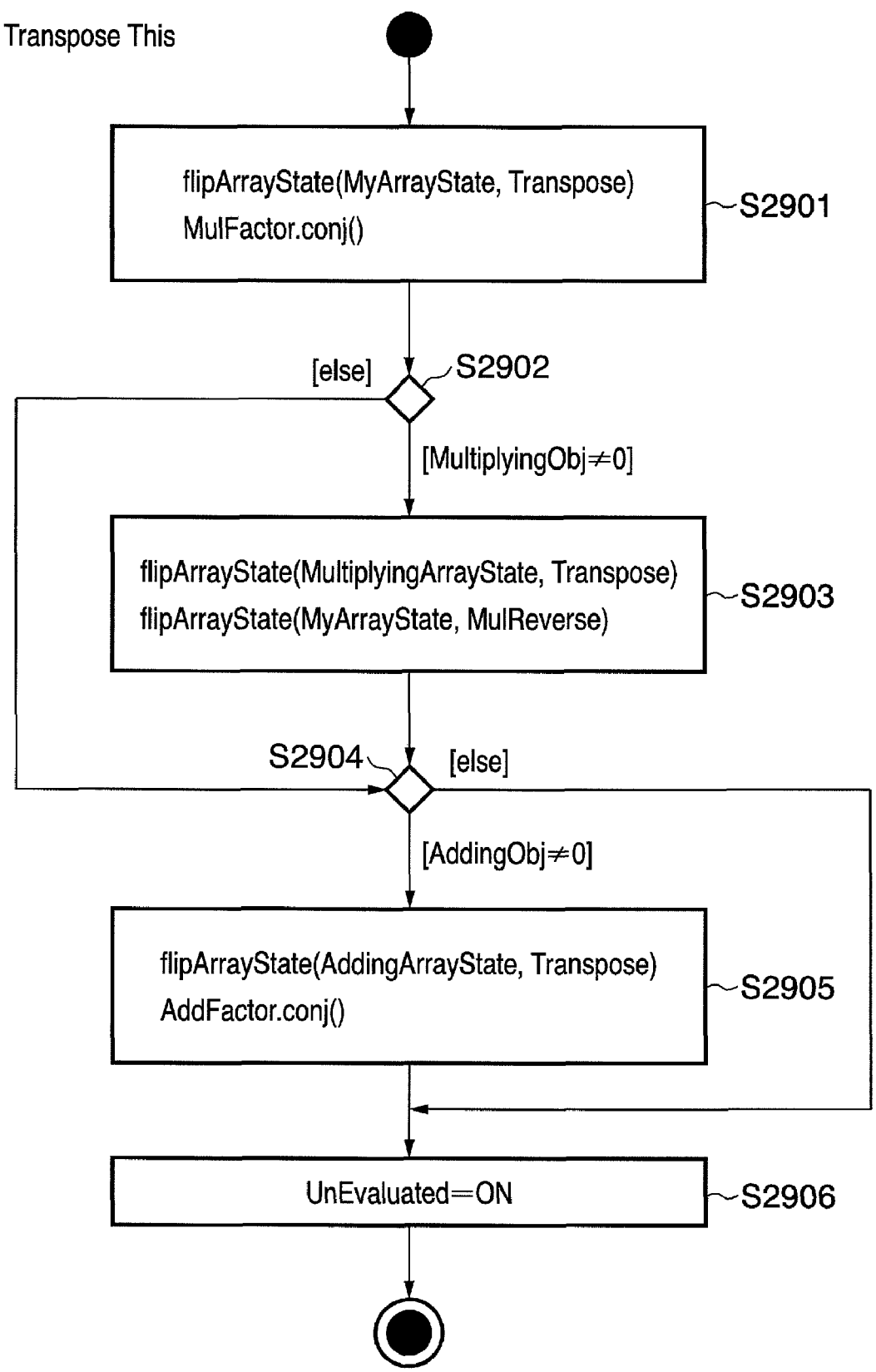
FIG. 29 shows processing to be executed by a method makeTransposeThis of Array class.

FIG. 29 is an activity diagram of a method makeTransposeThis used to convert an object into a Hermitian conjugate.

In step S2901, the Transpose flag of MyArrayState is inverted by executing a method flipArrayState, and MulFactor is converted into a complex conjugate by executing a method oonj from MulFactor. If MultiplyingObj≠0 in step S2902, the process advances to step S2903; if MultiplyingObj=0, the process jumps to step S2904.

In step S2903, the Transpose flag of MultiplyingArrayState is inverted by executing the method flipArrayState, and the MulReverse flag of MyArrayState is inverted by executing the method flipArrayState. If AddingObj≠0 in step S2904, the process advances to step S2905; if AddingObj=0, the process jumps to step S2906.

In step S2905, the Transpose flag of AddingArrayState is inverted by executing the method flipArrayState, and AddFactor is converted into a complex conjugate by executing the method conj from AddFactor. In step S2906, UnEvaluated is set to ON.

Figure 30:
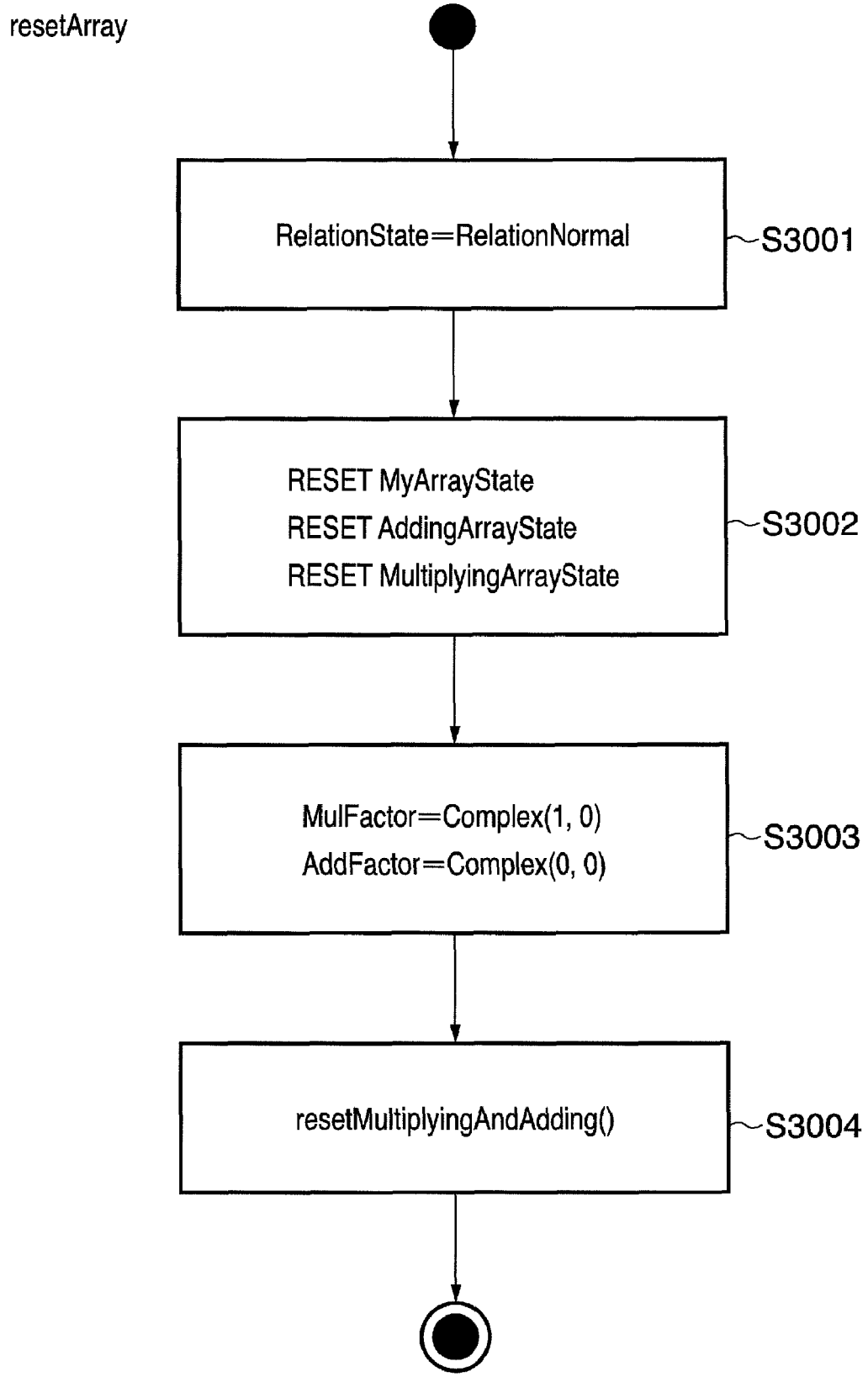
FIG. 30 shows processing to be executed by a method resetArray of Array class.

FIG. 30 is an activity diagram of a method resetArray used to reset the state of an Array object.

In step S3001, a value RelationNormal is set in RelationState. In step S3002, MyArrayState, AddingArrayState, and MultiplyingArrayState are reset. Note that "resetting" is to set all flags to OFF.

In step S3003, Complex (1, 0) is set in MulFactor, and Complex (0, 0) is set in AddFactor. In step S3004, a method resetMultiplyingAndAdding is executed.

Figure 31:
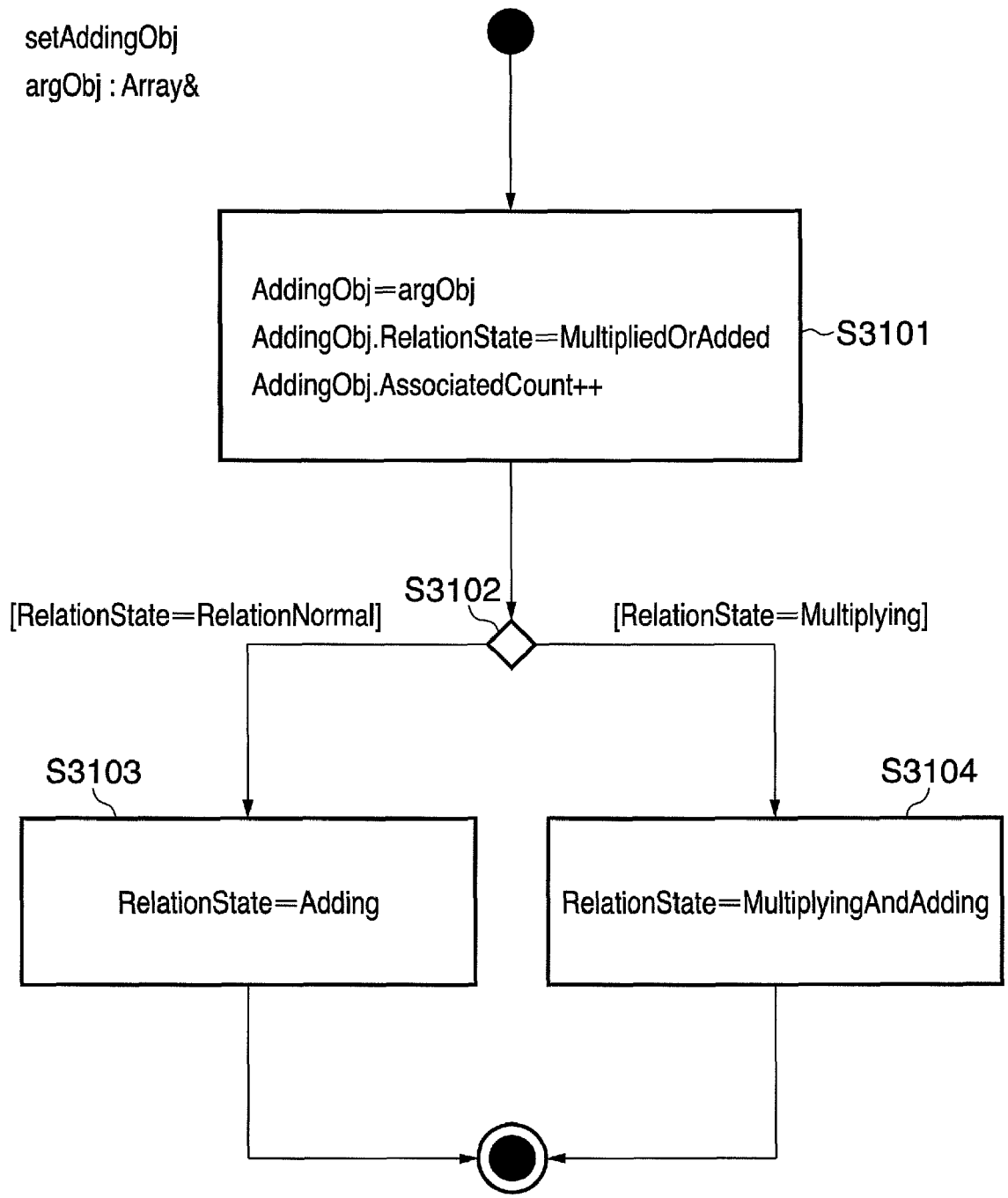
FIG. 31 shows processing to be executed by a method setAddingObj of Array class.

FIG. 31 is an activity diagram of the method setAddingObj used to set an Array object of an argument as an adding object of the self object. An argument of this method is the reference argObj to an Array object.

In step S3101, argObj is set in AddingObj, a value MutipliedOrAdded is set in RelationState of AddingObj, and the AssociatedCount value of AddingObj is incremented by 1. If RelationState of the self object has a value RelationNormal in step S3102, the process advances to step S3103; if RelationState has a value Multiplying, the process advances to step S3104.

In step S3103, a value Adding is set in RelationState of the self object. In step S3104, a value MultiplyingAndAdding is set in RelationState of the self object.

Figure 32:
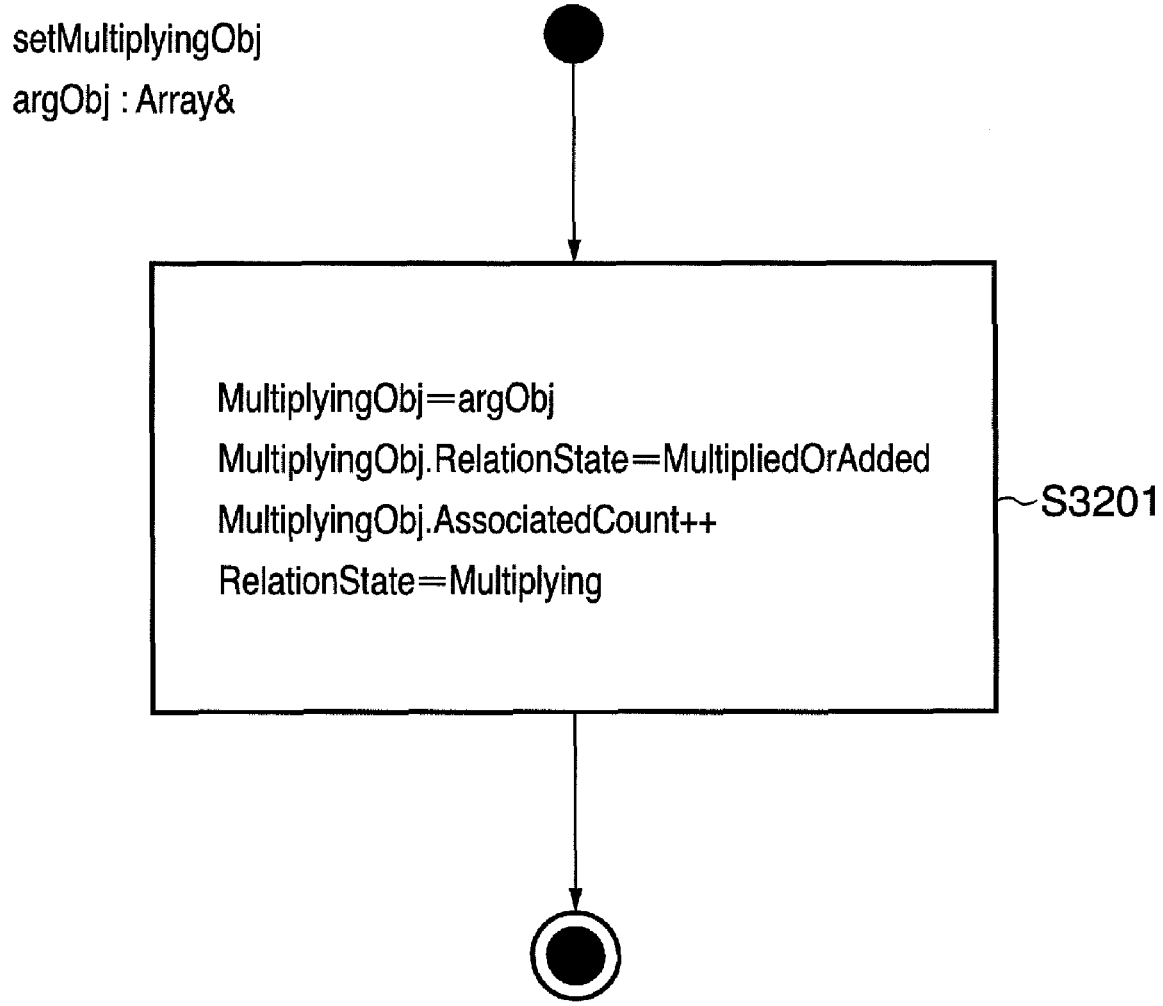
FIG. 32 shows processing to be executed by a method setMultiplyingObj of Array class.

FIG. 32 is an activity diagram of the method setMultiplyingObj used to set an Array object of an argument as a multiplying object of the self object. An argument of this method is the reference argObj to an Array object.

In step S3201, argObj is set in MultiplyingObj of the self object, and a value MultipliedOrAdded is set in RelationState of MultiplyingObj. Furthermore, in step S3201 the AssociatedCount value of MultiplyingObj is incremented by 1, and a value Multiplying is set in RelationState of the self object.

Figure 33:
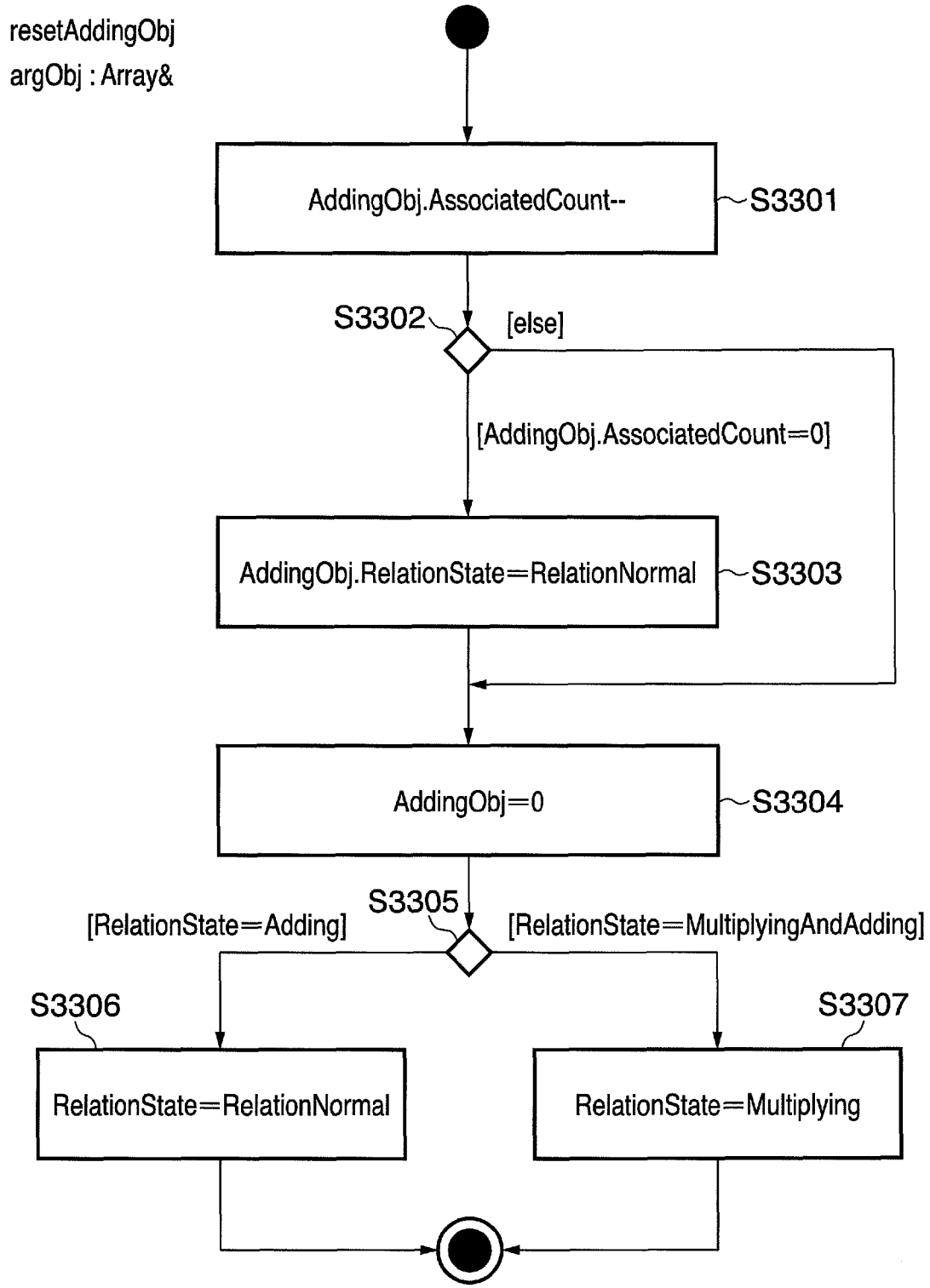
FIG. 33 shows processing to be executed by a method resetAddingObj of Array class.

FIG. 33 is an activity diagram of the method resetAddingObj used to reset the relation with an adding object. An argument of this method is the reference argObj to an Array object.

In step S3301, the AssociatedCount value of AddingObj is decremented by 1. If the AssociatedCount value of AddingObj is "0" in step S3302, the process advances to step S3303; if it is not "0", the process jumps to step S3304.

In step S3303, a value RelationNormal is set in RelationState of AddingObj. In step S3304, "0" is set in AddingObj of the self object. If RelationState of the self object has a value Adding in step S3305, the process advances to step S3306; if RelationState has a value MultiplyingAndAdding, the process advances to step S3307.

In step S3306, a value RelationNormal is set in RelationState of the self object. In step S3307, a value Multiplying is set in RelationState of the self object.

Figure 34:
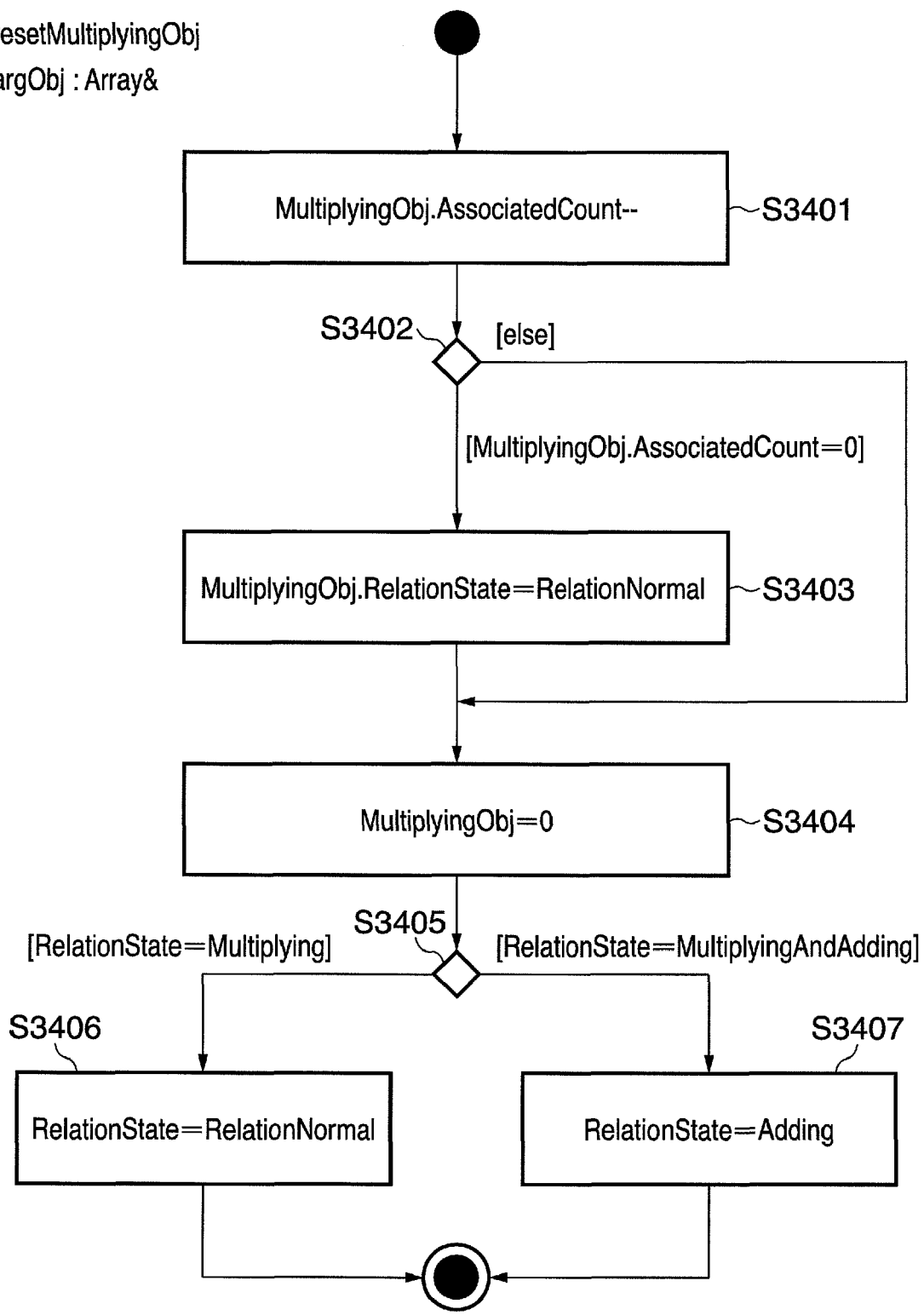
FIG. 34 shows processing to be executed by a method resetMultiplyingObj of Array class.

FIG. 34 is an activity diagram of the method resetMultiplyingObj used to reset the relation with a multiplying object. An argument of this method is the reference argObj to an Array object.

In step S3401, the AssociatedCount value of MultiplyingObj is decremented by 1. If the AssociatedCount value of MultiplyingObj is "0" in step S3402, the process advances to step S3403; if it is not "0", the process jumps to step S3404.

In step S3403, a value RelationNormal is set in RelationState of MultiplyingObj. In step S3404, "0" is set in MultiplyingObj. In step S3405, RelationState is checked. If RelationState has a value Multiplying, the process advances to step S3406; if RelationState has a value MultiplyingAndAdding, the process advances to step S3407.

In step S3406, a value RelationNormal is set in RelationState. In step S3407, a value Adding is set in RelationState.

Figure 35:
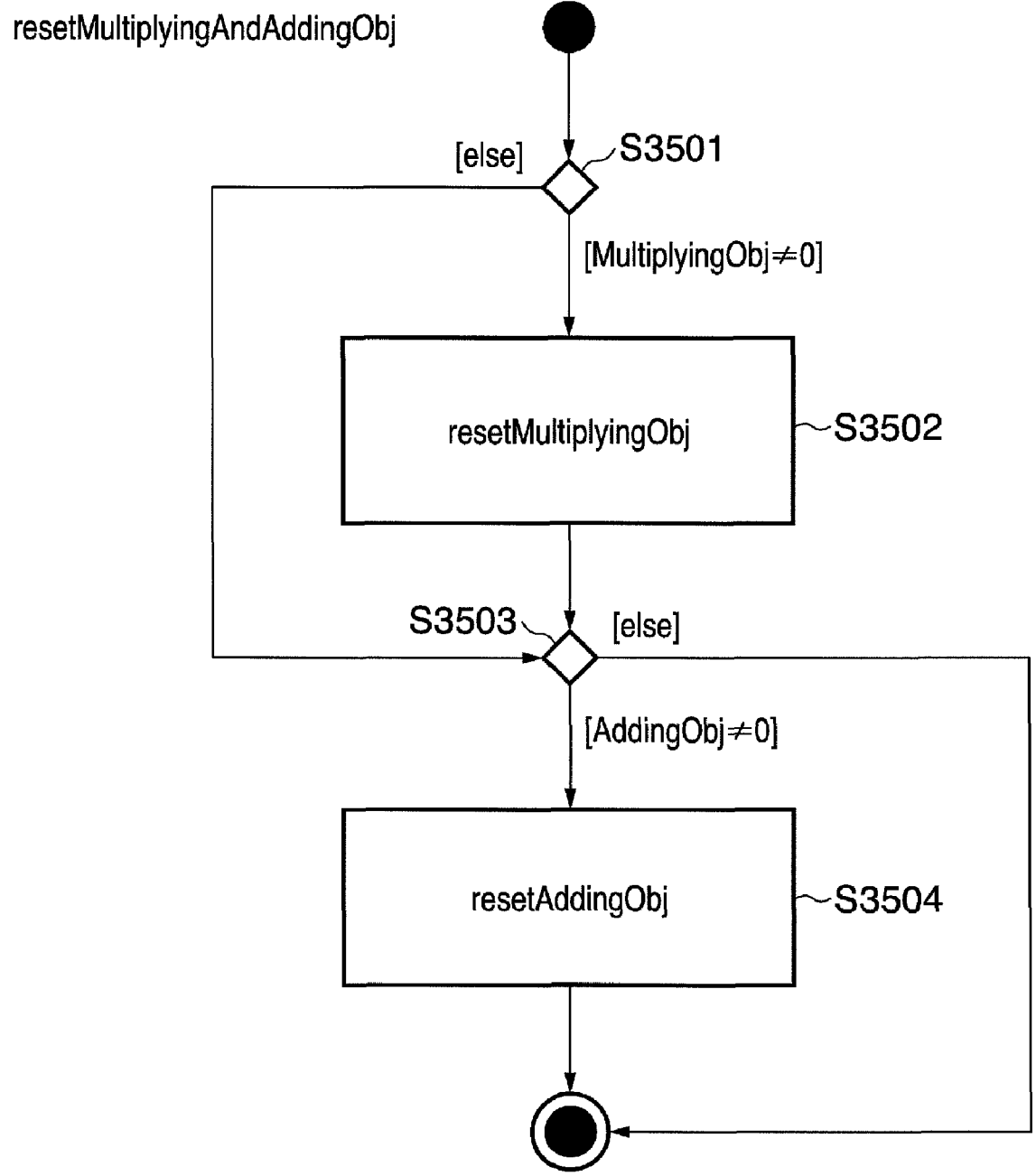
FIG. 35 shows processing to be executed by a method resetMultiplyingAndAddingObj of Array class.

FIG. 35 is an activity diagram of a method resetMultiplyingAndAddingObj used to reset the sum operation relation with an adding Array object and the product operation relation with a multiplying Array object.

If MultiplyingObj≠0 in step S3501, the process advances to step S3502; if MultiplyingObj=0, the process jumps to step S3503. In step S3502, the method resetMultiplyingObj is executed. If AddingObj≠0 in step S3503, the process advances to step S3504; if AddingObj=0, the process ends. In step S3504, the method resetAddingObj is executed.

Figure 36:
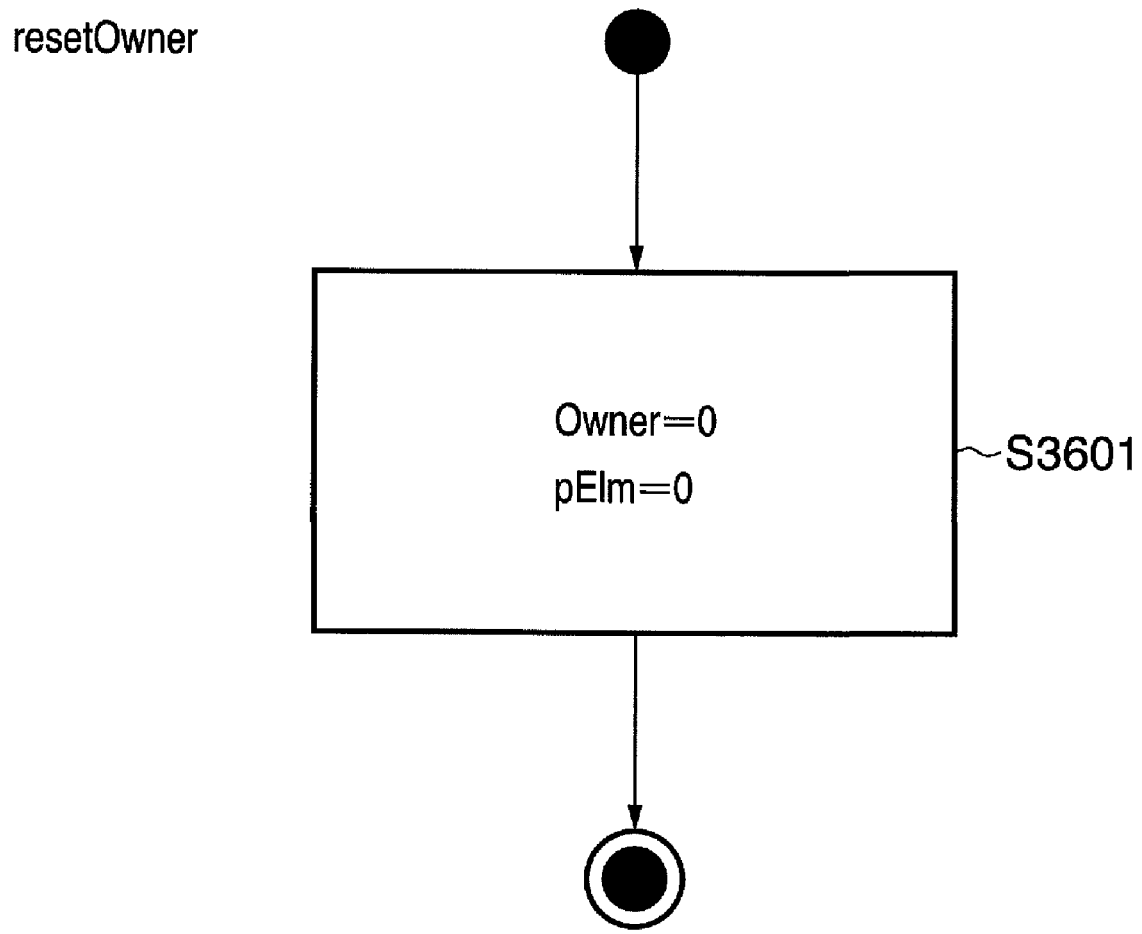
FIG. 36 shows processing to be executed by a method resetOwner of Array class.

FIG. 36 is an activity diagram of the method resetOwner which is called by a User object (User) to reset the relation between an Owner object (Owner) of array elements and the User object. In step S3601, "0" is set in Owner, and "0" is set in pElm.

Figure 37:
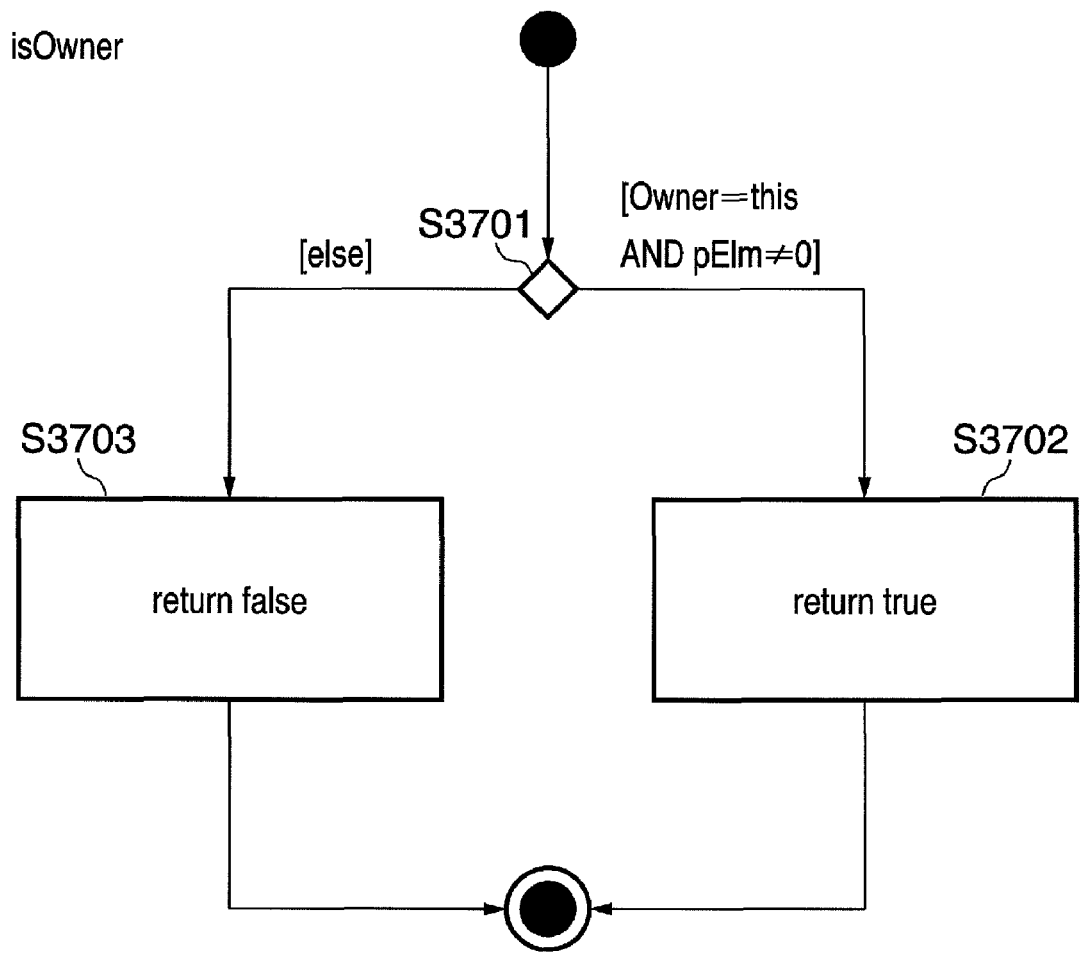
FIG. 37 shows processing to be executed by a method isOwner of Array class.

FIG. 37 is an activity diagram of a method isOwner used to check if the self object is an Owner object of array elements.

If Owner=this (the self object itself) and pElm≠0 in step S3701, the process advances to step S3702; otherwise, the process advances to step S3703. In step S3702, the process returns with a return value true. In step S3703, the process returns with a return value false.

Note that even when Owner=this, if pElm=0, the process returns with the return value false. In other words, isOwner( )=true means that the self object itself (this) is set as Owner, and has an array memory area, the size of which is larger than "0".

Figure 38:
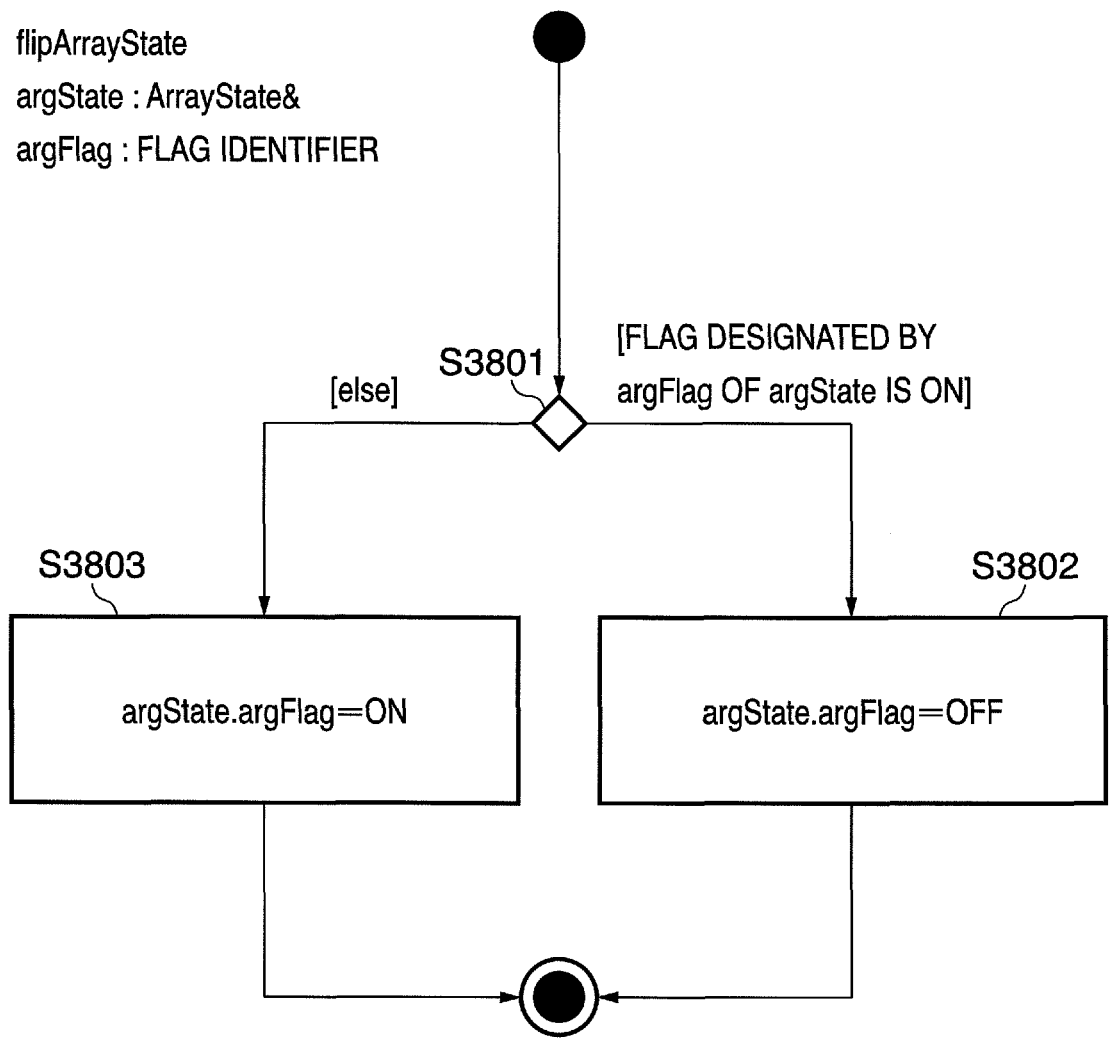
FIG. 38 shows processing to be executed by a method flipArrayState of Array class.

FIG. 38 is an activity diagram of the method flipArrayState used to invert a flag of a flag identifier designated from a flag group ArrayState that indicates the state of Array. Arguments of this method are a reference to an ArrayState type variable and a flag identifier (Transpose or MulReverse). This method inverts the designated flag of ArrayState.

If a flag of a flag identifier argFlag of an ArrayState type variable argState of the argument is ON in step S3801, the process advances to step S3802; otherwise, the process advances to step S3803. In step S3802, that flag is set to OFF. In step S3803, that flag is set to ON.

Figure 39:
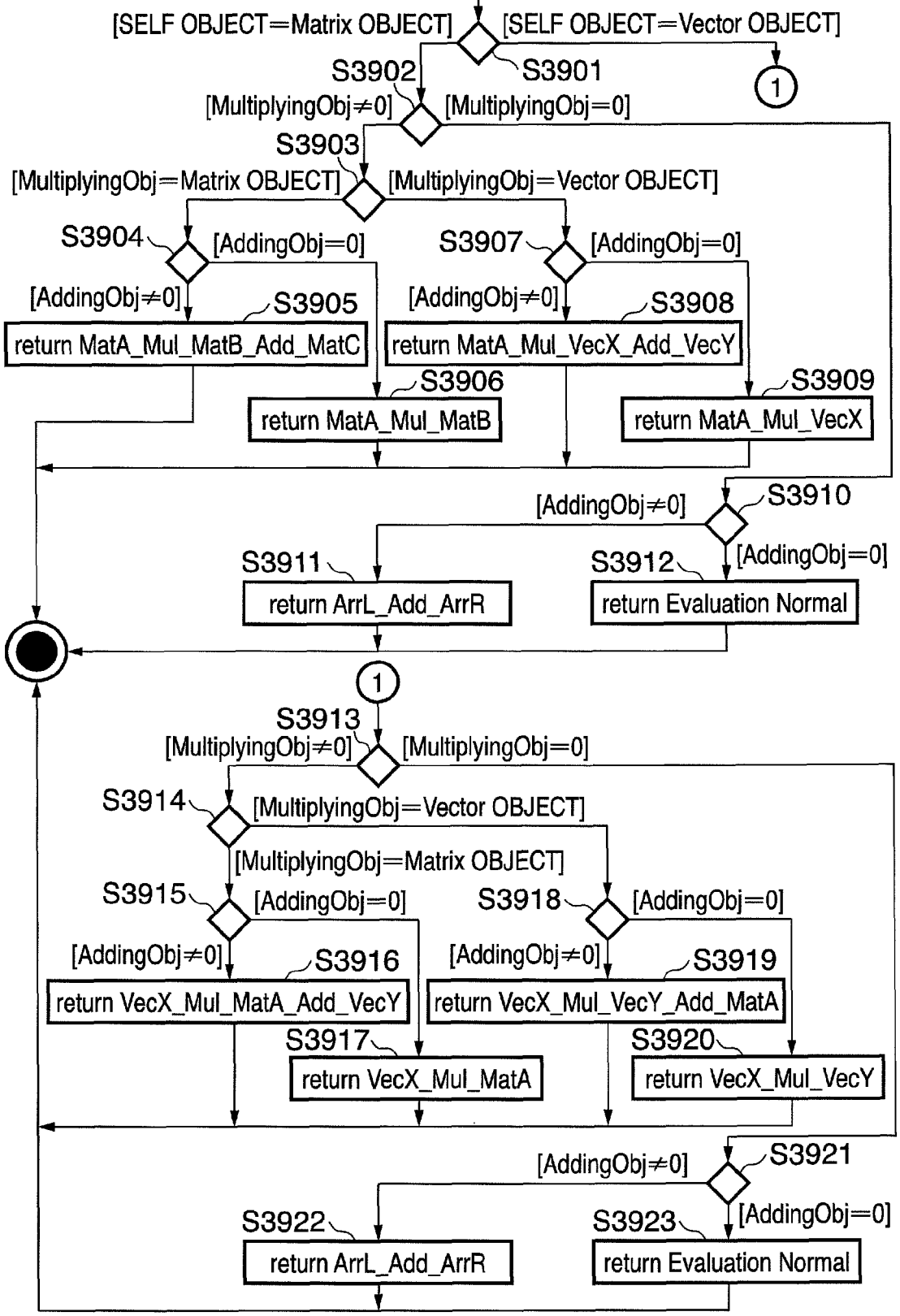
FIG. 39 shows processing to be executed by a method getEvaluationType of Array class.

FIG. 39 is an activity diagram of a method getEvaluationType used from evaluate so as to classify the type of calculation.

If the self object is a Matrix object in step S3901, the process advances to step S3902; otherwise (i.e., if it is a Vector object), the process jumps to step S3913. If MultiplyingObj≠0 in step S3902, the process advances to step S3903; if MultiplyingObj=0, the process jumps to step S3910.

If MultiplyingObj is a Matrix object in step S3903, the process advances to step S3904; otherwise, the process advances to step S3907. If AddingObj≠0 in step S3904, the process advances to step S3905 and returns with a return value MatA_Mul_MatB_Add_MatC; if AddingObj=0, the process advances to step S3906 and returns with a return value MatA_Mul_MatB.

If AddingObj≠0 in step S3907, the process advances to step S3908 and returns with a return value MatA_Mul_VecX_Add_VecY; if AddingObj =0, the process advances to step S3909 and returns with a return value MatA_Mul_VecX.

If AddingObj≠0 in step S3910, the process advances to step S3911 and returns with a return value ArrL_And_ArrR; if AddingObj=0, the process advances to step S3912 and returns with a return value EvaluationNormal. If MultiplyingObj≠0 in step S3913, the process advances to step S3914; if MultiplyingObj=0, the process jumps to step S3921.

If MultiplyingObj is a Matrix object in step S3914, the process advances to step S3915; otherwise, (i.e., if it is a Vector object), the process advances to step S3918. If AddingObj≠0 in step S3915, the process advances to step S3916 and returns with a return value VexX_Mul_MatA_Add_VecY; if AddingObj=0, the process advances to step S3917 and returns with a return value VecX_Mul_MatA.

If AddingObj≠0 in step S3918, the process advances to step S3919 and returns with a return value VecX_Mul_VecY_Add_MatA; if AddingObj=0, the process advances to step S3920 and returns with a return value VecX_Mul_VecY. If AddingObj≠0 in step S3921, the process advances to step S3922 and returns with a return value ArrL_Add_ArrR; if AddingObj=0, the process advances to step S3923 and returns with a return value EvaluationNormal.

Figure 40:
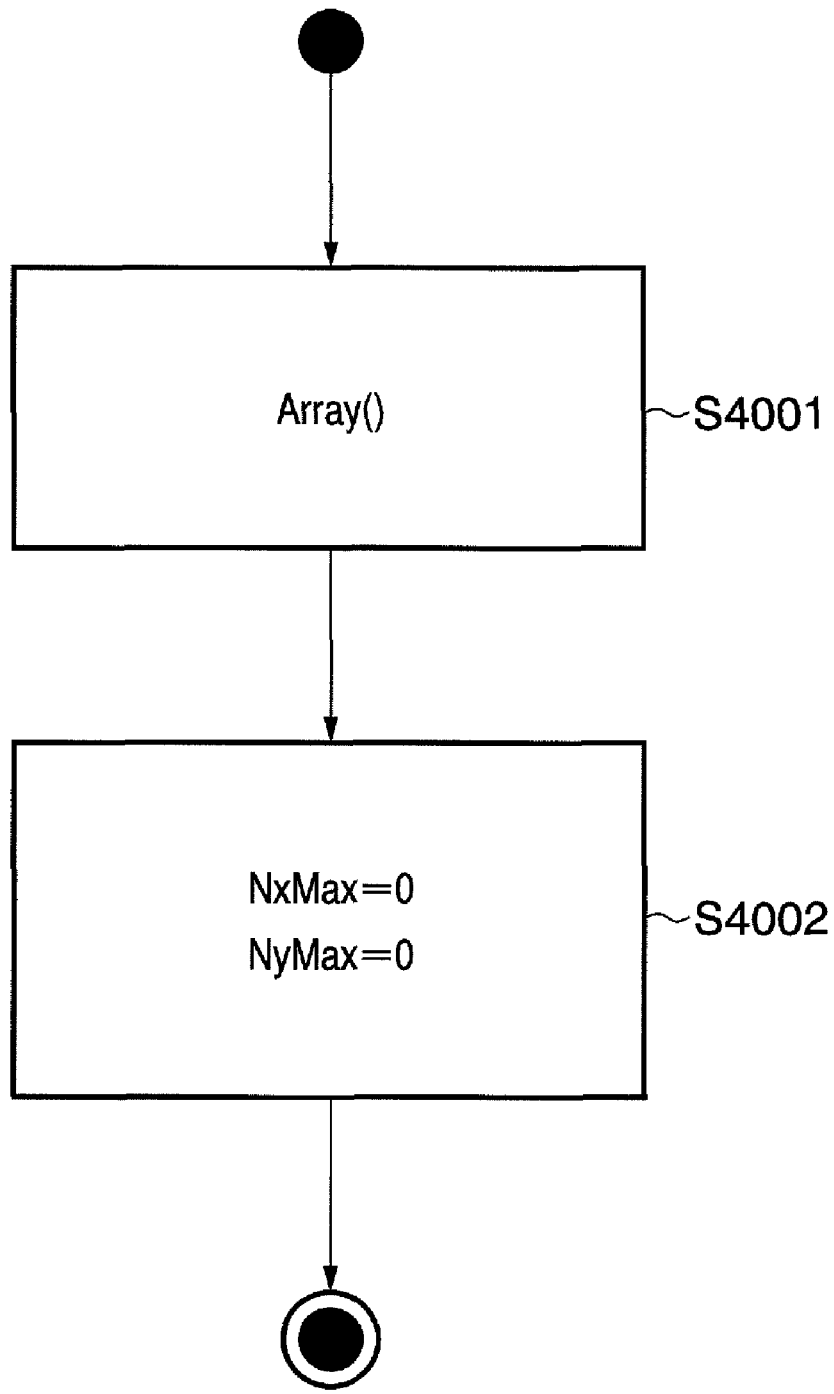
FIG. 40 shows processing to be executed by a default constructor of Matrix class.

FIG. 40 is an activity diagram of a default constructor of Matrix class.

In step S4001, a default constructor Array of base class is executed. In C++, since the constructor of base class is launched implicitly, such launching need not be described in a program. In step S4002, "0" is set in NxMax, and "0" is set in NyMax.

Figure 41:
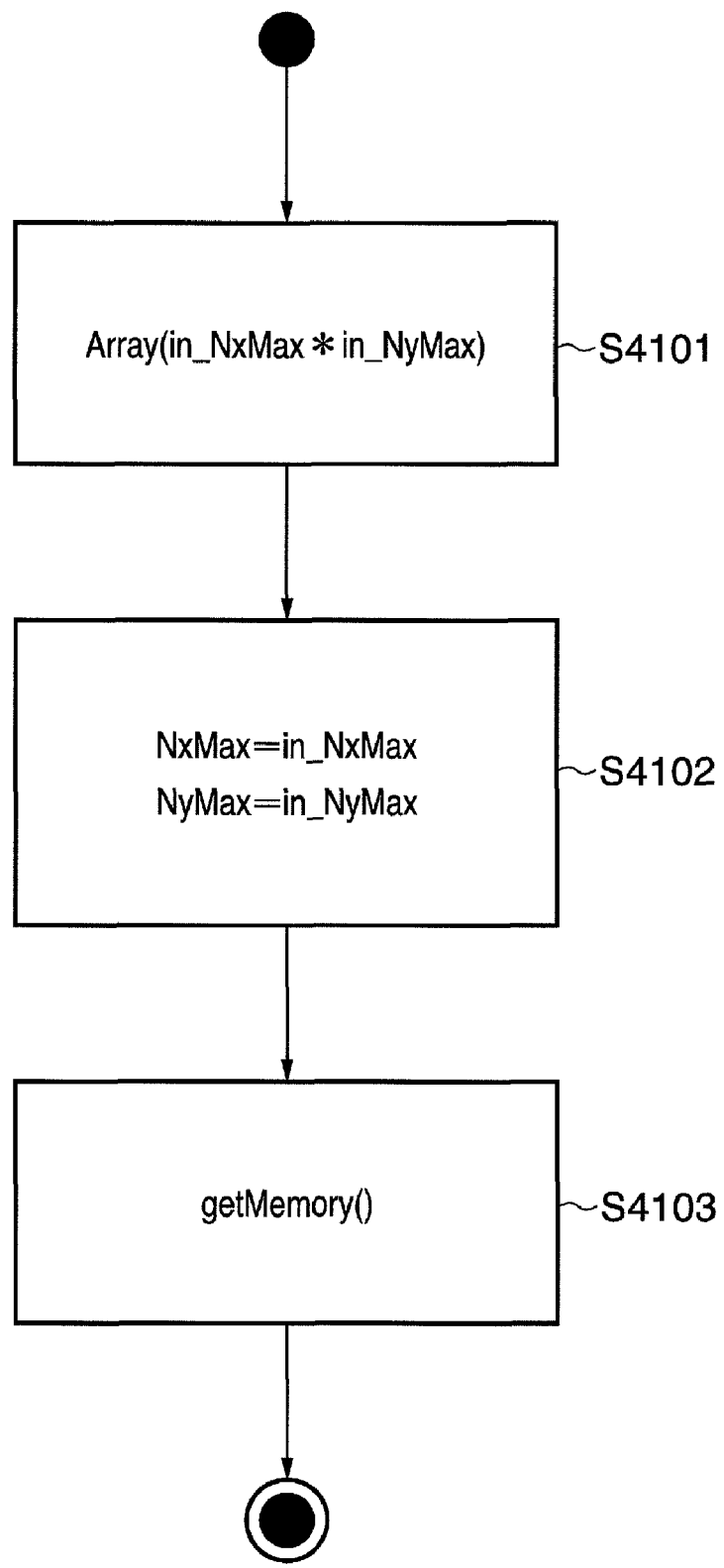
FIG. 41 shows processing to be executed by a constructor of Matrix class having two int type variables as arguments.

FIG. 41 is an activity diagram of a constructor of Matrix class, which has two integers in_NxMax and in_NyMax as arguments.

In step S4101, a constructor of base class is executed with an argument in_NxMax*in_NyMax. In step S4102, in_NxMax is set in NxMax, and in_NyMax is set in NyMax. In step S4103, the method getMemory is executed.

Figure 42:
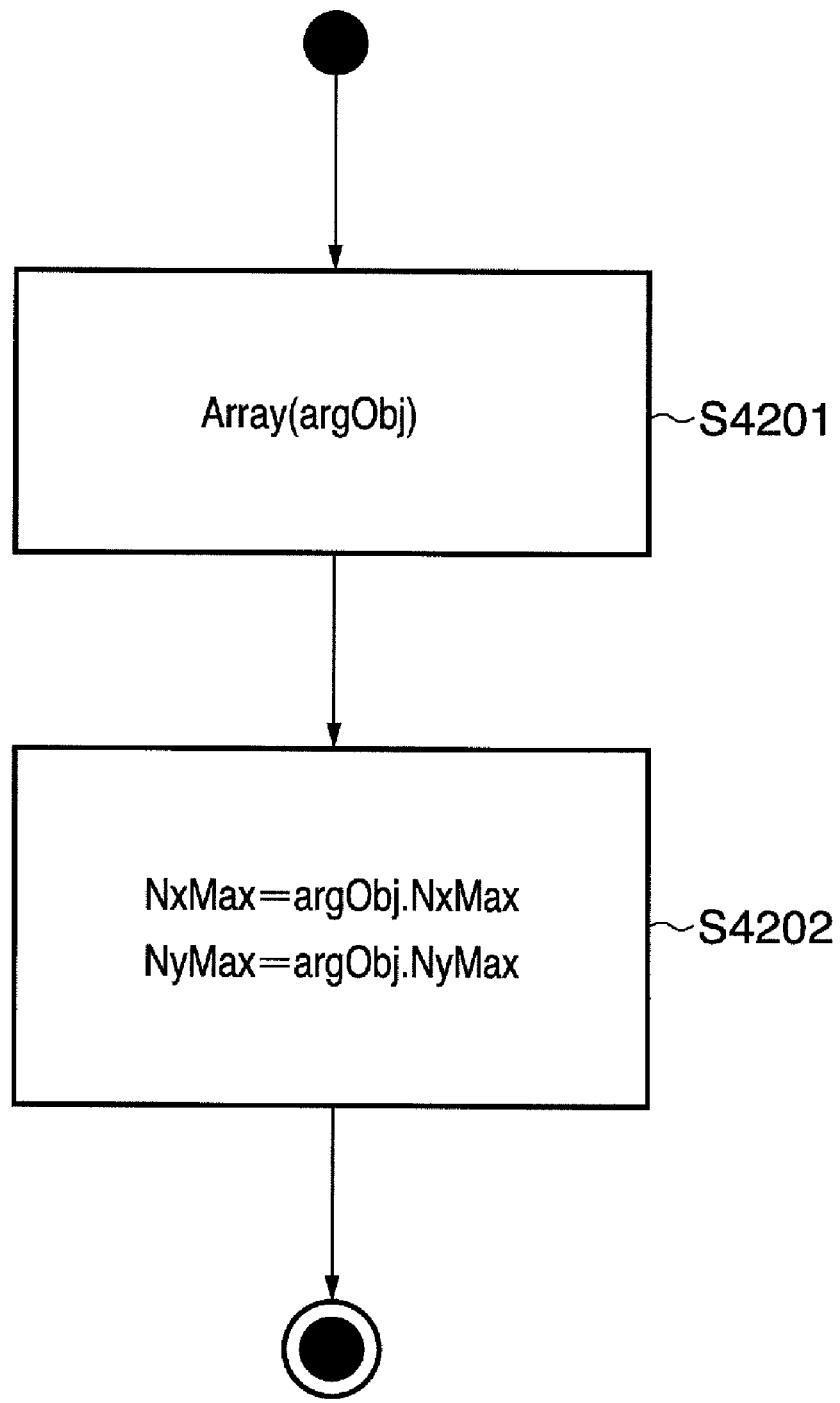
FIG. 42 shows processing to be executed by a constructor of Matrix class having a reference to a Matrix object as an argument.

FIG. 42 is an activity diagram of a constructor of Matrix class which has a reference to a Matrix object as an argument. In step S4201, the method copyArray is executed with an argument argObj. In step S4202, a member variable NxMax of argObj in NxMax, and a member variable NyMax of argObj is set in NyMax.

Figure 43:
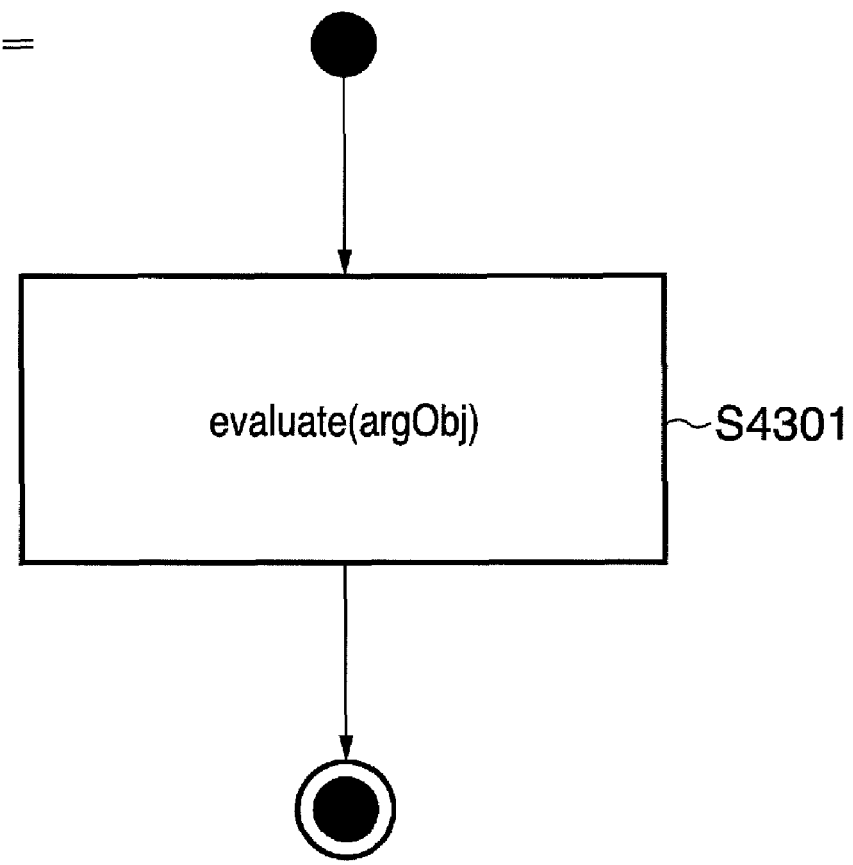
FIG. 43 shows processing to be executed by an = operator (substitute operator) of Matrix class.

FIG. 43 is an activity diagram of an = operator (substitute operator) used to execute "Matrix=Matrix". In step S4301, the method evaluate is executed with an argument argObj. The method evaluate evaluates argObj, and stores the evaluation result in the self object. Upon execution of this operator, the postponed evaluation (operation) is executed in practice.

Figure 44:
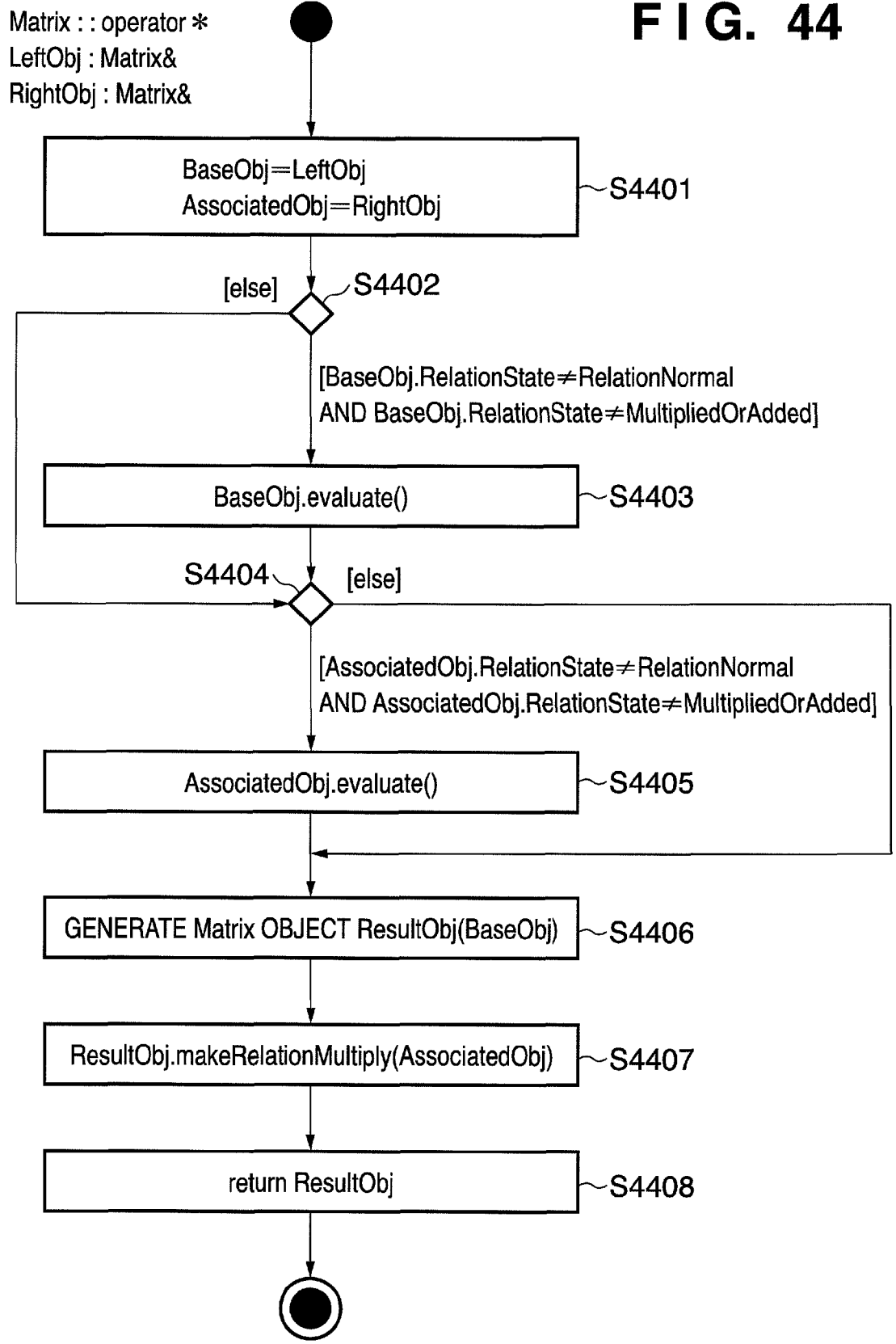
FIG. 44 shows processing to be executed by a * operator used to calculate "Matrix object*Matrix object".

FIG. 44 is an activity diagram of a * operator used to execute "Matrix*Matrix". Arguments of this operator are a left operand LeftMatrix and right operand RightMatrix of the * operator.

In step S4401, LeftMatrix is set in a reference BaseObj to a Matrix object, and RightMatrix is set in a reference AssociatedObj to another Matrix object. If RelationState of BaseObj is neither a value RelationNormal nor a value MultipliedOrAdded in step S4402, the process advances to step S4403; otherwise, the process jumps to step S4404.

In step S4403, the method evaluate is executed from BaseObj. If RelationState of Associatedobj is neither a value RelationNormal nor a value MultipliedOrAdded in step S4404, the process advances to step S4405; otherwise, the process jumps to step S4406.

In step S4405, the method evaluate is executed from AssociatedObj (generation by a copy constructor). In step S4406, a Matrix object ResultObj is generated with an argument BaseObj. In step S4407, the method makeRelationMultiply is executed from ResultObj with an argument AssociatedObj. In step S4408, the process returns with a return value ResultObj.

Figure 45:
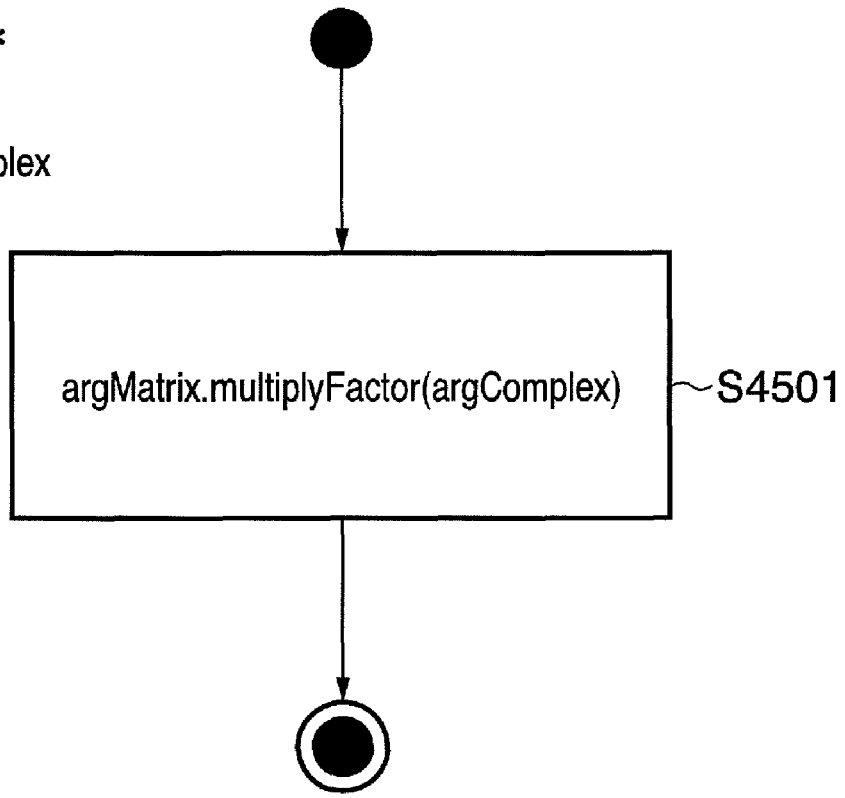
FIG. 45 shows processing to be executed by a * operator used to calculate "Complex object*Matrix object" or "Matrix object*Complex object".

FIG. 45 is an activity diagram of a * operator used to calculate "Complex*Matrix" or "Matrix*Complex". Arguments of this operator are a Complex object argComplex and a reference argMatrix to a Matrix object. In step S4501, the method multiplyFactor is executed from argMatrix with the argument argComplex.

Figure 46:
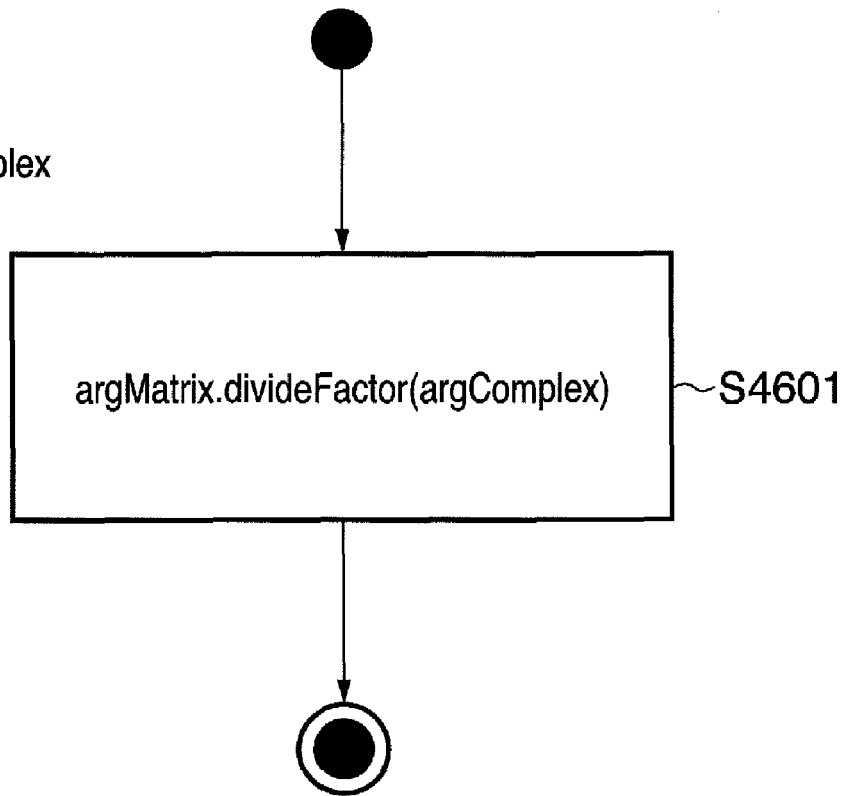
FIG. 46 shows processing to be executed by a / operator used to calculate "Matrix object/Complex object".

FIG. 46 is an activity diagram of a / operator used to execute "Matrix/Complex". Arguments of this operator are a Complex object argComplex and a reference argMatrix to a Matrix object. In step S4601, the method divideFactor is executed from argMatrix with the argument argComplex.

Figure 47:
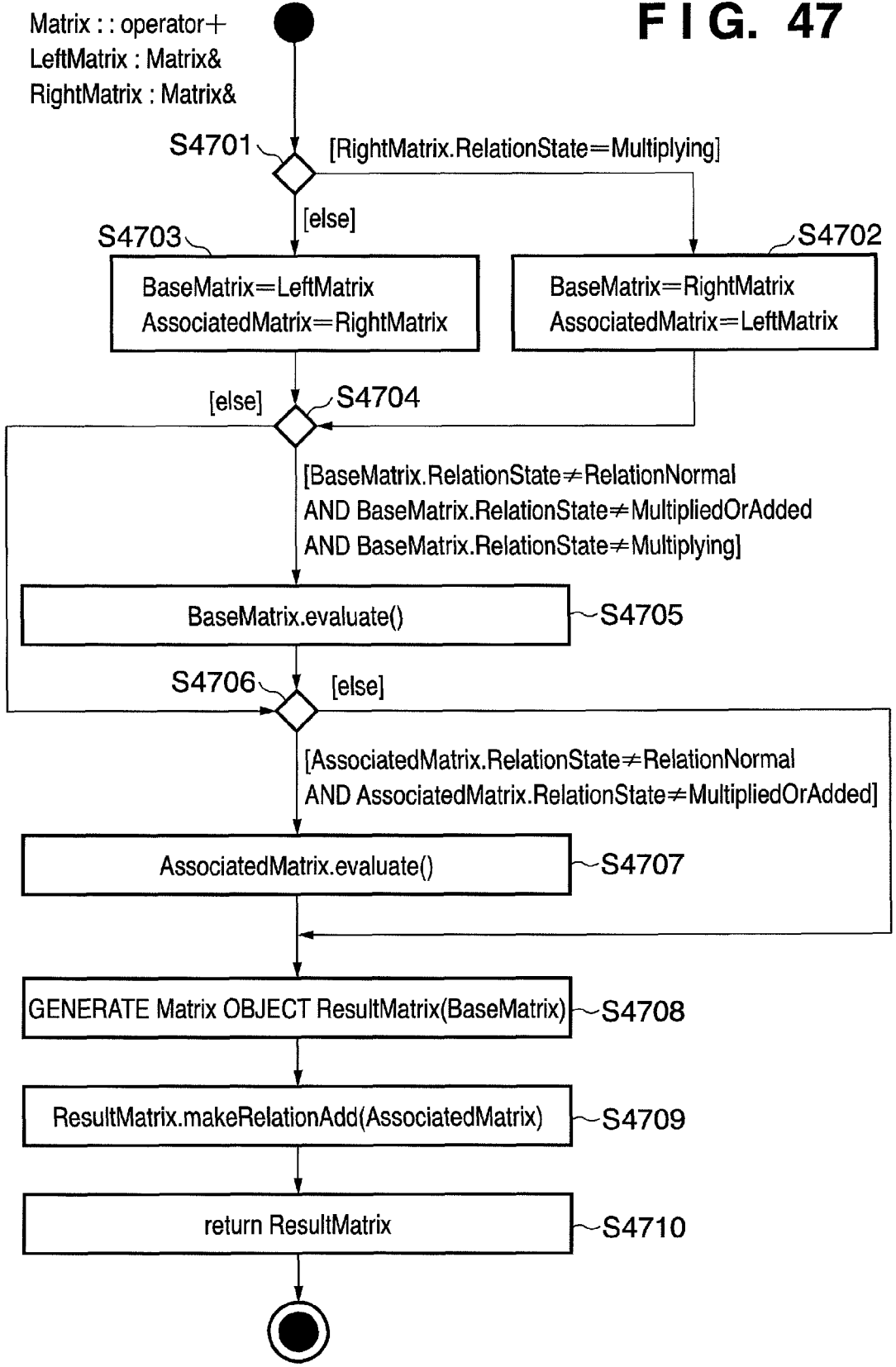
FIG. 47 shows processing to be executed by a + operator used to calculate "Matrix object+Matrix object".

FIG. 47 is an activity diagram of a + operator used to execute "Matrix+Matrix". Arguments of this operator are a left operand LeftMatrix and right operand RightMatrix of the + operator. LeftMatrix and RightMatrix are references to Matrix objects.

If RelationState of RightMatrix is a value Multiplying in step S4701, the process advances to step S4702; otherwise, the process advances to step S4703. In step S4702, RightMatrix is set in a reference BaseMatrix to a Matrix object, and LeftMatrix is set in a reference AssociatedMatrix to another Matrix object.

In step S4703, LeftMatrix is set in the reference BaseMatrix to a Matrix object, and. RightMatrix is set in the reference AssociatedMatrix to another Matrix object.

If RelationState of BaseMatrix is none of a value RelationNormal, a value MultipliedOrAdded, and a value Multiplying in step S4704, the process advances to step S4705; otherwise, the process jumps to step S4706.

In step S4705, the method evaluate is executed from BaseMatrix. If RelationState of AssociatedMatrix is neither a value RelationNormal nor a value MultipliedOrAdded in step S4706, the process advances to step S4707; otherwise, the process jumps to step S4708.

In step S4707, the method evaluate is executed from AssociatedMatrix. In step S4708, a Matrix object ResultMatrix is generated with an argument BaseMatrix. In step S4709, the method makeRelationAdd is executed from ResultMatrix with an argument AssociatedMatrix. In step S4710, the process returns with a return value ResultMatrix.

Figure 48:
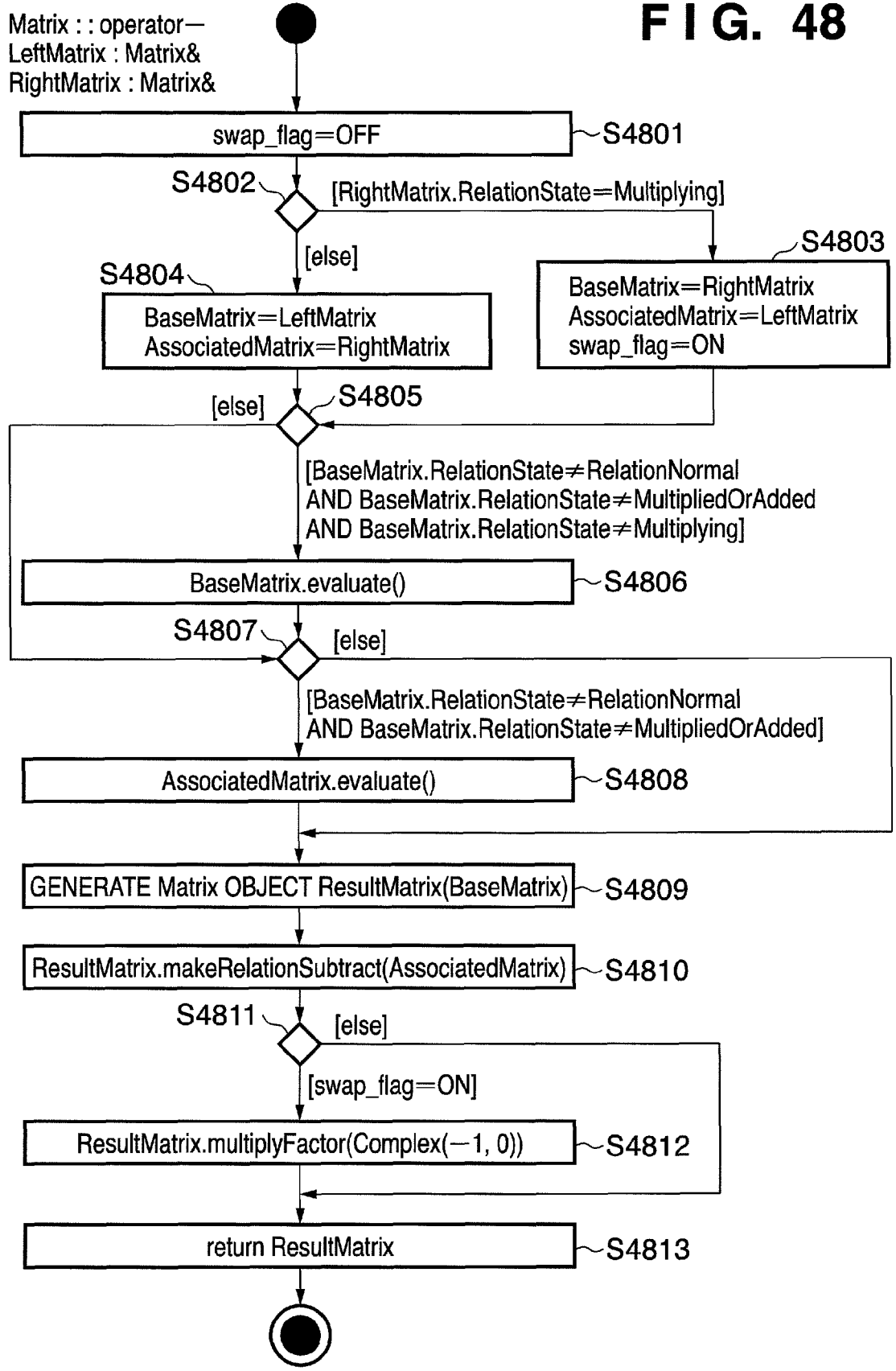
FIG. 48 shows processing to be executed by a − operator used to calculate "Matrix object−Matrix object".

FIG. 48 is an activity diagram of a − operator used to execute "Matrix−Matrix". Arguments of this operator are a left operand LeftMatrix and right operand RightMatrix of the − operator. LeftMatrix and RightMatrix are references to Matrix objects.

In step S4801, a swap flag (swap_flag) is reset to OFF. If RelationState of RightMatrix is a value Multiplying in step S4802, the process advances to step S4803; otherwise, the process advances to step S4804.

In step S4803, RightMatrix is set in BaseMatrix, LeftMatrix is set in AssociatedMatrix, and ON is set in swap_flag. In step S4804, LeftMatrix is set in the reference BaseMatrix to a Matrix object, and RightMatrix is set in the reference AssociatedMatrix to another Matrix object.

If RelationState of BaseMatrix is none of a value RelationNormal, a value MultipliedOrAdded, and a value Multiplying in step S4805, the process advances to step S4806; otherwise, the process jumps to step S4807. In step S4806, the method evaluate is executed from BaseMatrix. If RelationState of AssociatedMatrix is neither a value RelationNormal nor a value MultipliedOrAdded in step S4807, the process advances to step S4808; otherwise, the process jumps to step S4809.

In step S4808, the method evaluate is executed from AssociatedMatrix. In step S4809, a Matrix object ResultMatrix is generated with an argument BaseMatrix. In step S4810, the method makeRelationSubtract is executed from ResultMatrix with an argument AssociatedMatrix. If the swap flag is ON in step S4811, the process advances to step S4812; otherwise, the process jumps to step S4813.

In step S4812, the method multiplyFactor is executed from ResultMatrix with an argument Complex (−1, 0). This argument is required since the right and left operands of a subtraction are replaced. For example, an operation $\beta C - \alpha A*B$ is processed as $\alpha A*B - \beta C$ and the result is multiplied by −1. In step S4813, the process returns with a return value ResultMatrix.

Figure 49:
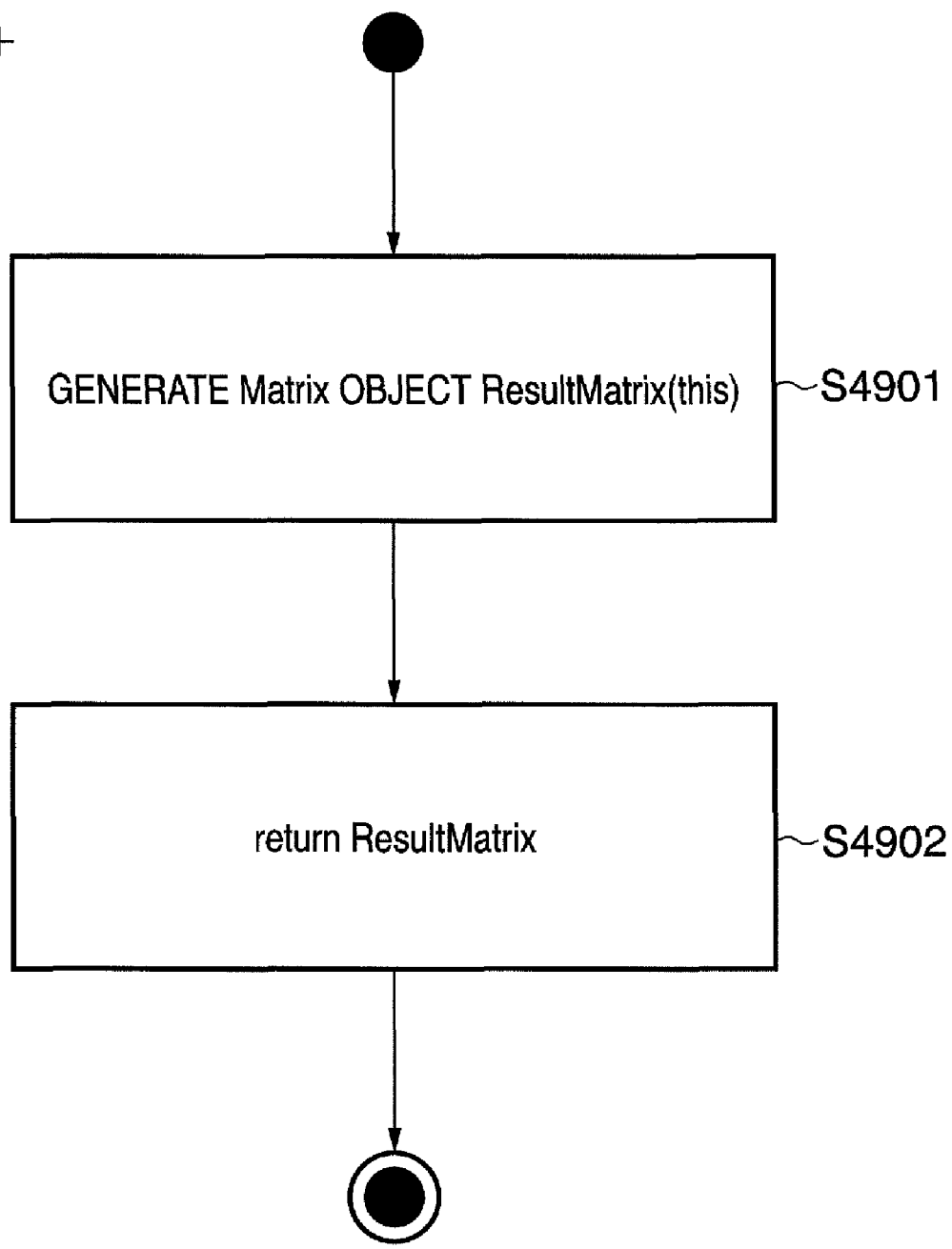
FIG. 49 shows processing to be executed by a + unary operator of Matrix class.

FIG. 49 is an activity diagram of a + unary operator of Matrix class. In step S4901, a Matrix object ResultMatrix is generated with an argument this. In step S4902, the process returns with a return value ResultMatrix.

Figure 50:
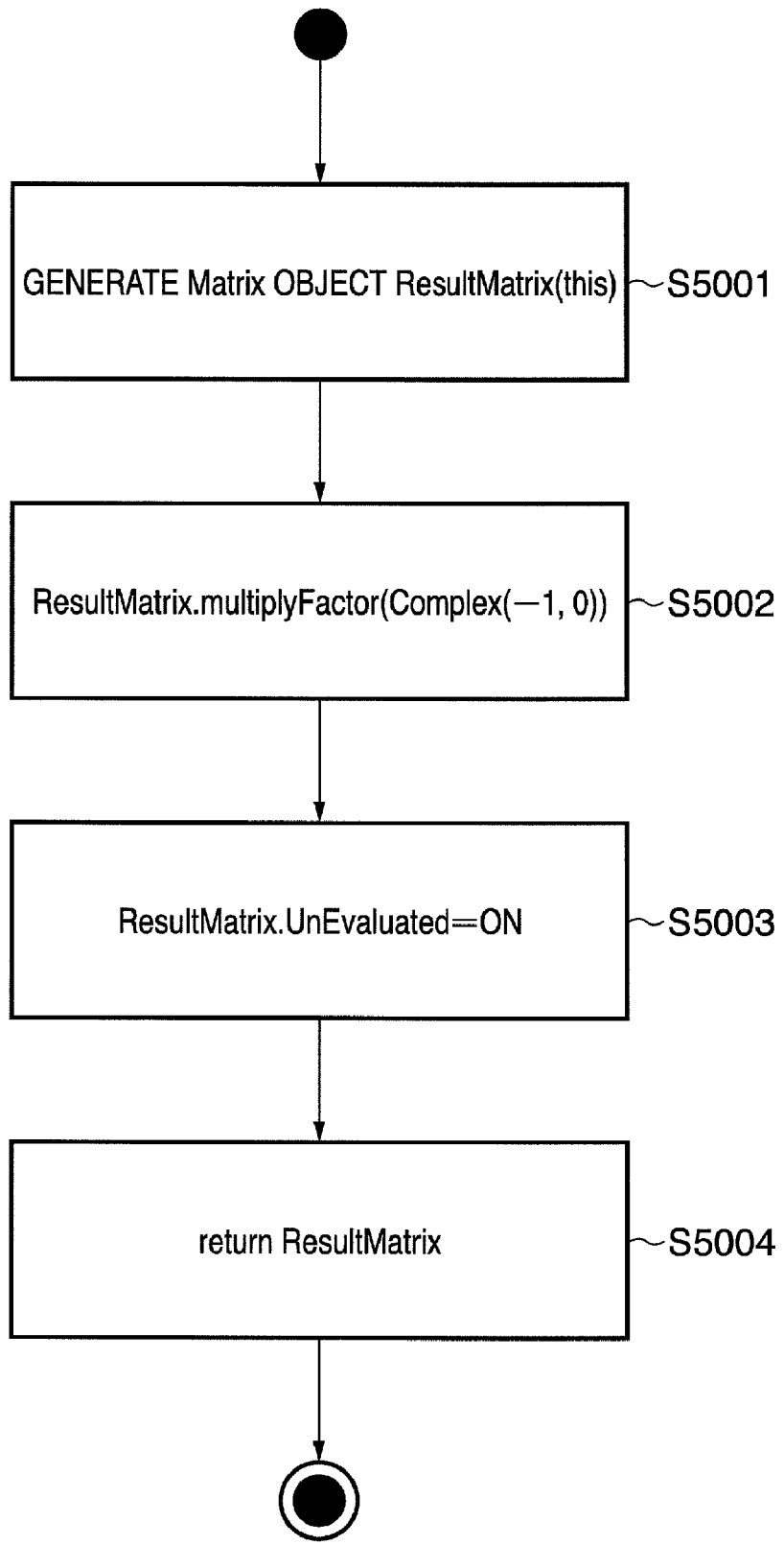
FIG. 50 shows processing to be executed by a − unary operator of Matrix class.

FIG. 50 is an activity diagram of a − unary operator of Matrix class.

In step S5001, a Matrix object ResultMatrix is generated with an argument this. In step S5002, a method multiplyFactor is executed from ResultMatrix with an argument Complex (−1, 0). In step S5003, UnEvaluated of ResultMatrix is set to ON. In step S5004, the process returns with a return value ResultMatrix.

FIG. 51 is an activity diagram of a function Trans used to convert a Matrix object into a Hermitian conjugate. In step S5101, a Matrix object ResultMatrix is generated with an argument this. In step S5102, the method makeTransposeThis is executed from ResultMatrix. In step S5103, the process returns with a return value ResultMatrix.

Figure 52:
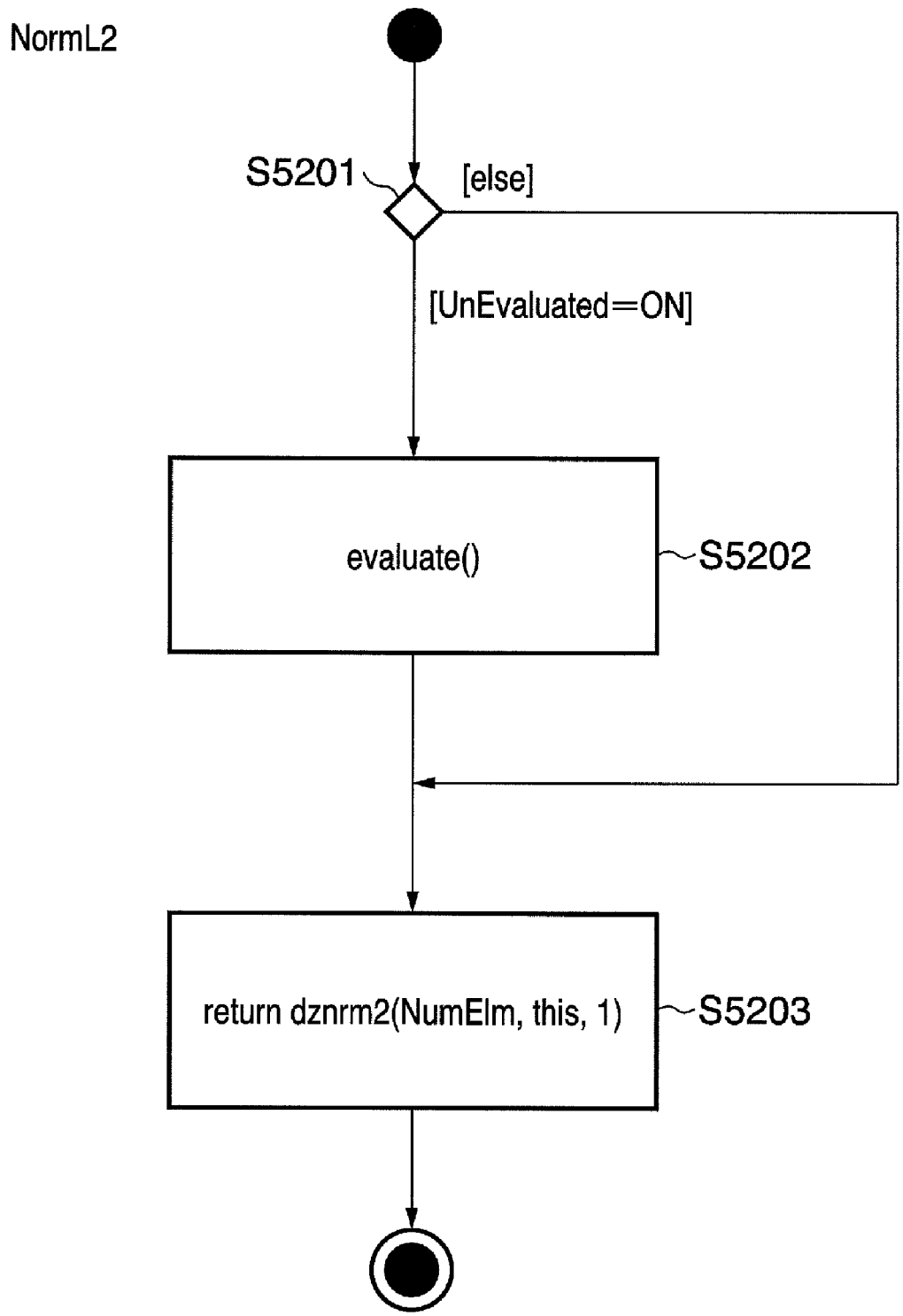
FIG. 52 shows processing to be executed by a method NormL2 of Matrix class.
Figure 53:
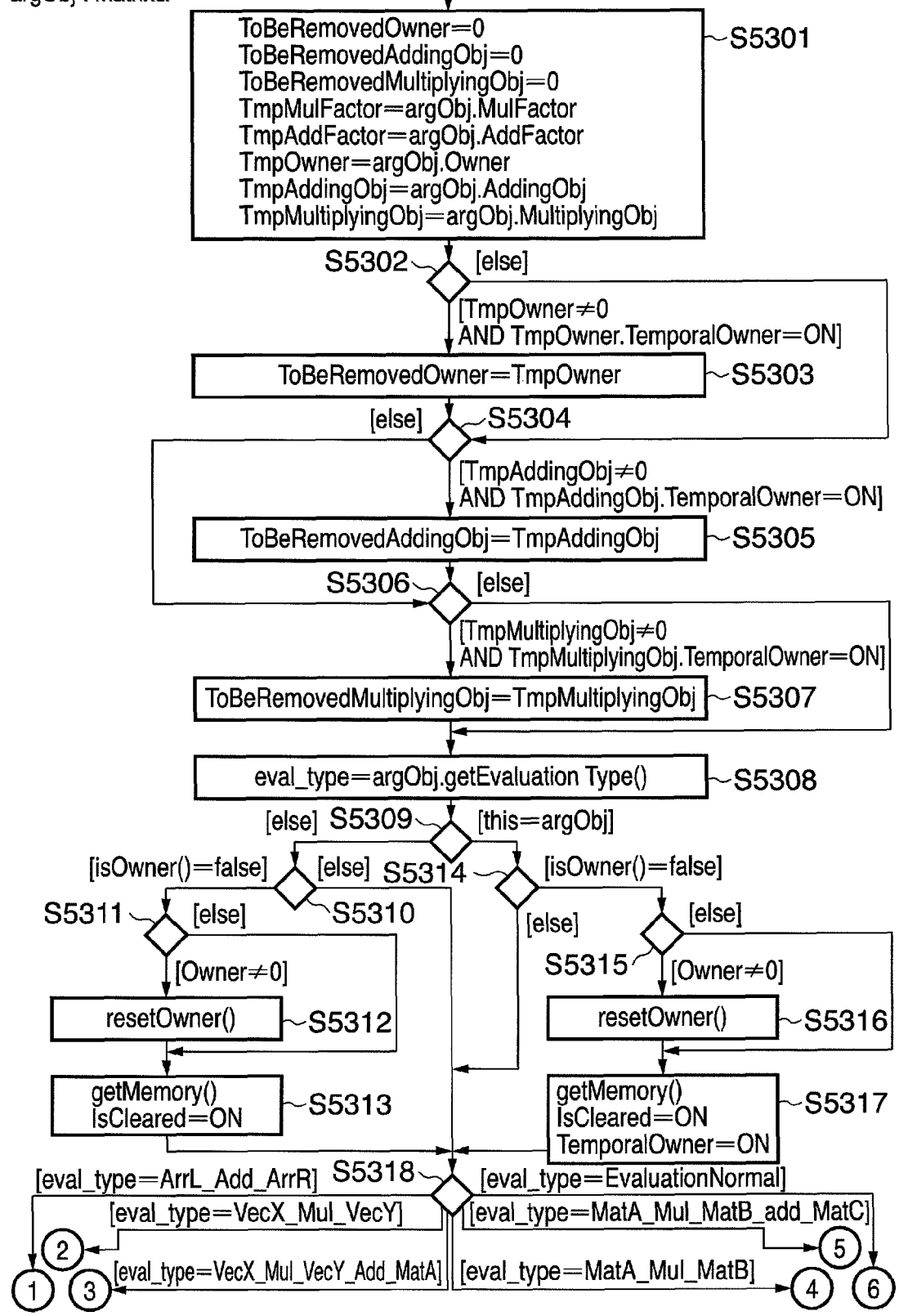
FIG. 53 shows processing to be executed by a method evaluate of Matrix class having a reference to a Matrix object as an argument.
Figure 54:
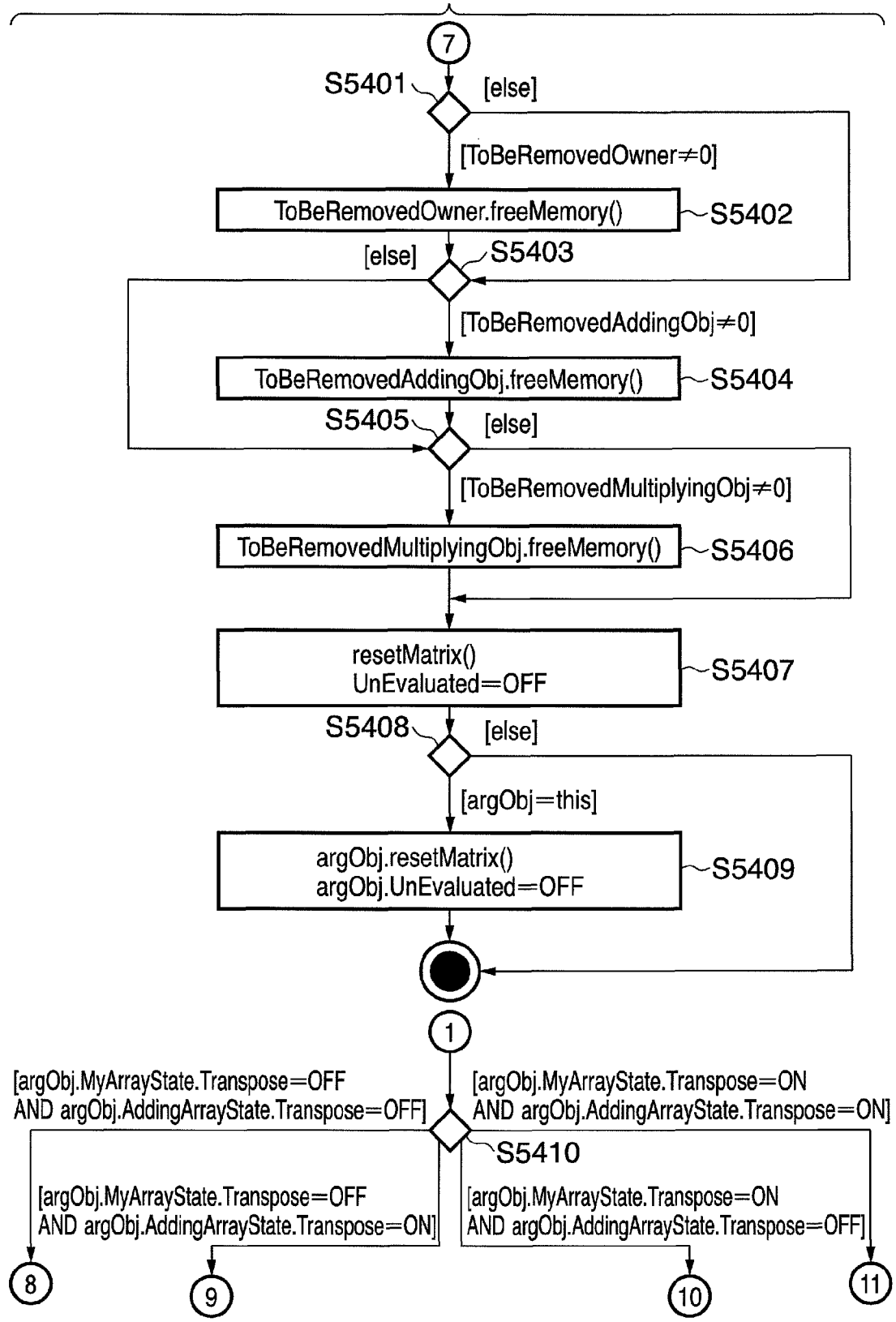
FIG. 54 shows processing to be executed by the method evaluate of Matrix class having a reference to a Matrix object as an argument.
Figure 55A:
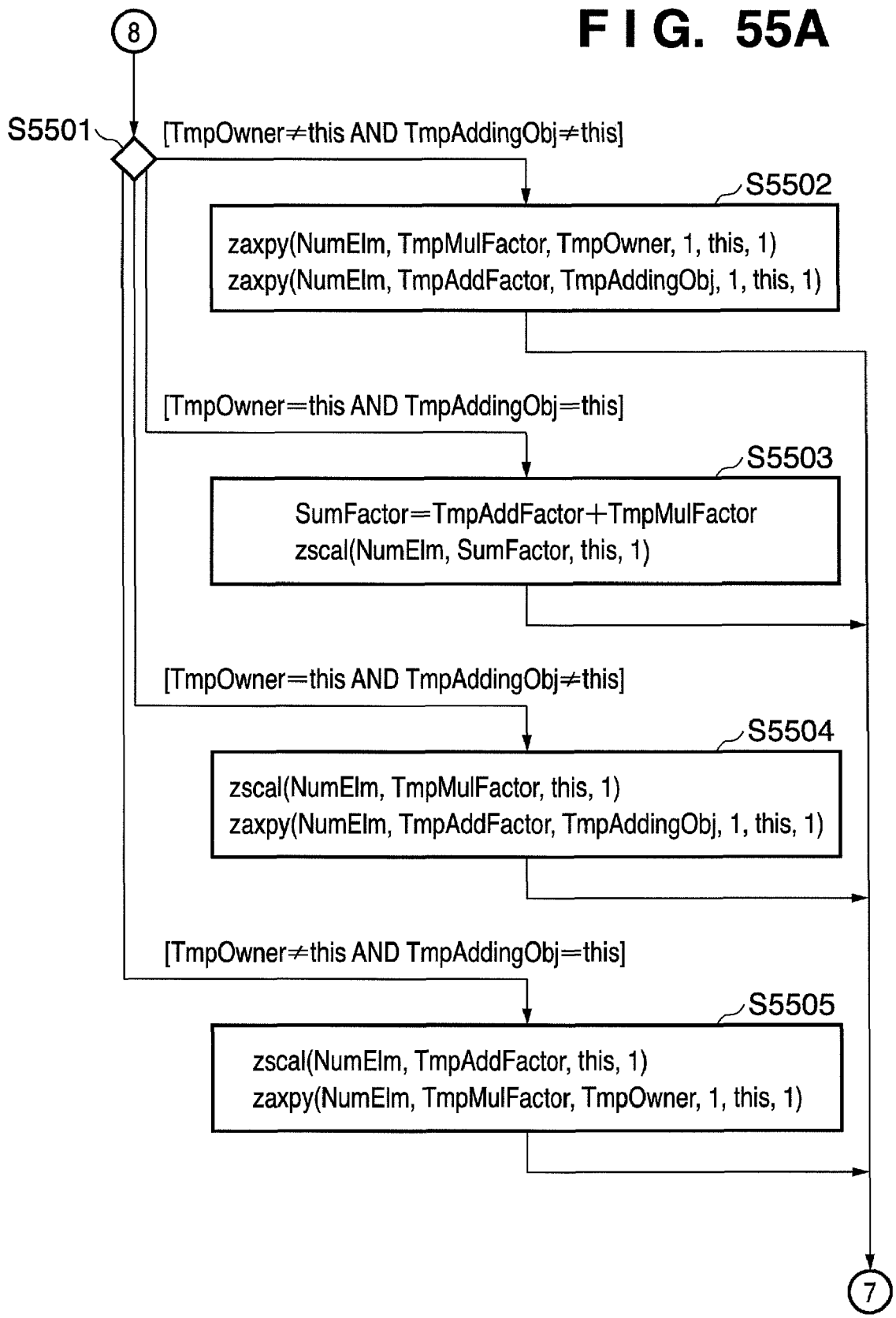
FIGS. 55A and 55B show processing to be executed by the method evaluate of Matrix class having a reference to a Matrix object as an argument.
Figure 55B:
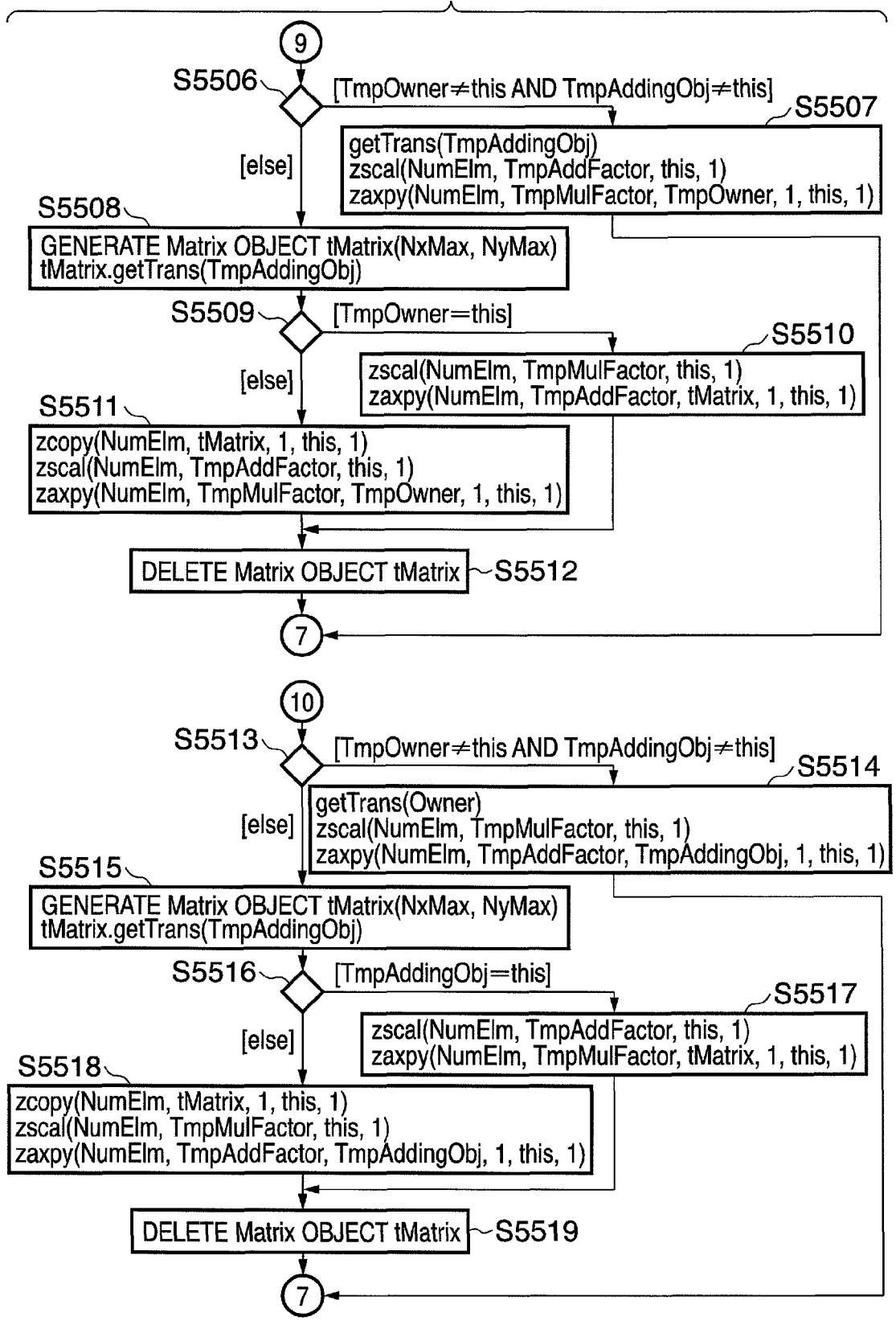
Figure 56:
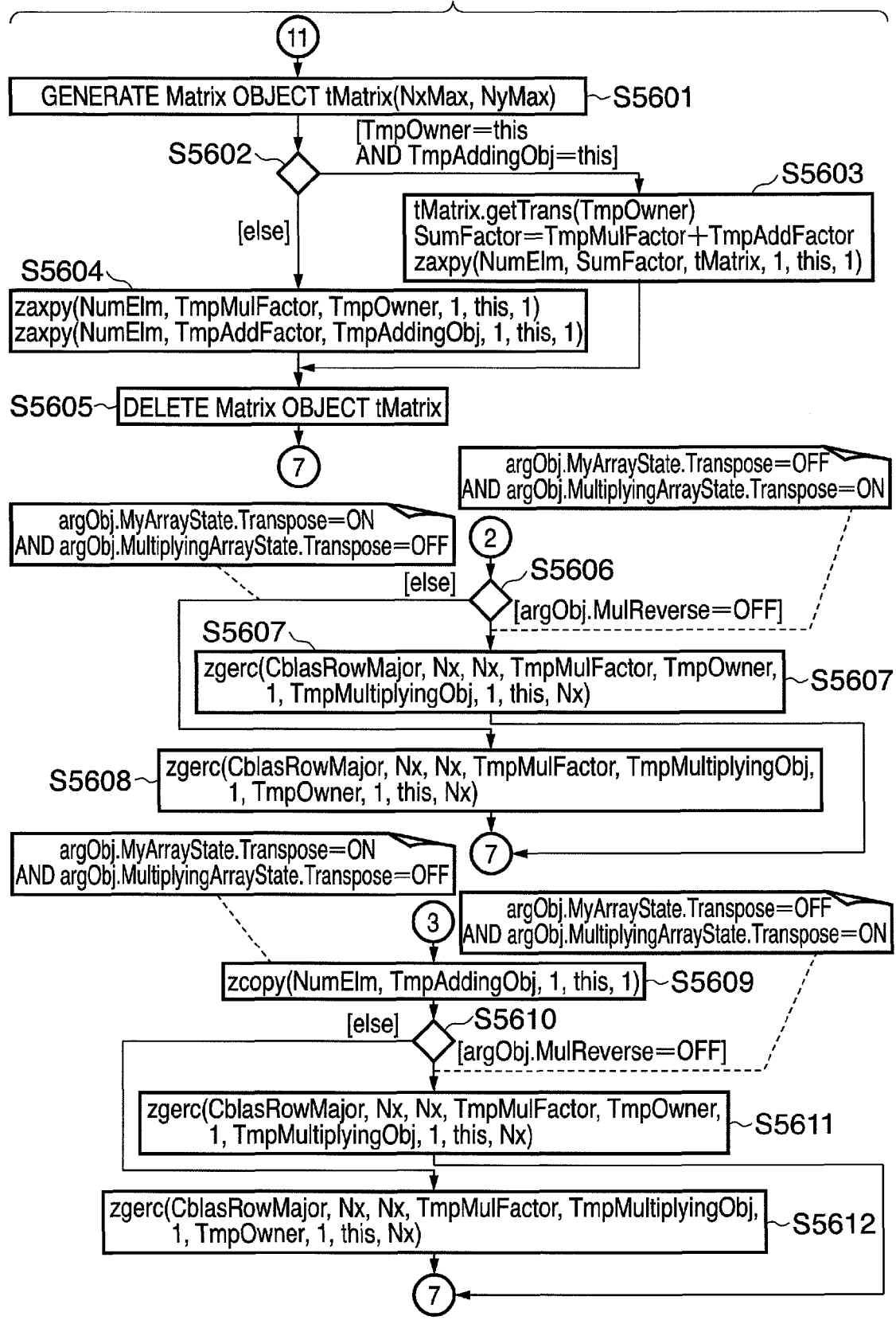
FIG. 56 shows processing to be executed by the method evaluate of Matrix class having a reference to a Matrix object as an argument.
Figure 58:
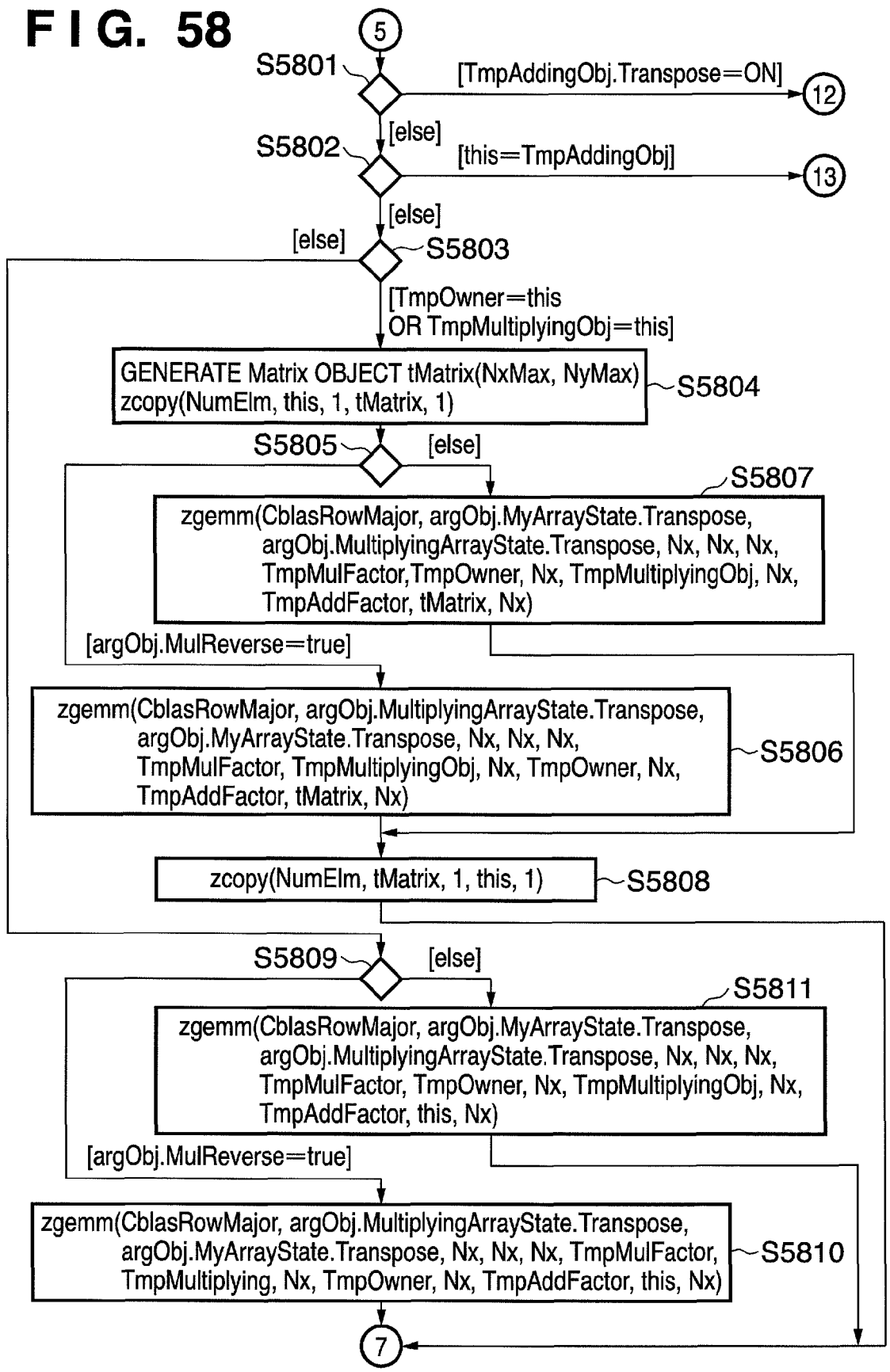
FIG. 58 shows processing to be executed by the method evaluate of Matrix class having a reference to a Matrix object as an argument.
Figure 59:
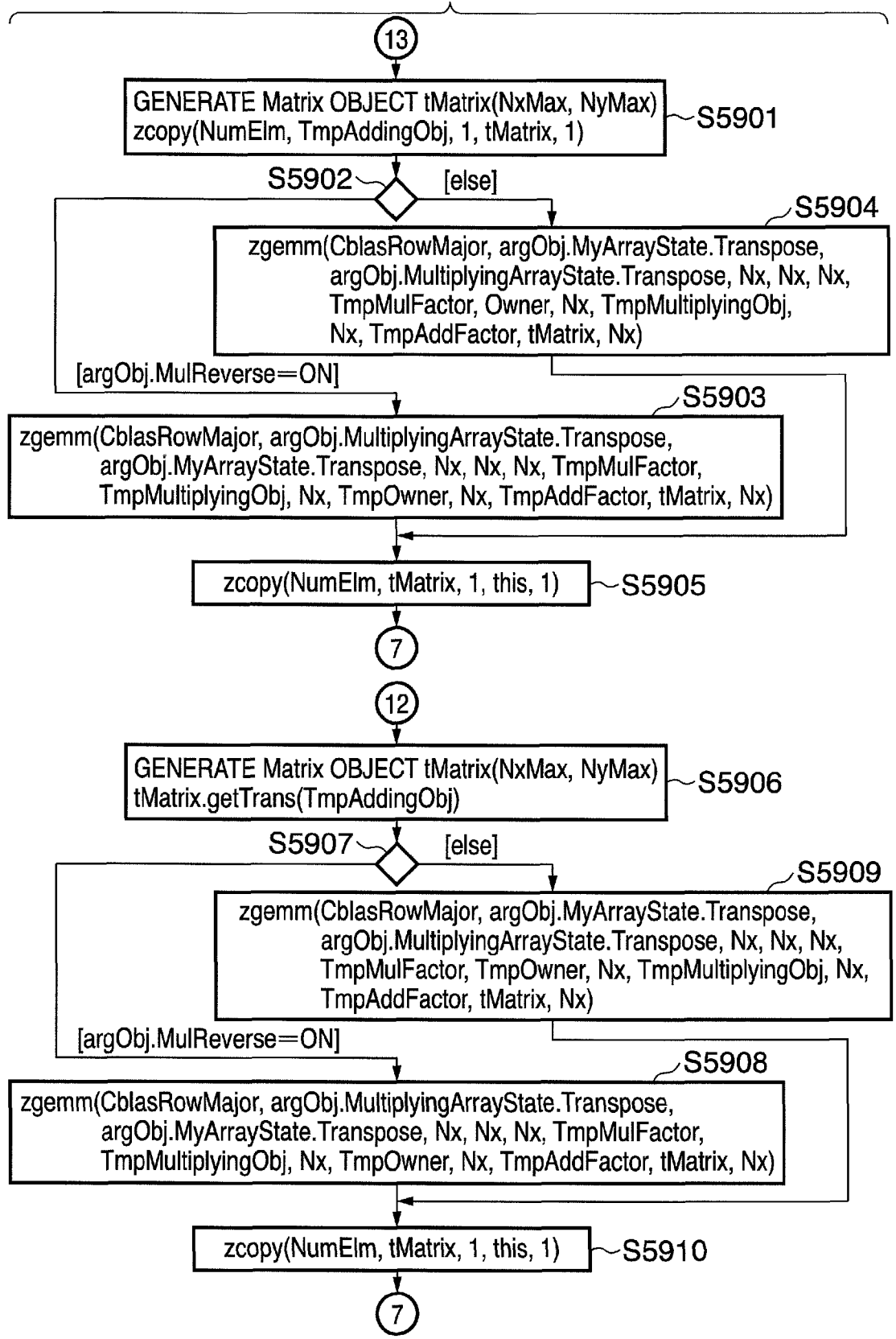
FIG. 59 shows processing to be executed by the method evaluate of Matrix class having a reference to a Matrix object as an argument.
Figure 60:
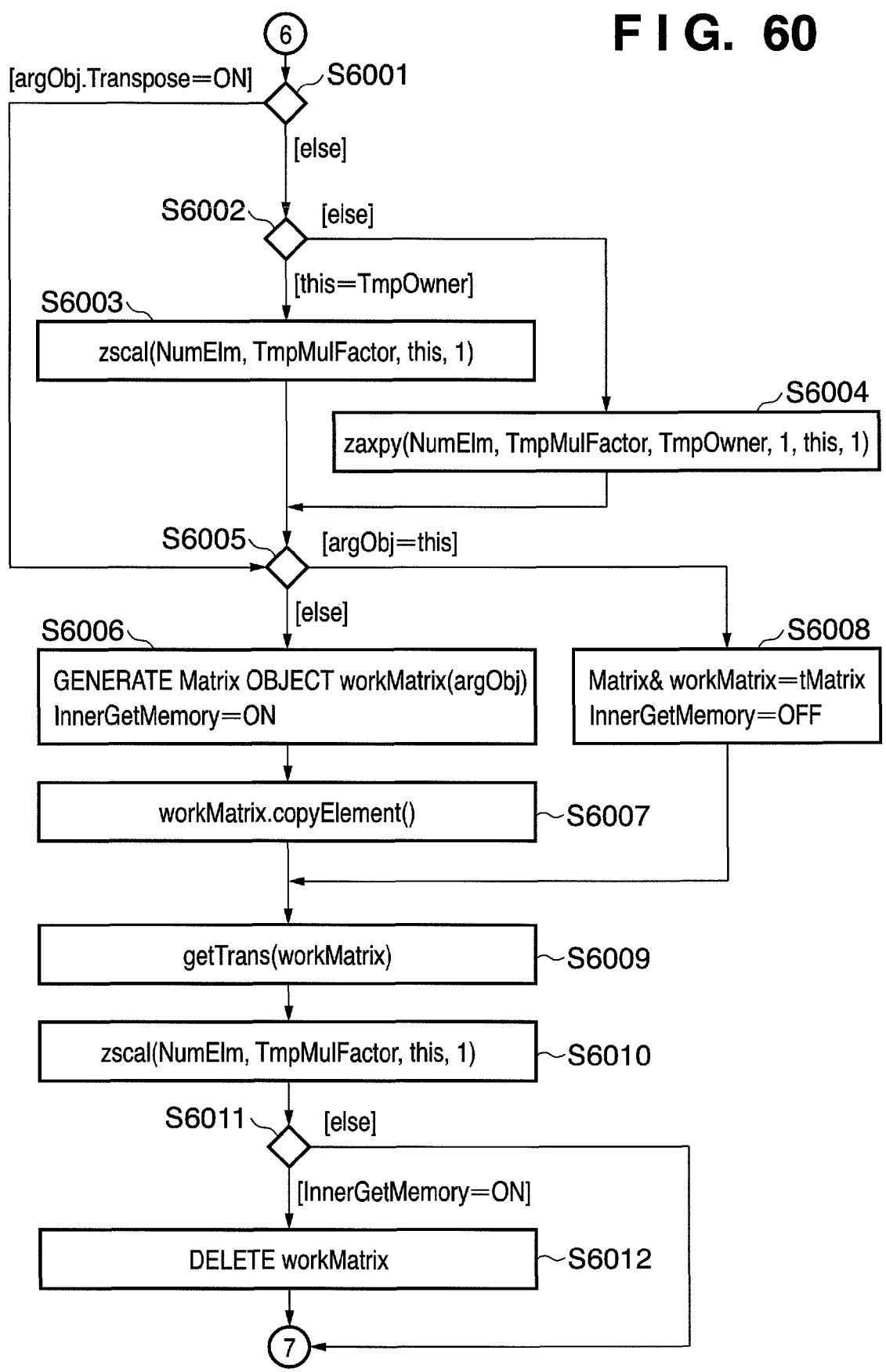
FIG. 60 shows processing to be executed by the method evaluate of Matrix class having a reference to a Matrix object as an argument.

FIG. 52 is an activity diagram of a method NormL2 used to calculate an L2 norm of a Matrix object.

If UnEvaluated is ON in step S5201, the process advances to step S5202; otherwise, the process jumps to step S5203. In step S5202, the method evaluate is executed. In step S5203, a BLAS function dznrm2 is called with arguments (NumElm, this, 1), and the process returns with its return value. Assume that "this" as an argument passed to the BLAS function is a member variable pElm of this in practice. In other words, the argument this is an abbreviation for this.pElm. In the following description, when an Array object (including a Matrix object and Vector object) is designated as an argument of a BLAS function, the member variable pElm of that object is designated in practice.

FIGS. 53 to 60 are activity diagrams of the method evaluate used to execute the postponed calculation of a Matrix object. An argument of this method is a reference argObj to a Matrix object.

In step S5301, "0" is set in ToBeRemovedOwner, "0" is set in ToBeRemovedAddingObj, and "0" is set in ToBeRemovedMultiplyingObj. Note that ToBeRemovedOwner, ToBeRemovedAddingObj, and ToBeRemovedMultiplyingObj are references to Array objects. Also, MulFactor of argObj is set in a Complex object TmpMulFactor, AddFactor of argObj is set in a Complex object TmpAddFactor, and Owner of argObj is set in a reference TmpOwner to an Array object. Furthermore, AddingObj of argObj is set in a reference TmpAddingObj to an Array object, and MultiplyingObj of argObj is set in a reference TmpMultiplyingObj to an Array object.

If TmpOwner is not "0" and TemporalOwner of Owner is ON in step S5302, the process advances to step S5303; otherwise, the process jumps to step S5304. In step S5303, Tmpowner is set in ToBeRemovedOwner. If TmpAddingObj is not "0" and TemporalOwner of TmpAddingObj is ON in step S5304, the process advances to step S5305; otherwise, the process jumps to step S5306.

In step S5305, TmpAddingObj is set in ToBeRemovedAddingObj. If TmpMultiplyingObj is not "0" and TemporalOwner of TmpMultiplyingObj is ON in step S5306, the process advances to step S5307; otherwise, the process jumps to step S5308. In step S5307, TmpMultiplyingObj is set in ToBeRemovedMultiplyingObj. In step S5308, the method getEvaluationType is executed from the object argObj to set its return value in eval_type.

If the self object this matches the object argObj in step S5309, the process advances to step S5314; otherwise, the process advances to step S5310. Note that "two objects match" means that two objects indicate an identical entity or member variables of the two objects are stored in an identical memory area.

If a return value of the method isOwner is false in step S5310, the process advances to step S5311; otherwise, the process jumps to step S5318. If TmpOwner≠0 in step S5311, the process advances to step S5312; if TmpOwner=0, the process jumps to step S5313. In step S5312, the method resetOwner is executed from the self object.

In step S5313, the method getMemory is executed, and a flag IsCleared is set to ON. If the return value of the method isOwner is false in step S5314, the process advances to step S5315; otherwise, the process advances to step S5318. If TmpOwner≠0 in step S5315, the process advances to step S5316; otherwise, the process jumps to step S5317.

In step S5316, the method resetOwner is executed from the self object. In step S5317, the method getMemory is executed, the flag IsCleared is set to ON, and TemporalOwner is set to ON.

If eval_type=ArrL_Add_ArrR in step S5318, the process advances to step S5410; if eval_type=VecX_Mul_VecY, the process advances to step S5606; or if eval_type=VecX_Mul_VecY_Add_MatA, the process advances to step S5609. Also, if eval_type=MatA_Mul_MatB, the process advances to step S5701; if eval_type=MatA_Mul_MatB_Add_MatC, the process advances to step S5801; or if eval_type=RelationNormal, the process advances to step S6001.

If ToBeRemovedOwner≠0 in step S5401, the process advances to step S5402; if ToBeRemovedOwner=0, the process jumps to step S5403. In step S5402, the method freeMemory is executed from ToBeRemovedOwner. If ToBeRemovedAddingObj≠0 in step S5403, the process advances to step S5404; if ToBeRemovedAddingObj=0, the process jumps to step S5405.

In step S5404, the method freeMemory is executed from ToBeRemovedAddingObj. If ToBeRemovedMultiplyingObj≠0 in step S5405, the process advances to step S5406; if ToBeRemovedMultiplyingObj=0, the process jumps to step S5407. In step S5406, the method freeMemory is executed from ToBeRemovedMultiplyingObj.

In step S5407, a method resetMatrix is executed from the self object, and OFF is set in UnEvaluated. If argObj matches this in step S5408, the process advances to step S5409; otherwise, the process ends. In step S5409, resetMatrix is executed from the object argObj, and OFF is set in UnEvaluated of argObj.

By the processes from steps S5401 to S5409, for example, even when a mathematical expression with a long right-hand side like equation (4) below is described as a program, the number of array memory areas to be temporarily generated for a Matrix object or Vector object is two at maximum. In the prior art, in such case, the number of array memory areas increases in proportion to the number of product operations (*).

$$M=A*B*C*D*E*F*G*H; \qquad (4)$$

Likewise, in sum operations (+) like equation (5), the number of array memory areas to be temporarily generated is two.

$$M=A+B+C+D+E+F+G+H; \qquad (5)$$

When an argObj.MyArrayState.Transpose flag of the object argObj is OFF in step S5410, if an argObj.AddingArrayState.Transpose flag is OFF, the process advances to step S5501. In this case, if the argObj.AddingArrayState.Transpose flag is ON, the process advances to step S5506.

On the other hand, when the argObj.MyArrayState.Transpose flag is ON in step S5410, if the argObj.AddingArrayState.Transpose flag is OFF, the process advances to step S5513; if the argObj.AddingArrayState.Transpose flag is ON, the process advances to step S5601.

If TmpOwner≠this (self object) and TmpAddingObj≠this in step S5501, the process advances to step S5502; if TmpOwner=this and TmpAddingObj=this, the process advances to step S5503. Also, if TmpOwner=this and TmpAddingObj≠this, the process advances to step S5504; if TmpOwner≠this and TmpAddingObj=this, the process advances to step S5505.

In step S5502, a BLAS function zaxpy is called with arguments (NumElm, TmpMulFactor, TmpOwner, . . . 1, . . . this, . . . 1), and the BLAS function zaxpy is called with arguments (NumElm, TmpAddFactor, TmpAddingObj, 1, . . . this, . . . 1). Then, the process returns to step S5401. Assume that a Complex object as the argument of the BLAS function is the start address of a member variable (real number part, imaginary number part) of the Complex object in practice. In the following description, assume that an abbreviation having the above same meaning is adopted upon designating a Complex object as an argument of a BLAS function.

In step S5503, the sum of TmpAddFactor and TmpMulFactor is set in a Complex object SumFactor, and a BLAS function zscal is called with arguments (NumElm, SumFactor, . . . this, 1). Then, the process returns to step S5401. In step S5504, the BLAS function zscal is called with arguments (NumElm, TmpMulFactor, . . . this, 1), and the BLAS function zaxpy is called with arguments (NumElm, TmpAddFactor, TmpAddingObj, . . . 1, . . . this, . . . 1). The process then returns to step S5401.

In step S5505, the BLAS function zscal is called with arguments (NumElm, TmpAddFactor, . . . this, 1), and the BLAS function zaxpy is called with arguments (NumElm, TmpMulFactor, TmpOwner, . . . 1, . . . this, . . . 1). The process then returns to step S5401. If TmpOwner≠this and TmpAddingObj≠this in step S5506, the process advances to step S5507; otherwise, the process advances to step S5508.

In step S5507, a method getTrans is executed with an argument TmpAddingObj, the BLAS function zscal is called with arguments (NumElm, TmpAddFactor, this, 1), and the BLAS function zaxpy is called with arguments (NumElm, TmpMulFactor, TmpOwner, 1, this, 1). The process then returns to step S5401. Note that getTrans is a method used to actually calculate Hermitian-conjugate Matrix or Vector elements.

In step S5508, a Matrix object tMatrix is generated with arguments (NxMax, NyMax), and the method getTrans is executed from the tMatrix object with an argument TmpAddingObj. If TmpOwner=this in step S5509, the process advances to step S5510; otherwise, the process advances to step S5511.

In step S5510, the BLAS function zscal is called with arguments (NumElm, TmpMulFactor, . . . this, 1), and the BLAS function zaxpy is called with arguments (NumElm, TmpAddFactor, tMatrix, . . . 1, . . . this, . . . 1). In step S5511, a BLAS function zcopy is called with arguments (NumElm, tMatrix, this, 1), the BLAS function zscal is called with arguments (NumElm, TmpAddFactor, this, 1), and the BLAS function zaxpy is called arguments (NumElm, TmpMulFactor, TmpOwner, 1, this, 1).

In step S5512, tMatrix is deleted, and the process returns to step S5401. In C++, deletion of an object can be implemented by a delete operator. If TmpOwner≠this and TmpAddingObj≠this in step S5513, the process advances to step S5514; otherwise, the process advances to step S5515.

In step S5514, the method getTrans is executed with an argument TmpOwner, the BLAS function zscal is called with arguments (NumElm, TmpMulFactor, this, 1), and the BLAS function zaxpy is called with arguments (NumElm, TmpAddFactor, TmpAddingObj, 1, this, 1). The process then returns to step S5401.

In step S5515, a Matrix object tMatrix is generated with arguments (NxMax, NyMax), and the method getTrans is executed from the tMatrix object with an argument TmpAddingObj. If TmpAddingObj=this in step S5516, the process advances to step S5517; otherwise, the process advances to step S5518.

In step S5517, the BLAS function zscal is called with arguments (NumElm, TmpAddFactor, this, 1), and the BLAS function zaxpy is called with arguments (NumElm, TmpMulFactor, tMatrix, 1, this, 1). In step S5518, the BLAS function zcopy is called with arguments (NumElm, tMatrix, 1, this, 1), the BLAS function zscal is called with arguments (NumElm, TmpMulFactor, this, 1), and the BLAS function zaxpy is called with arguments (NumElm, TmpAddFactor, TmpAddingObj, 1, this, 1).

In step S5519, the object tMatrix is deleted, and the process returns to step S5401. In step S5601, a Matrix object tMatrix is generated with arguments (NxMax, NyMax). If TmpOwner=this and TmpAddingObj=this in step S5602, the process advances to step S5603; otherwise, the process advances to step S5604.

In step S5603, the method getTrans is executed from tMatrix with an argument TmpOwner, the sum of TmpMulFactor and TmpAddFactor is set in a Complex object SumFactor, and the BLAS function zaxpy is called with arguments (NumElm, SumFactor, tMatrix, 1, this, 1). In step S5604, the BLAS function zaxpy is called with arguments (NumElm, TmpMulFactor, TmpOwner, 1, this, 1), and the BLAS function zaxpy is called with arguments (NumElm, TmpAddFactor, TmpAddingObj, 1, this, 1). In step S5605, the object tMatrix is deleted, and the process returns to step S5401.

If MulReverse of argObj is ON in step S5606, the process advances to step S5607; otherwise, the process advances to step S5608. Note that MulReverse becomes OFF only when argObj.MyArrayState.Transpose is OFF and argObj.MultiplyingArrayState.Transpose is ON. Also, MulReverse becomes ON only when argObj.MyArrayState.Transpose is ON and argObj.MultiplyingArrayState.Transpose is OFF.

In step S5607, a BLAS function zgerc is called with arguments (CblasRowMajor, Nx, Nx, TmpMulFactor, TmpOwner, 1, TmpMultiplyingObj, 1, this, Nx). Note that the argument Nx is an abbreviation for NxMax and that NxMax will be abbreviated as Nx for the argument of the BLAS function hereinafter. Note that CblasRowMajor is an argument which designates the way an array is allocated on a memory. In step S5608, the BLAS function zgerc is called with arguments (CblasRowMajor, Nx, Nx, TmpMulFactor, TmpMultiplyingObj, 1, TmpOwner, 1, this, Nx).

In step S5609, the BLAS function zcopy is called with arguments (NumElm, TmpAddingObj, 1, this, 1). If MulReverse of argObj is OFF in step S5610, the process advances to step S5611; otherwise, the process advances to step S5612. Note that MulReverse becomes OFF only when argObj.MyArrayState.Transpose is OFF and argObj.MultiplyingArrayState.Transpose is ON. Also, MulReverse becomes ON only when argObj.MyArrayState.Transpose is ON and argObj.MultiplyingArrayState.Transpose is OFF.

In step S5611, the BLAS function zgerc is called with arguments (CblasRowMajor, Nx, Nx, TmpMulFactor, TmpOwner, 1, TmpMultiplyingObj, 1, this, Nx). In step S5612, the BLAS function zgerc is called with arguments (CblasRowMajor, Nx, Nx, TmpMulFactor, TmpMultiplyingObj, 1, TmpOwner, 1, this, Nx).

In step S5701, an inner flag InnerGetMemory is set to OFF. If TmpOwner=this or TmpMultiplyingObj=this in step S5702, the process advances to step S5703; otherwise, the process advances to step S5704.

In step S5703, a Matrix object tMatrix is generated with arguments (NxMax, NyMax), and ON is set in the flag InnerGetMemory. In step S5704, this is set in a reference tMatrix to a Matrix object. If MulReverse of argObj is true in step S5705, the process advances to step S5706; otherwise, the process advances to step S5707.

In step S5706, a BLAS function zgemm is called with arguments (CblasRowMajor, argObj.MyArrayState.Transpose, argObj.MultiplyingArrayState.Transpose, Nx, Nx, Nx, TmpMulFactor, TmpOwner, Nx, TmpMultiplyingObj, Nx, TmpAddFactor, this, Nx).

In step S5707, the BLAS function zgemm is called with arguments (CblasRowMajor, argObj.MultiplyingArrayState.Transpose, argObj.MyArrayState.Transpose, Nx, Nx, Nx, TmpMulFactor, TmpMultiplyingObj, Nx, TmpOwner, Nx, TmpAddFactor, this, Nx).

If the flag InnerGetMemory is ON in step S5708, the process advances to step S5709; otherwise, the process returns to step S5401. In step S5709, the BLAS function zcopy is called with arguments (NumElm, tMatrix, 1, this, 1), and the object tMatrix is deleted.

If Transpose of TmpAddingObj is ON in step S5801, the process advances to step S5906; otherwise, the process advances to step S5802. If this=TmpAddingObj in step S5802, the process advances to step S5901; otherwise, the process advances to step S5803. If TmpOwner=this or TmpMultiplyingObj=this in step S5803, the process advances to step S5804; otherwise, the process jumps to step S5809.

In step S5804, a Matrix object tMatrix is generated with arguments (NxMax, NyMax), and the BLAS function zcopy is called with arguments (NumElm, this, 1, tMatrix, 1). If MulReverse of this is true in step S5805, the process advances to step S5806; otherwise, the process advances to step S5807.

In step S5806, the BLAS function zgemm is called with arguments (CblasRowMajor, argObj.MultiplyingArrayState.Transpose, argObj.MyArrayState.Transpose, Nx, Nx, Nx, TmpMulFactor, TmpMultiplyingObj, Nx, TmpOwner, Nx, TmpAddFactor, tMatrix, Nx).

In step S5807, the BLAS function zgemm is called with arguments (CblasRowMajor, argObj.MyArrayState.Transpose, argObj.MultiplyingArrayState.Transpose, Nx, Nx, Nx, TmpMulFactor, TmpOwner, Nx, TmpMultiplyingObj, Nx, TmpAddFactor, tMatrix, Nx).

In step S5808, the BLAS function zcopy is called with arguments (NumElm, tMatrix, 1, this, 1), and the process returns to step S5401. If MulReverse of this is true in step S5809, the process advances to step S5810; otherwise, the process advances to step S5811.

In step S5810, the BLAS function zgemm is called with arguments (CblasRowMajor, argObj.MultiplyingArrayState.Transpose, argObj.MyArrayState.Transpose, Nx, Nx, Nx, TmpMulFactor, TmpMultiplyingObj, Nx, TmpOwner, Nx, TmpAddFactor, this, Nx).

In step S5811, the BLAS function zgemm is called with arguments (CblasRowMajor, argObj.MyArrayState.Transpose, argObj.MultiplyingArrayState.Transpose, Nx, Nx, Nx, TmpMulFactor, TmpOwner, Nx, TmpMultiplyingObj, Nx, TmpAddFactor, this, Nx).

In step S5901, a Matrix object tMatrix by a constructor with arguments (NxMax:int, NyMax:int), and the BLAS function zcopy is called with arguments (NumElm, TmpAddingObj, 1, tMatrix, 1) If MulReverse of this is ON in step S5902, the process advances to step S5903; otherwise, the process advances to step S5904.

In step S5903, the BLAS function zgemm is called with arguments (CblasRowMajor, argObj.MultiplyingArrayState.Transpose, argObj.MyArrayState.Transpose, Nx, Nx, Nx, TmpMulFactor, TmpMultiplyingObj, Nx, TmpOwner, Nx, TmpAddFactor, tMatrix, Nx).

In step S5904, the BLAS function zgemm is called with arguments (CblasRowMajor, argObj.MyArrayState.Transpose, argObj.MultiplyingArrayState.Transpose, Nx, Nx, Nx, TmpMulFactor, TmpOwner, Nx, TmpMultiplyingObj, Nx, TmpAddFactor, tMatrix, Nx). In step S5905, the BLAS function zcopy is called with arguments (NumElm, tMatrix, 1, this, 1), and the process returns to step S5401.

In step S5906, a Matrix object tMatrix by a constructor with arguments (NxMax:int, NyMax:int), and the method Trans is executed from tMatrix with an argument TmpAddingObj. If MulReverse of this is ON in step S5907, the process advances to step S5908; otherwise, the process advances to step S5909.

In step S5908, the BLAS function zgemm is called with arguments (CblasRowMajor, argObj.MultiplyingArrayState.Transpose, argObj.MyArrayState.Transpose, Nx, Nx, Nx, TmpMulFactor, TmpMultiplyingObj, Nx, TmpOwner, Nx, TmpAddFactor, tMatrix, Nx).

In step S5909, the BLAS function zgemm is called with arguments (CblasRowMajor, argObj.MyArrayState.Transpose, argObj.MultiplyingArrayState.Transpose, Nx, Nx, Nx, TmpMulFactor, TmpOwner, Nx, TmpMultiplyingObj, Nx, TmpAddFactor, tMatrix, Nx). In step S5910, the BLAS function zcopy is called with arguments (NumElm, tMatrix, 1, this, 1), and the process returns to step S5401.

If Transpose of argObj is ON in step S6001, the process jumps to step S6005; otherwise, the process advances to step S6002. If this=TmpOwner in step S6002, the process advances to step S6003; otherwise, the process advances to step S6004.

In step S6003, the BLAS function zscal is called with arguments (NumElm, TmpMulFactor, this, 1). In step S6004, the BLAS function zaxpy is called with arguments (NumElm, TmpMulFactor, TmpOwner, 1, this, 1). If argObj=this in step S6005, the process advances to step S6008; otherwise, the process advances to step 56006.

In step S6006, a Matrix object workMatrix is generated with an argument argObj, and the flag InnerGetMemory is set to ON. In step S6007, the method copyElement is executed from workMatrix. In step S6008, workMatrix is defined as a reference of tMatrix, and the flag InnerGetMemory is set to OFF. In step S6009, the method getTrans is executed from the self object with an argument workMatrix.

In step S6010, the BLAS function zscal is called with arguments (NumElm, TmpMulFactor, this, 1). If the flag InnerGetMemory is ON in step S6011, the process advances to step S6012; otherwise, the process returns to step S5401. In step S6012, the object workMatrix is deleted, and the process returns to step S5401.

Figure 61:
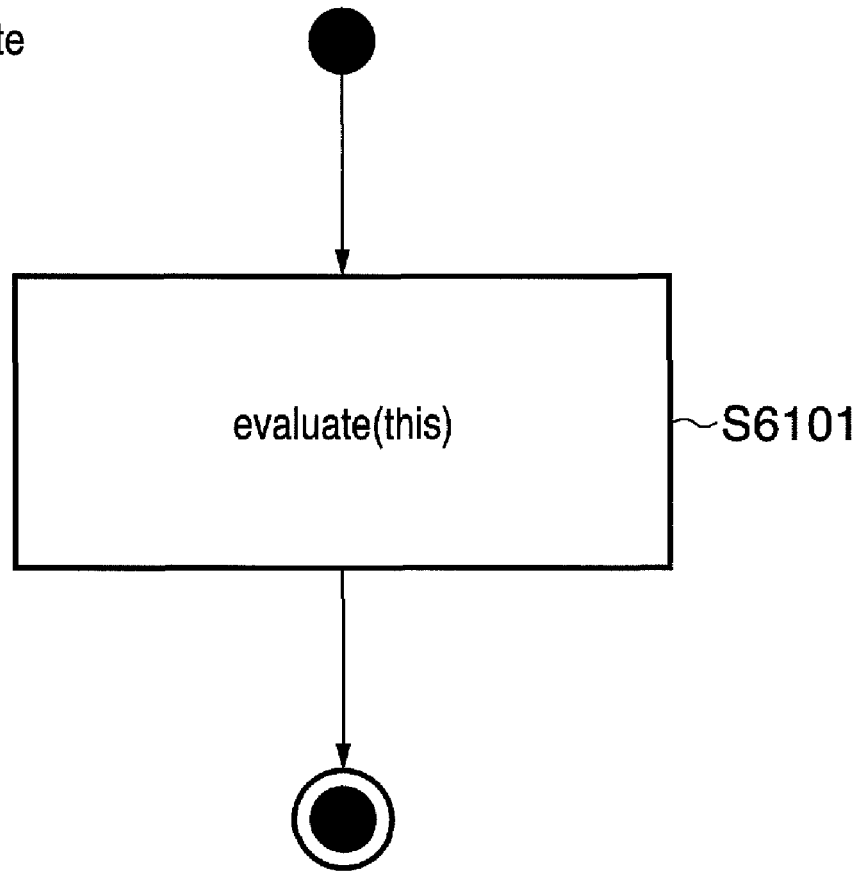
FIG. 61 shows processing to be executed by the method evaluate of Matrix class without any argument.

FIG. 61 is an activity diagram of the method evaluate without any argument so as to execute the postponed calculation of a Matrix object. In step S6101, the method evaluate is executed with an argument this.

Figure 62:
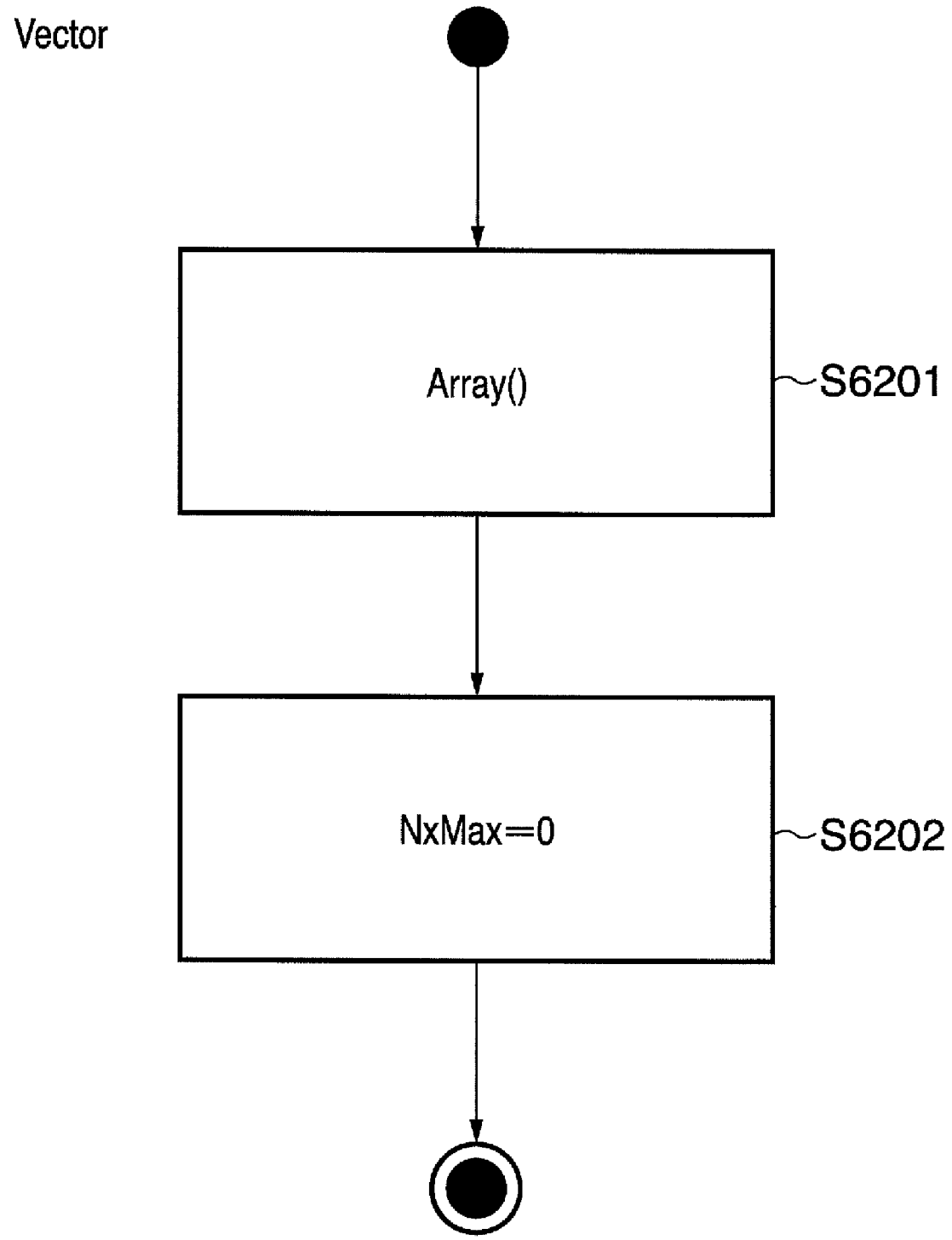
FIG. 62 shows processing to be executed by a default constructor of Vector class.

FIG. 62 is an activity diagram of a default constructor of Vector class without any argument. In step S6201, a default constructor Array of base class is executed. In C++, since the constructor of base class is launched implicitly, such launching need not be described in a program. In step S6202, "0" is set in NxMax.

Figure 63:
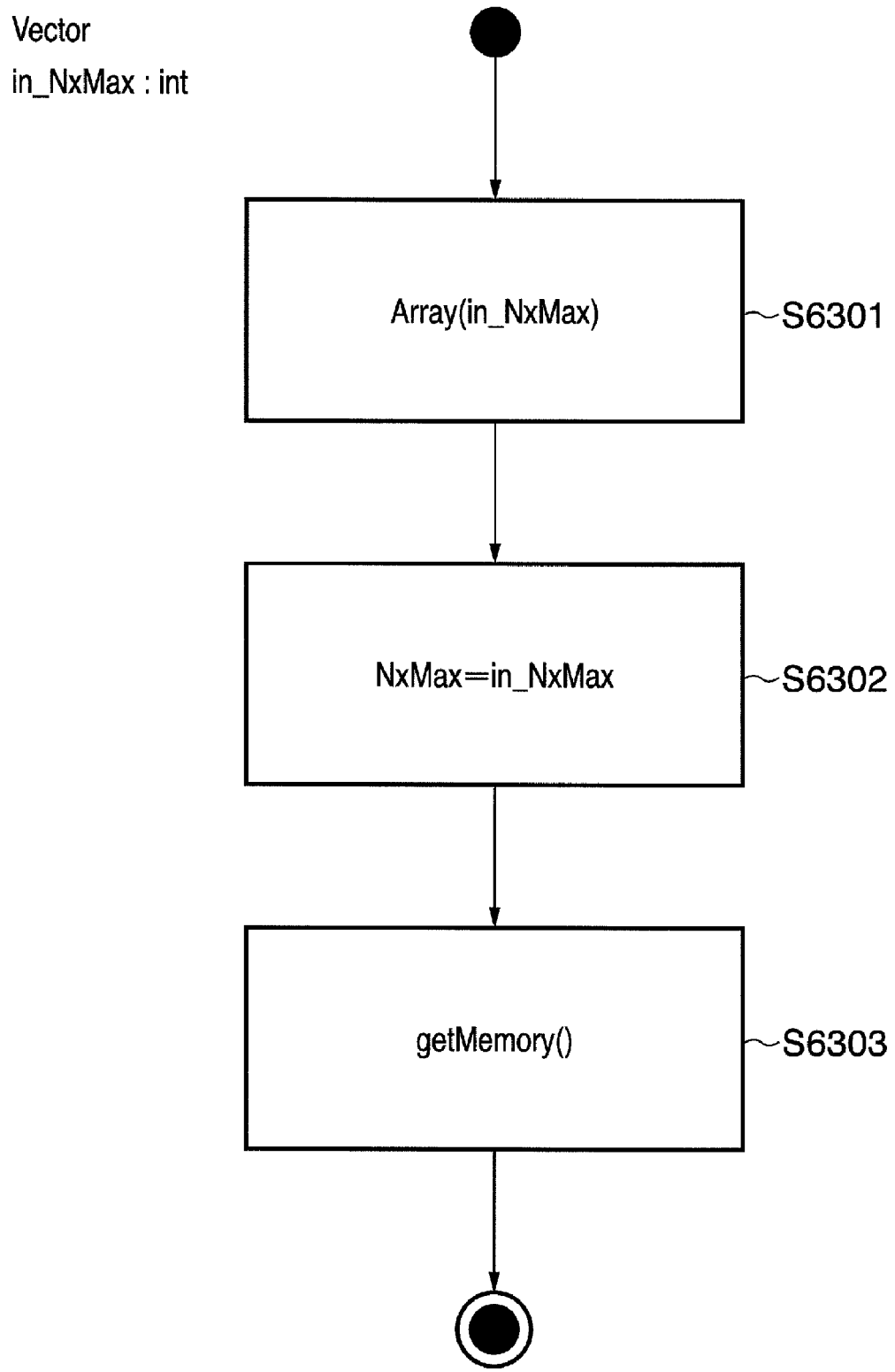
FIG. 63 shows processing to be executed by a constructor of Vector class having two int type variables as arguments.

FIG. 63 is an activity diagram of a constructor of Vector class having one integer (int type) as an argument. In step S6301, a constructor of base class is executed with an argument in_NxMax. In step S6302, the argument in_NxMax is set in NxMax. In step S6303, the method getMemory is executed.

Figure 64:
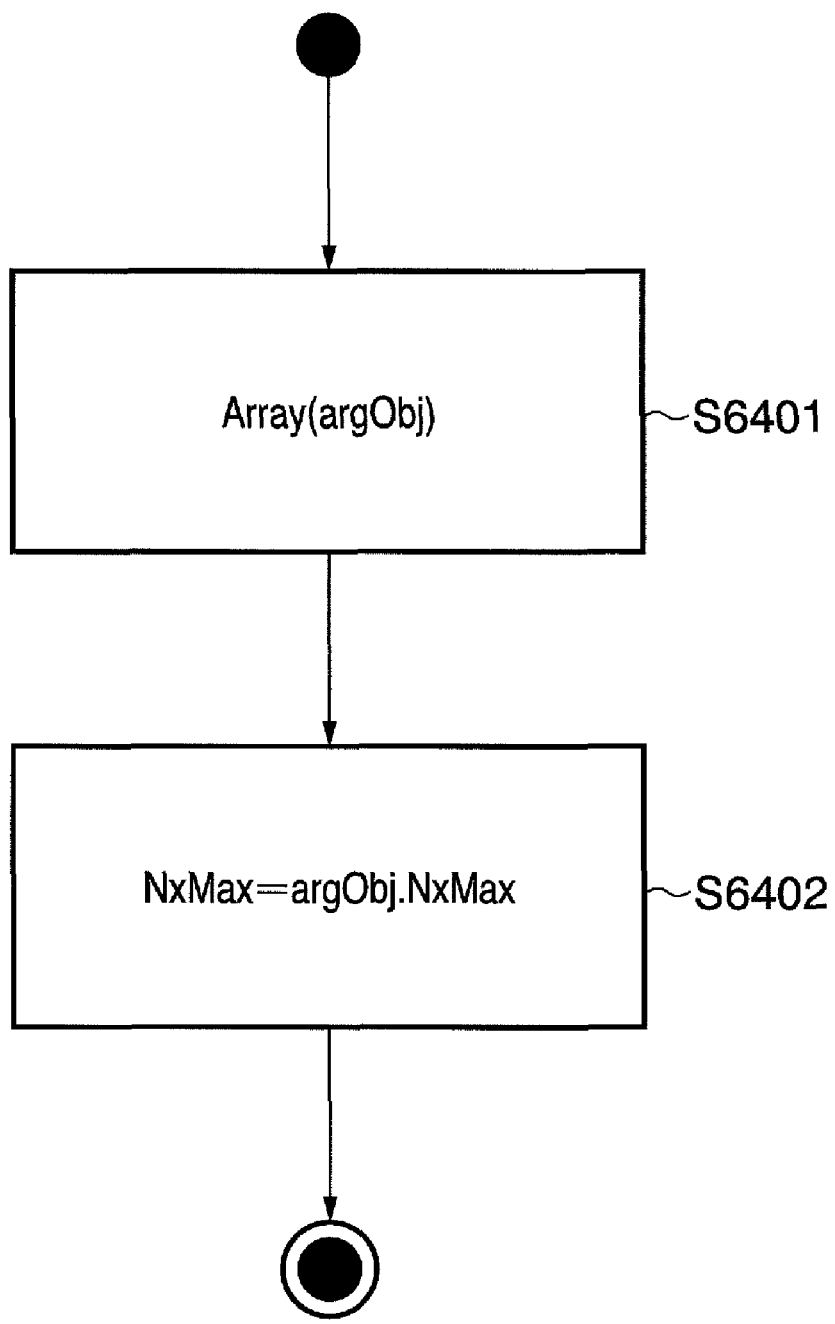
FIG. 64 shows processing to be executed by a constructor of Vector class having a reference to a Vector object as an argument.

FIG. 64 is an activity diagram of a constructor of Vector class which has a reference argObj to a Vector object as an argument. In step S6401, the constructor Array of base class is executed with an argument argObj. In step S6402, a member variable NxMax of argObj is set in NxMax.

Figure 65:
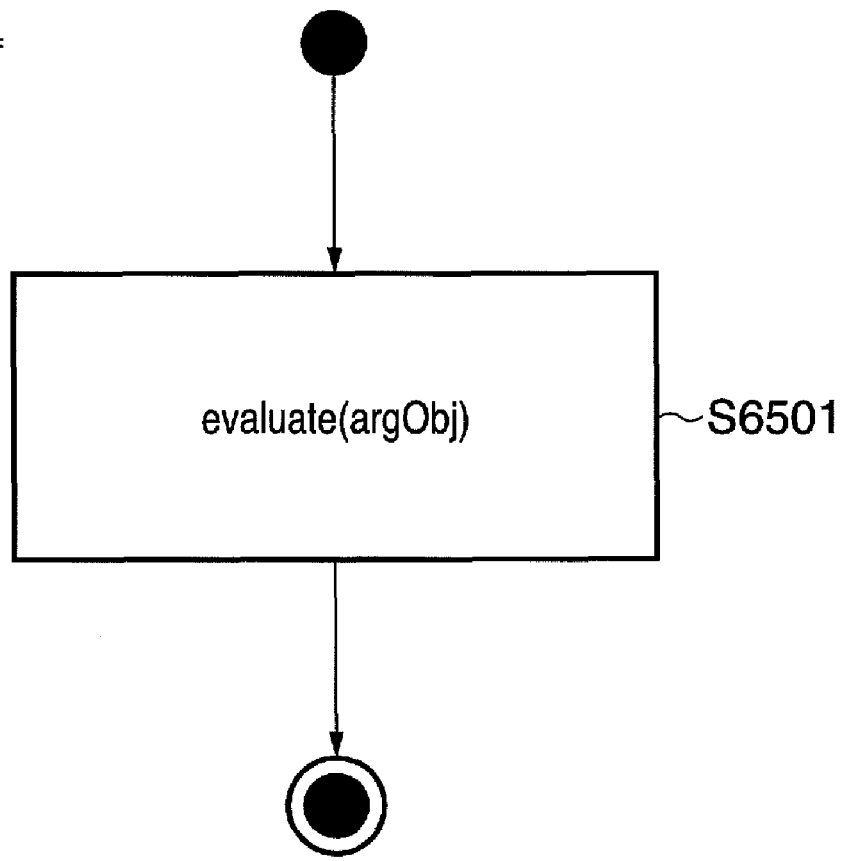
FIG. 65 shows processing to be executed by an = operator (substitute operator) of Vector class.

FIG. 65 is an activity diagram of an = operator (substitute operator) used to implement an operation "Vector=Vector". In step S6501, the method evaluate is executed with an argument argObj. The method evaluate evaluates argObj, and stores the evaluation result in the self object.

Figure 66:
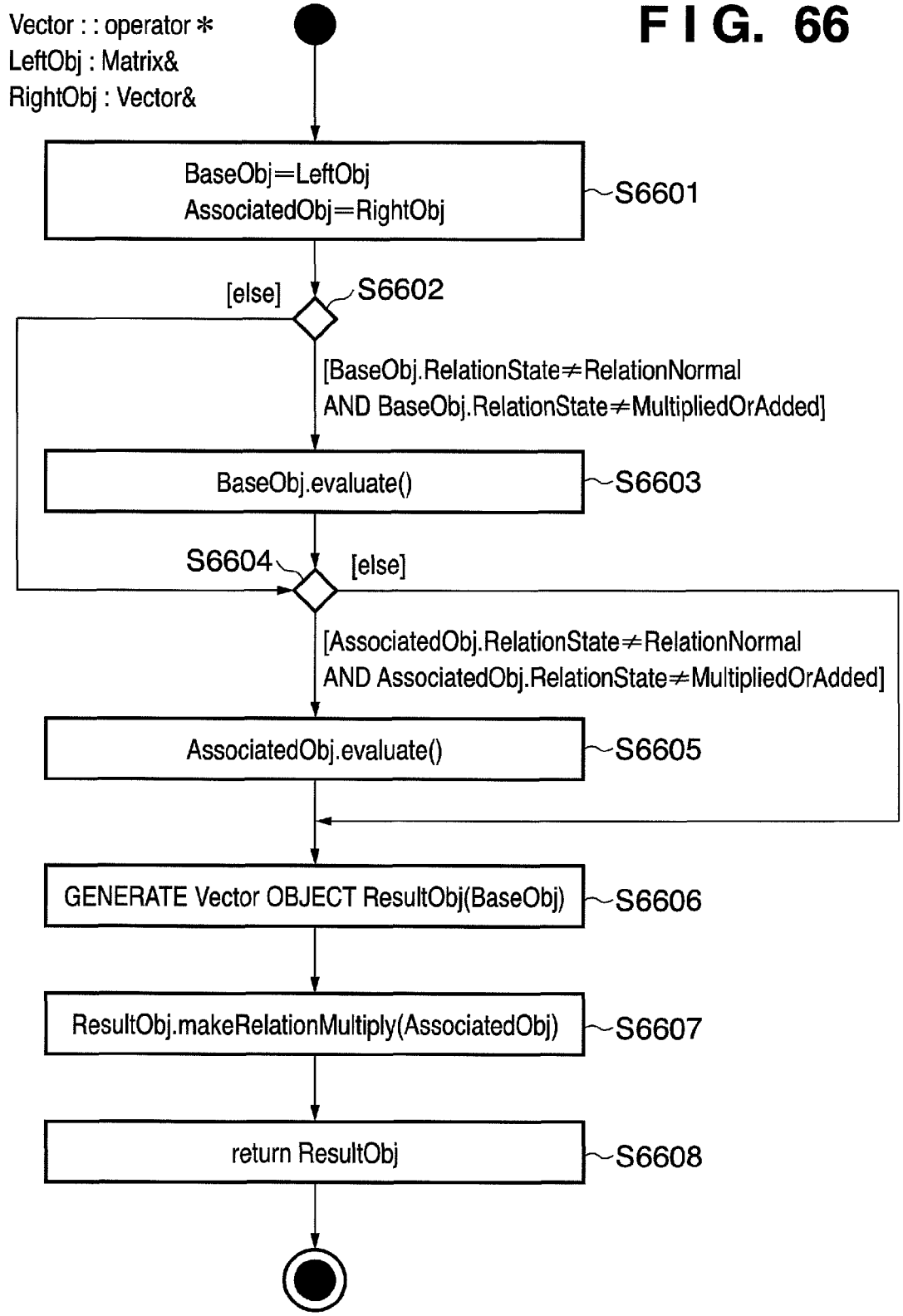
FIG. 66 shows processing to be executed by a * operator used to calculate "Matrix object*Vector object".

FIG. 66 is an activity diagram of a * operator used to make an operation "Matrix*Vector".

In step S6601, LeftObj is set in a reference BaseObj to a Matrix object, and RightObj is set in a reference AssociatedObj to a Matrix object. If RelationState of BaseObj is neither a value RelationNormal nor a value MultipliedOrAdded in step S6602, the process advances to step S6603; otherwise, the process jumps to step S6604.

In step S6603, the method evaluate is executed from BaseObj. If RelationState of AssociatedObj is neither a value RelationNormal nor a value MultipliedOrAdded in step S6604, the process advances to step S6605; otherwise, the process jumps to step S6606.

In step S6605, the method evaluate is executed from AssociatedObj. In step S6606, an object ResultObj of Vector class is generated with an argument BaseObj. In step S6607, the method makeRelationMultiply is executed from ResultObj with an argument AssociatedObj. In step S6608, the process returns with a return value ResultObj.

Figure 67:
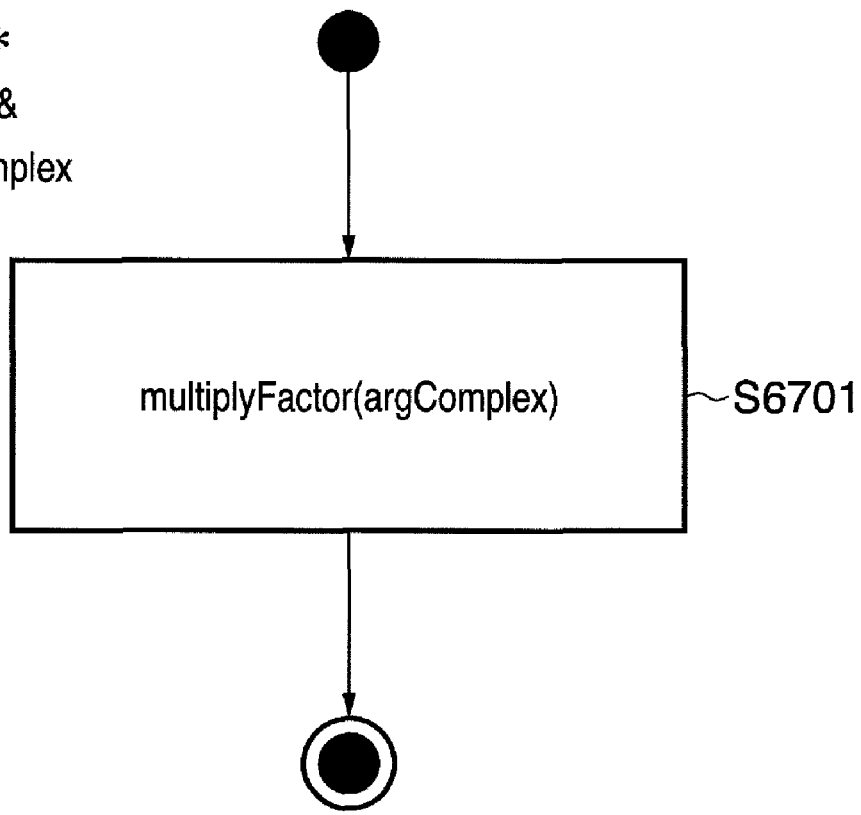
FIG. 67 shows processing to be executed by a * operator used to calculate "Complex object*Vector object" or "Vector object*Complex object".

FIG. 67 is an activity diagram of a * operator used to calculate an operation "Complex*Vector" or "Vector*Complex". In step S6701, the method multiplyFactor is executed with an argument argComplex.

FIG. 68 is an activity diagram of a / operator used to calculate an operation "Vector/Complex". In step S6801, the method divideFactor is executed with an argument argComplex.

Figure 69:
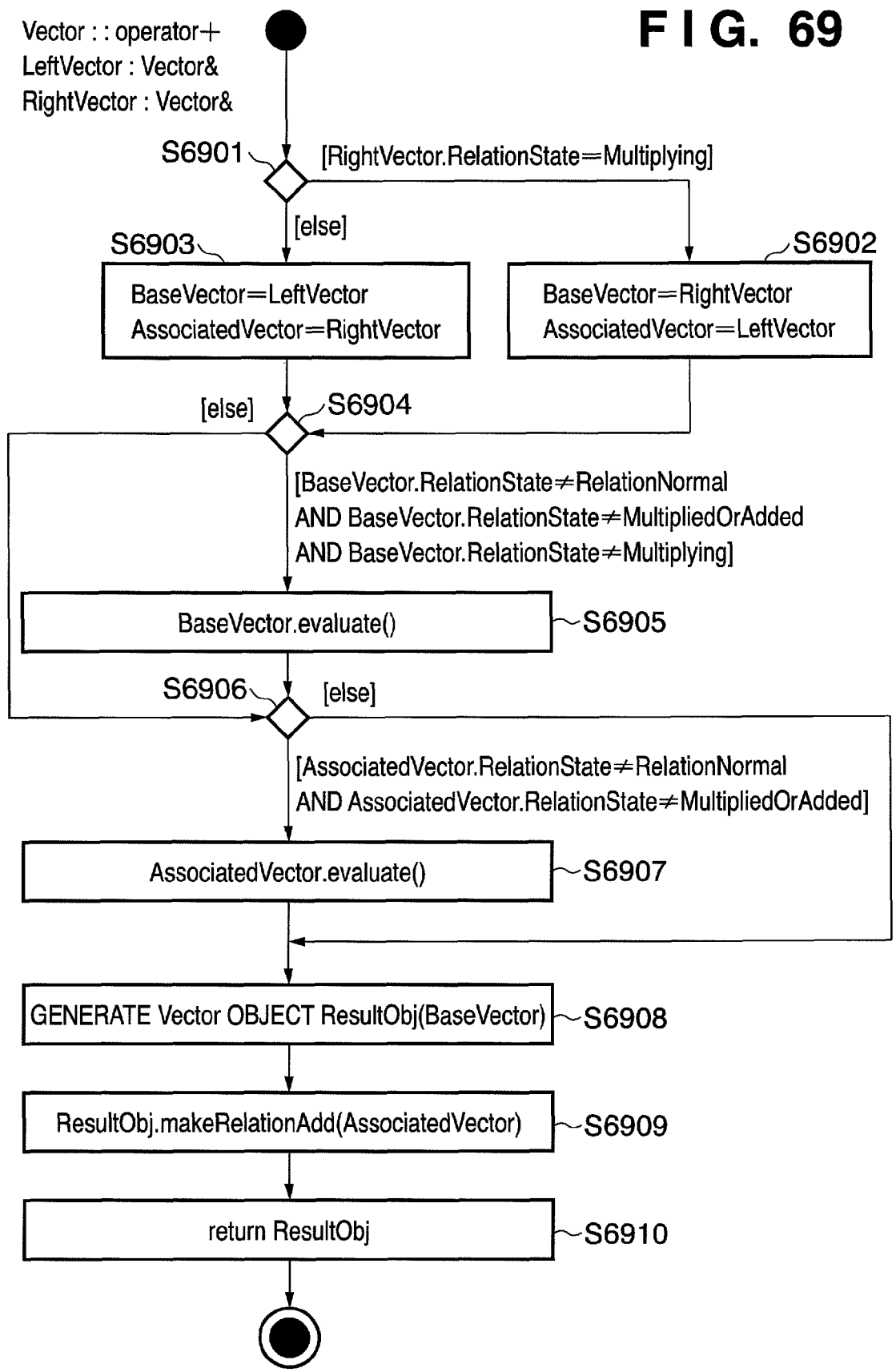
FIG. 69 shows processing to be executed by a + operator used to calculate "Vector object+Vector object".

FIG. 69 is an activity diagram of a + operator used to calculate an operation "Vector+Vector".

If RelationState of RightVector is a value Multiplying in step S6901, the process advances to step S6902; otherwise, the process advances to step S6903.

In step S6902, RightVector is set in a reference BaseVector to a Vector object, and LeftVector is set in a reference AssociatedVector to another Vector object. In step S6903, LeftVector is set in the reference BaseVector to a Vector object, and RightVector is set in the reference AssociatedVector to another Vector object.

If RelationState of BaseVector is none of a value RelationNormal, a value MultipliedOrAdded, and a value Multiplying in step S6904, the process advances to step S6905; otherwise, the process jumps to step S6906. In step S6905, the method evaluate is executed from BaseVector.

If RelationState of AssociatedVector is neither a value RelationNormal nor a value MultipliedOrAdded in step S6906, the process advances to step S6907; otherwise, the process jumps to step S6908. In step S6907, the method evaluate is executed from AssociatedVector. In step S6908, a Vector object ResultObj is generated with an argument BaseVector.

In step S6909, the method makeRelationAdd is executed from ResultObj with an argument AssociatedVector. In step S6910, the process returns with a return value ResultObj.

Figure 70:
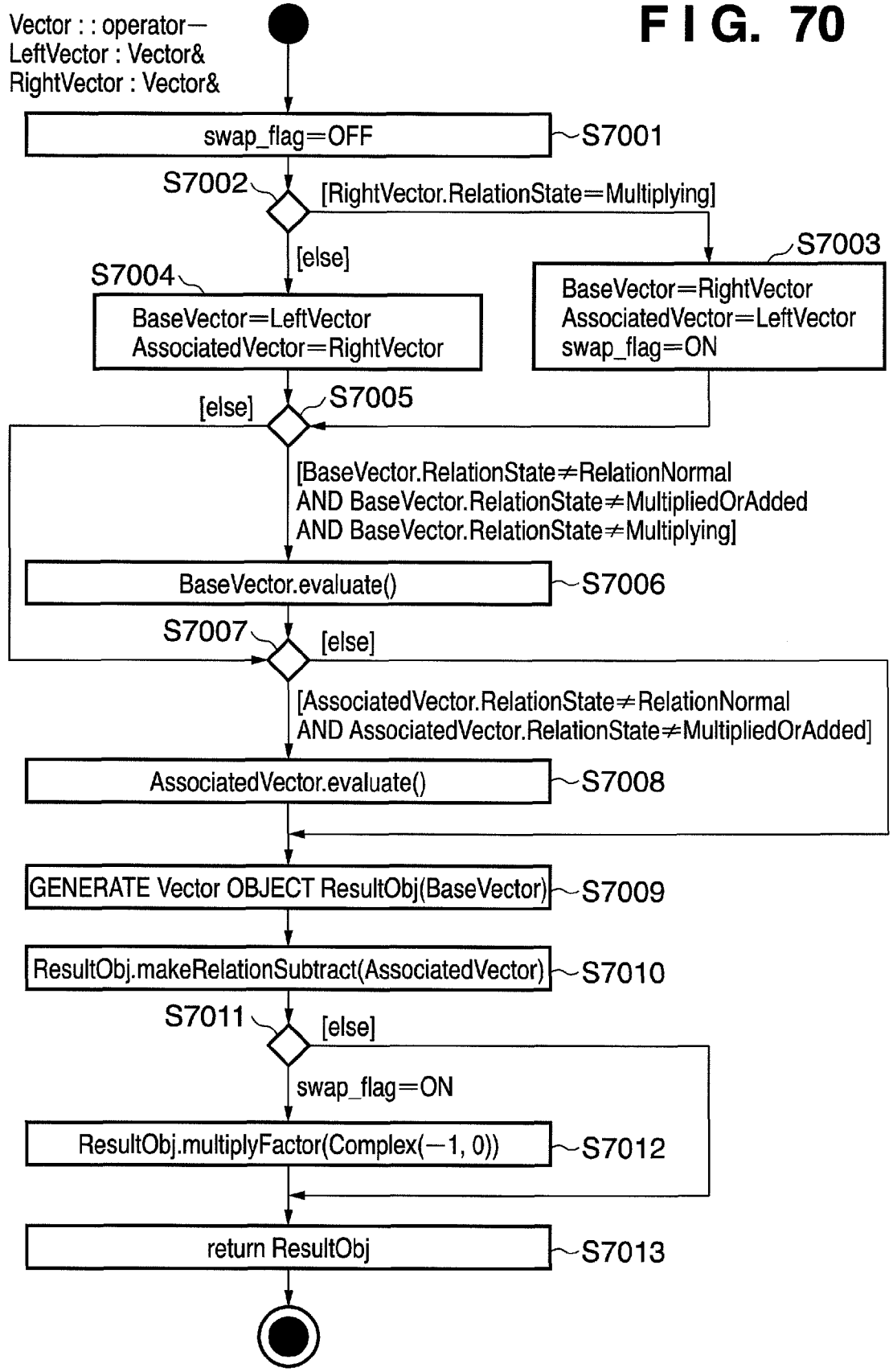
FIG. 70 shows processing to be executed by a − operator used to calculate "Vector object−Vector object".

FIG. 70 is an activity diagram of a – operator used to calculate an operation "Vector–Vector".

In step S7001, a swap flag (swap_flag) is reset to OFF. If RelationState of RightVector is a Value Multiplying in step S7002, the process advances to step S7003; otherwise, the process advances to step S7004.

In step S7003, RightVector is set in BaseVector, LeftVector is set in AssociatedVector, and ON is set in the swap flag. In step S7004, LeftVector is set in the reference BaseVector to a Vector object, and RightVector is set in the reference AssociatedVector to another Vector object.

If RelationState of BaseVector is none of a value RelationNormal, a value MultipliedOrAdded, and a value Multiplying in step S7005, the process advances to step S7006; otherwise, the process jumps to step S7007. In step S7006, the method evaluate is executed from BaseVector. If RelationState of AssociatedVector is neither a value RelationNormal nor a value MultipliedOrAdded in step S7007, the process advances to step S7008; otherwise, the process jumps to step S7009.

In step S7008, the method evaluate is executed from AssociatedVector. In step S7009, a Vector object ResultObj is generated with an argument BaseVector. In step S7010, the method makeRelationSubtract is executed from ResultObj with an argument AssociatedVector.

If the swap flag is ON in step S7011, the process advances to step S7012; otherwise, the process jumps to step S7013. In step S7012, the method multiplyFactor is executed from ResultObj with an argument Complex (−1, 0). In step S7013, the process returns with a return value ResultObj.

Figure 71:
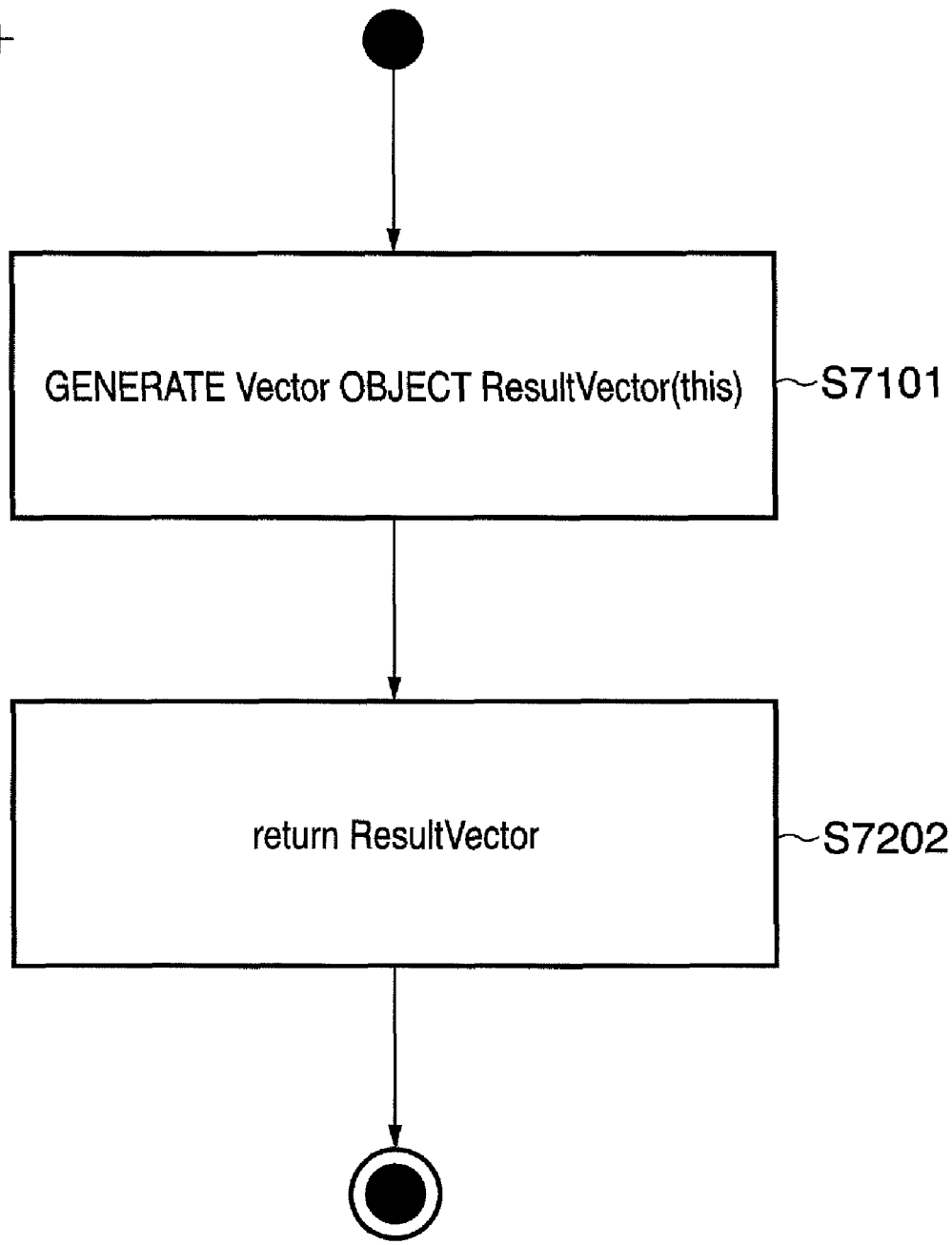
FIG. 71 shows processing to be executed by a + unary operator of Vector class.

FIG. 71 is an activity diagram of a + unary operator of Vector class. In step S7101, a Vector object ResultVector is generated with an argument this. In step S7102, the process returns with a return value ResultVector.

Figure 72:
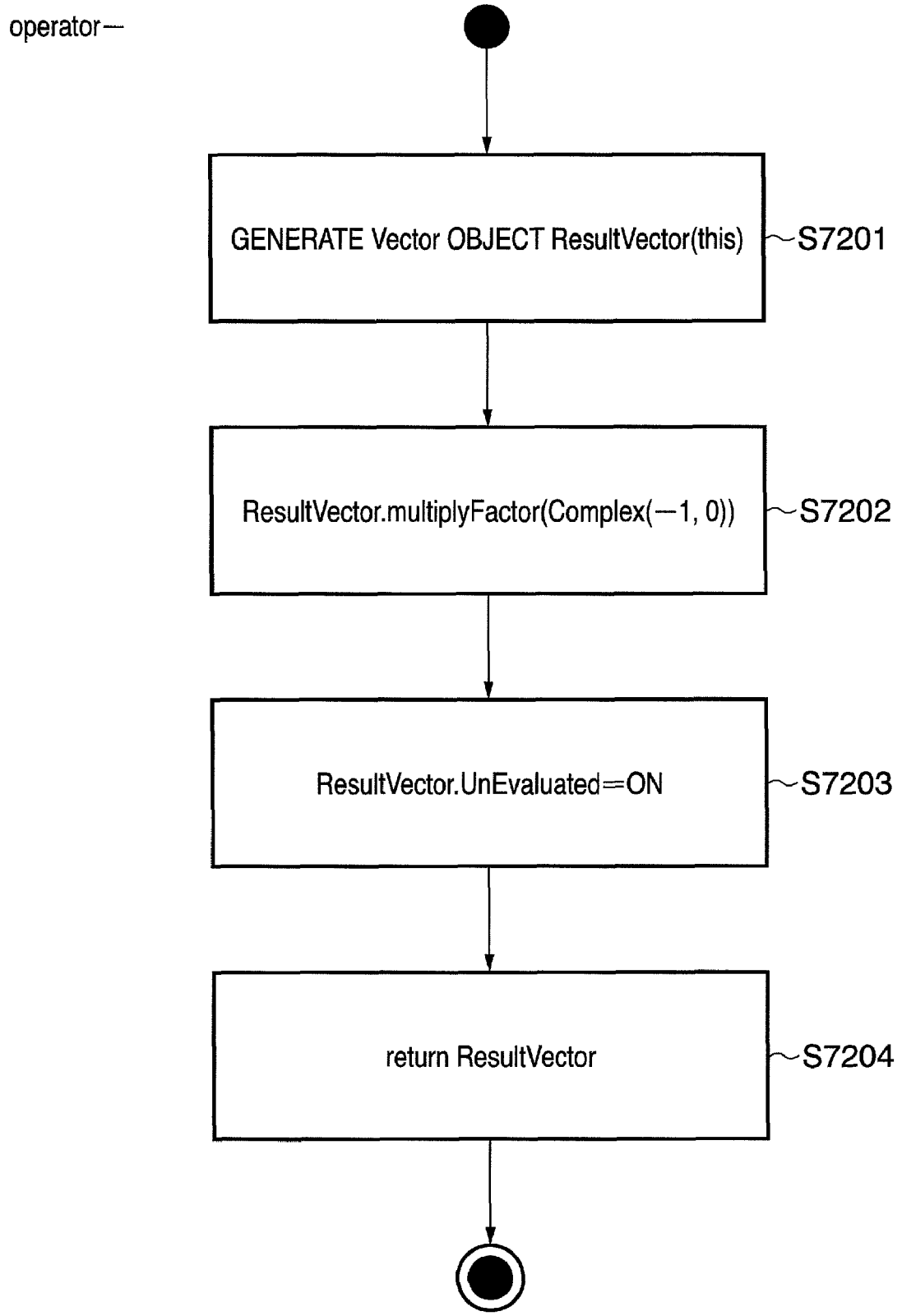
FIG. 72 shows processing to be executed by a − unary operator of Vector class.

FIG. 72 is an activity diagram of a – unary operator of Vector class. In step S7201, a Vector object ResultVector is generated with an argument this. In step S7202, the method multiplyFactor is executed from ResultVector with an argument Complex (−1, 0). In step S7203, UnEvaluated of ResultVector is set to ON. In step S7204, the process returns with a return value ResultVector.

Figure 73:
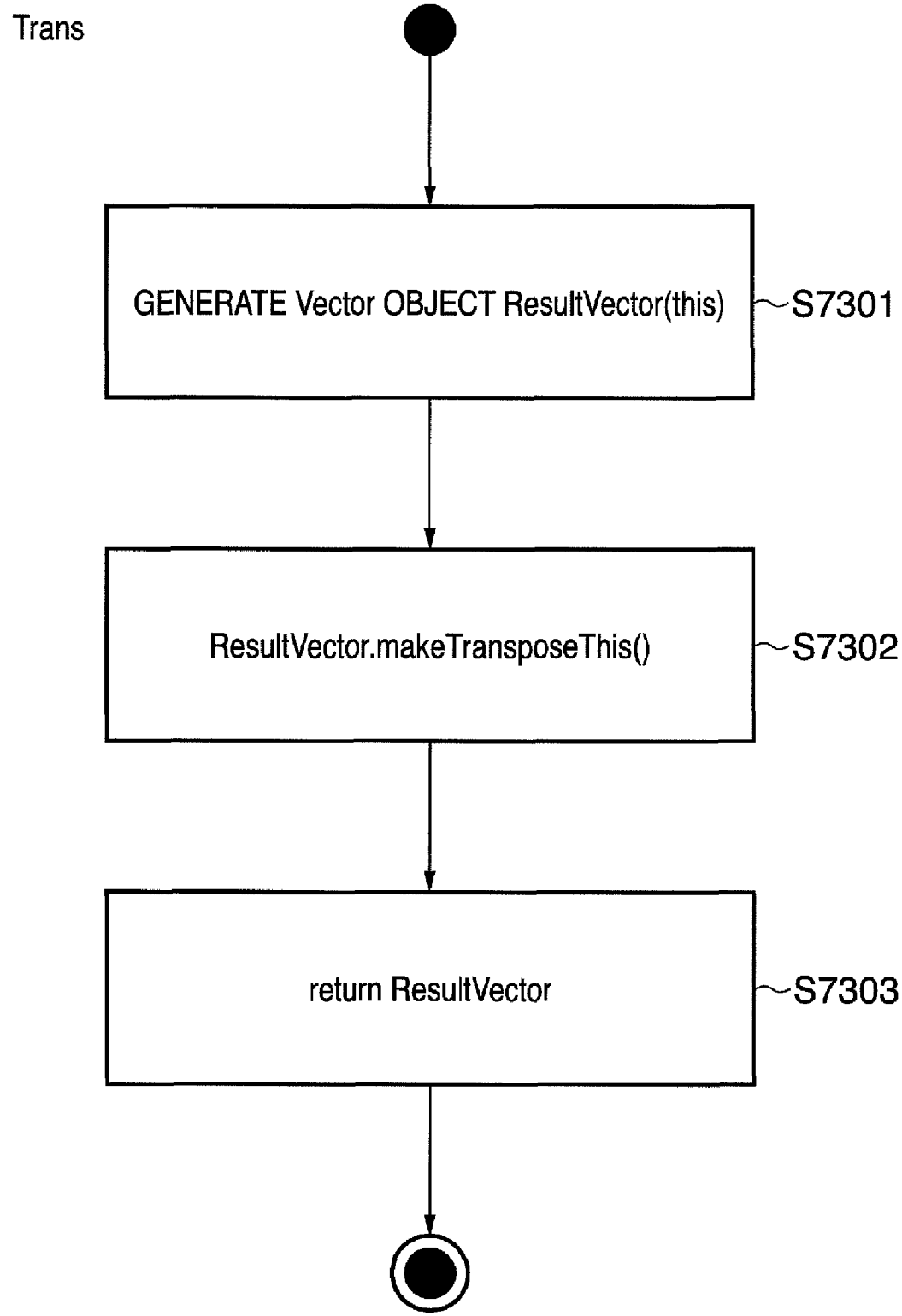
FIG. 73 shows processing to be executed by a method Trans of Vector class.

FIG. 73 is an activity diagram of a function Trans used to convert a Vector object into a Hermitian conjugate. In step S7301, a Vector object ResultVector is generated with an argument this. In step S7302, the method makeTransposeThis is executed from ResultVector. In step S7303, the process returns with a return value ResultVector.

Figure 74:
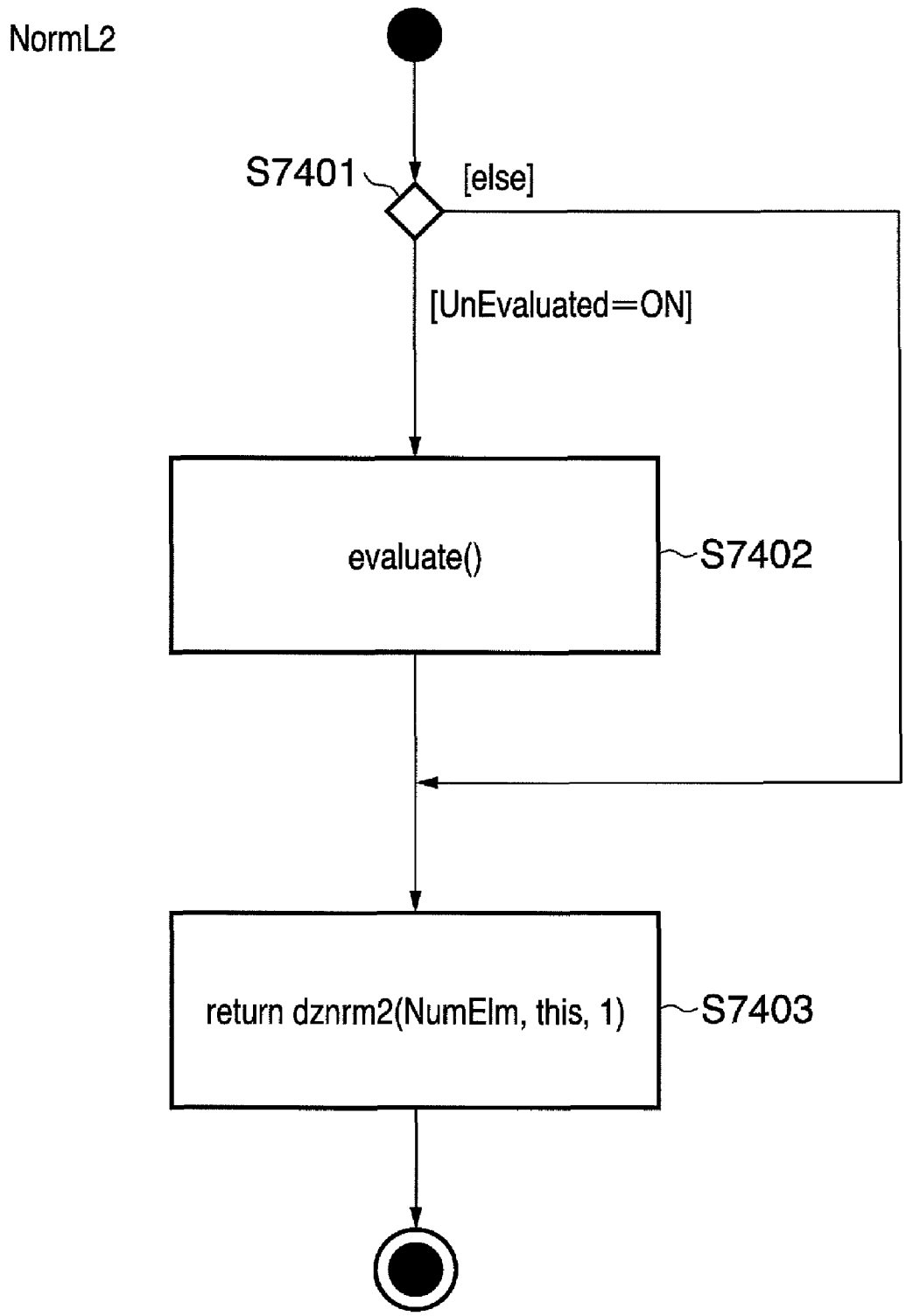
FIG. 74 shows processing to be executed by a method NormL2 of Vector class.

FIG. 74 is an activity diagram of a method NormL2 used to calculate an L2 norm of a Vector object.

If UnEvaluated is ON in step S7401, the process advances to step S7402; otherwise, the process jumps to step S7403. In step S7402, the method evaluate is executed. In step S7403, the BLAS function dznrm2 is called with arguments (NumElm, this, 1), and the process returns with its return value.

Figure 75:
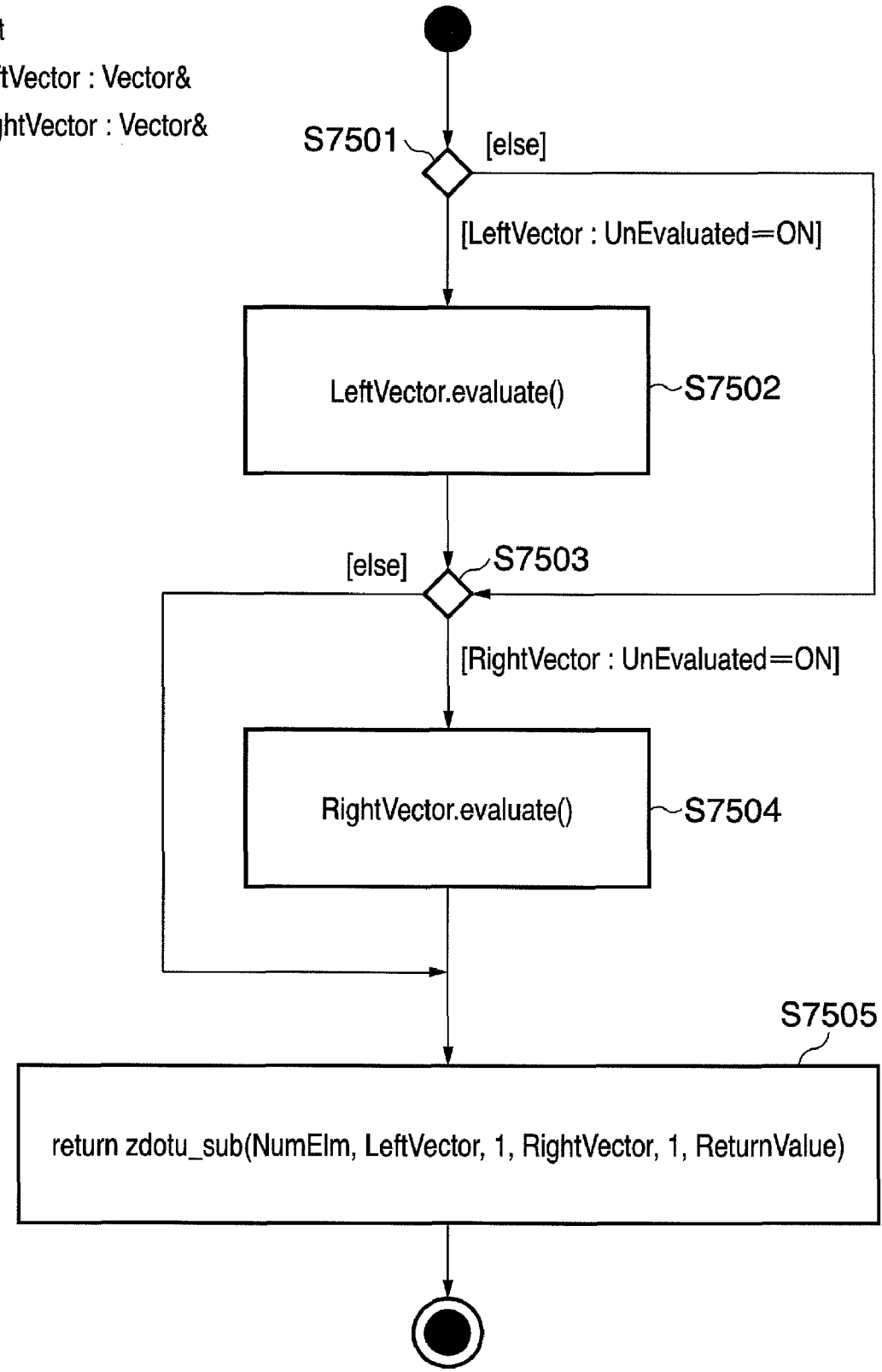
FIG. 75 shows processing to be executed by a friend function Dot having two Vector objects as arguments.
Figure 76:
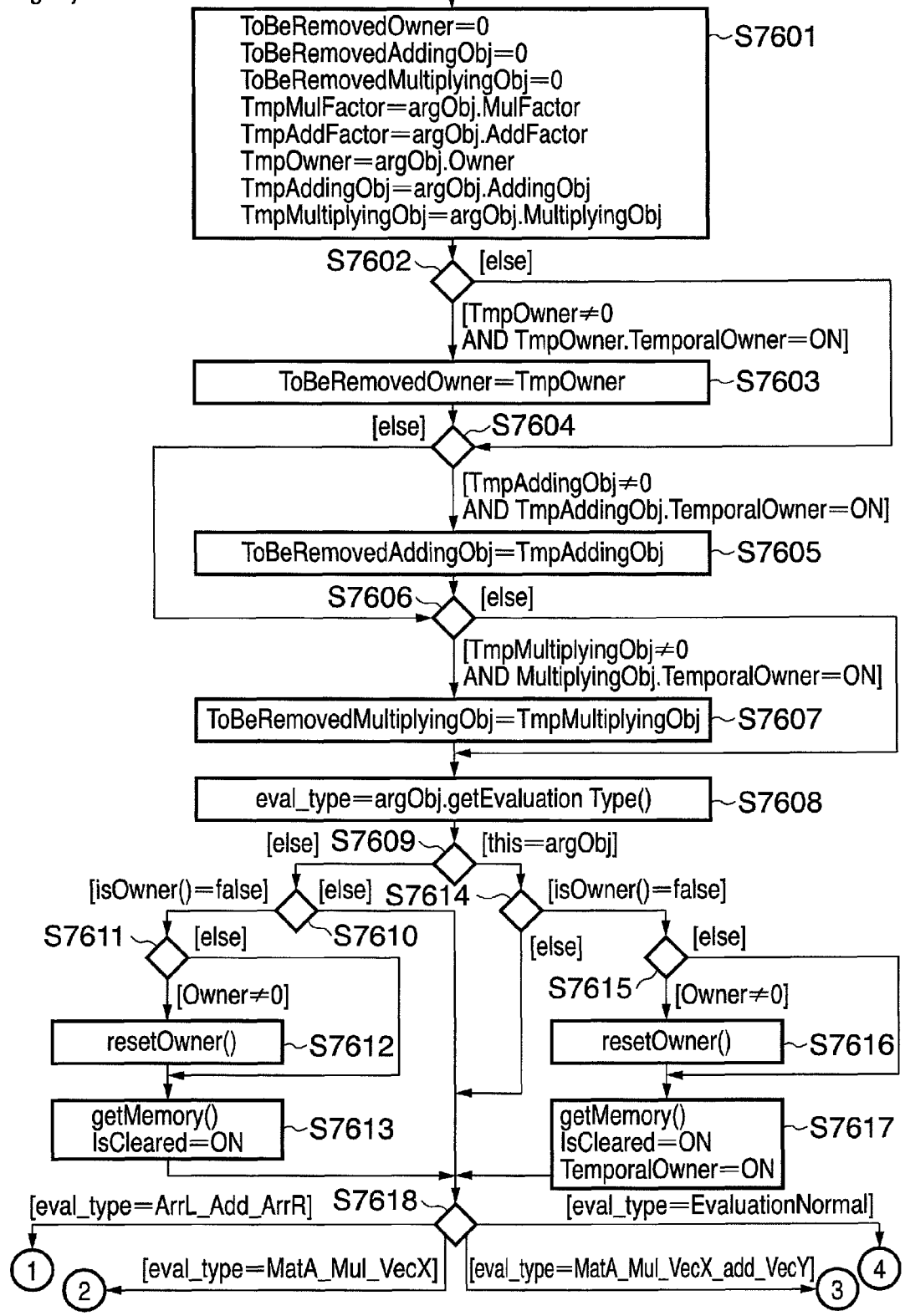
FIG. 76 shows processing to be executed by a method evaluate of Vector class having a reference to a Vector object as an argument.
Figure 77:
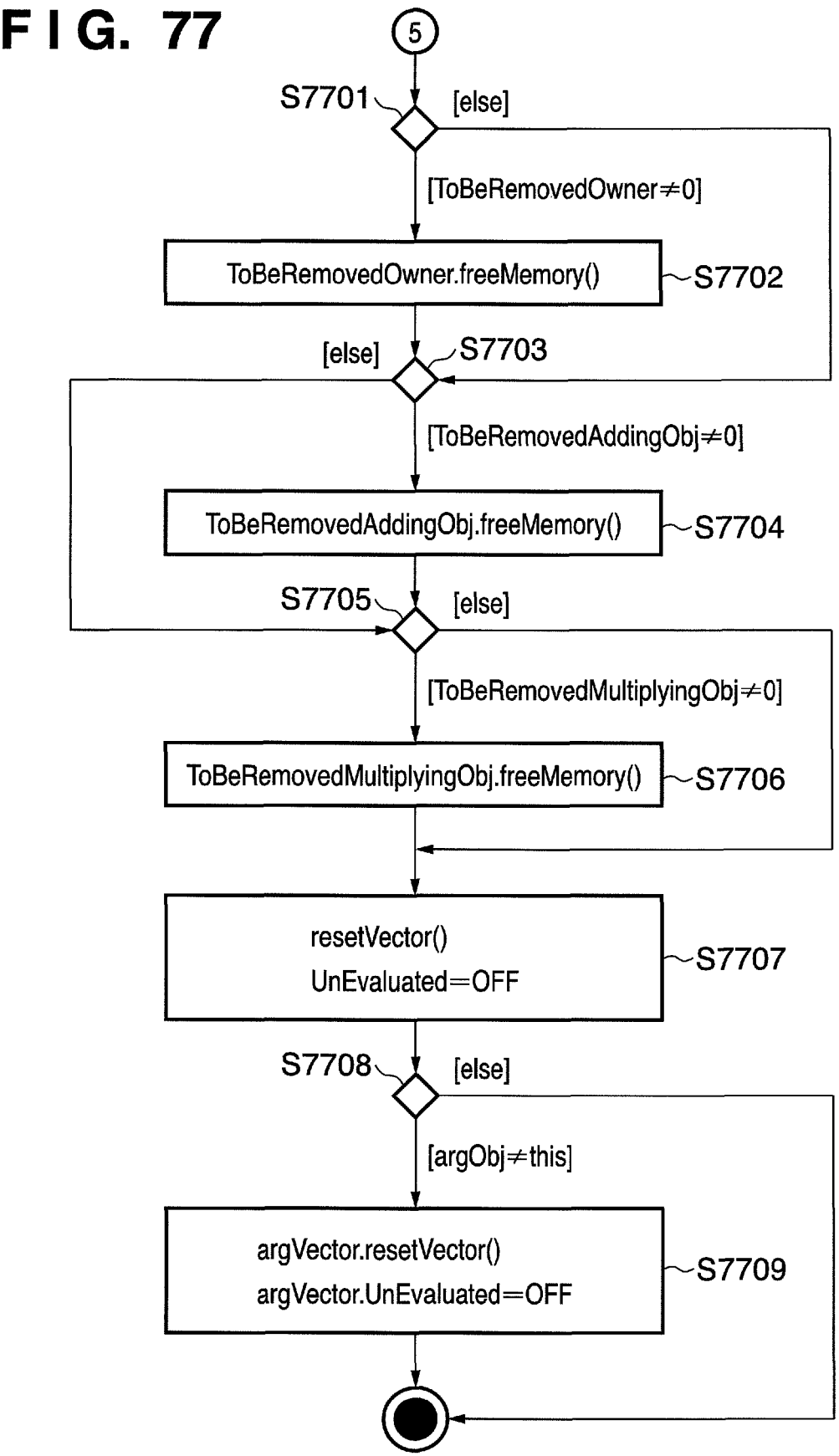
FIG. 77 shows processing to be executed by the method evaluate of Vector class having a reference to a Vector object as an argument.
Figure 78:
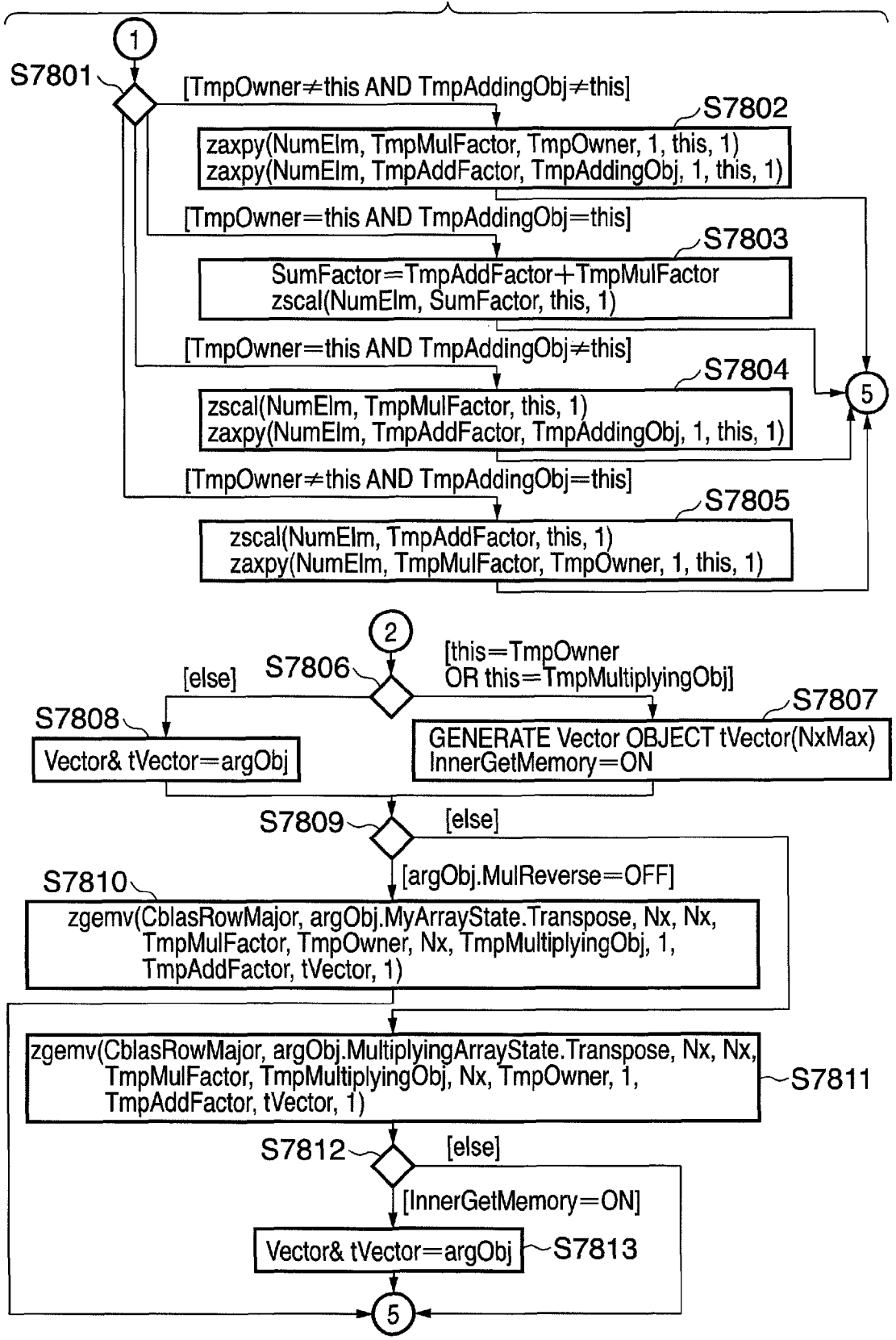
FIG. 78 shows processing to be executed by the method evaluate of Vector class having a reference to a Vector object as an argument.
Figure 79:
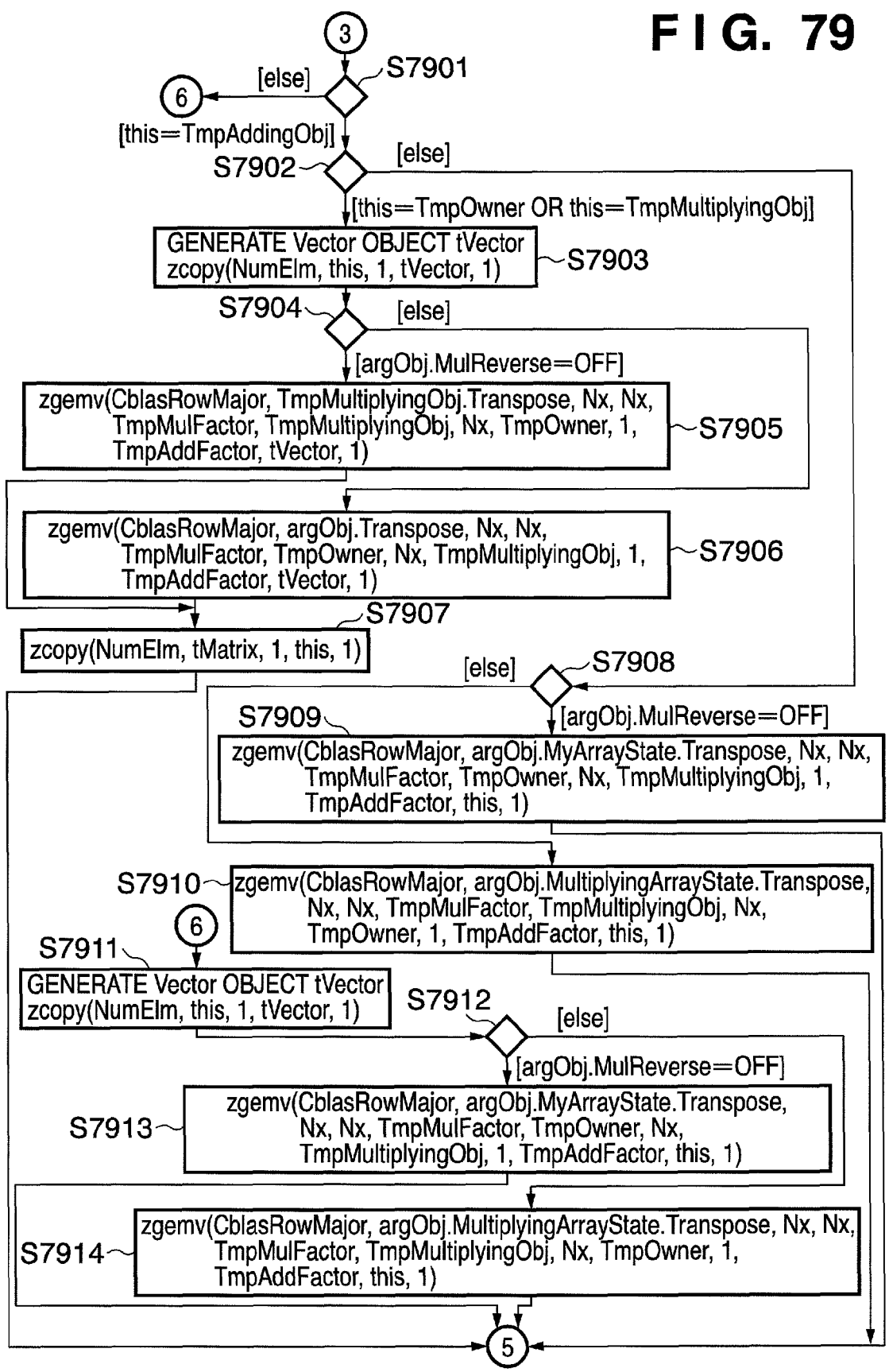
FIG. 79 shows processing to be executed by the method evaluate of Vector class having a reference to a Vector object as an argument.
Figure 80:
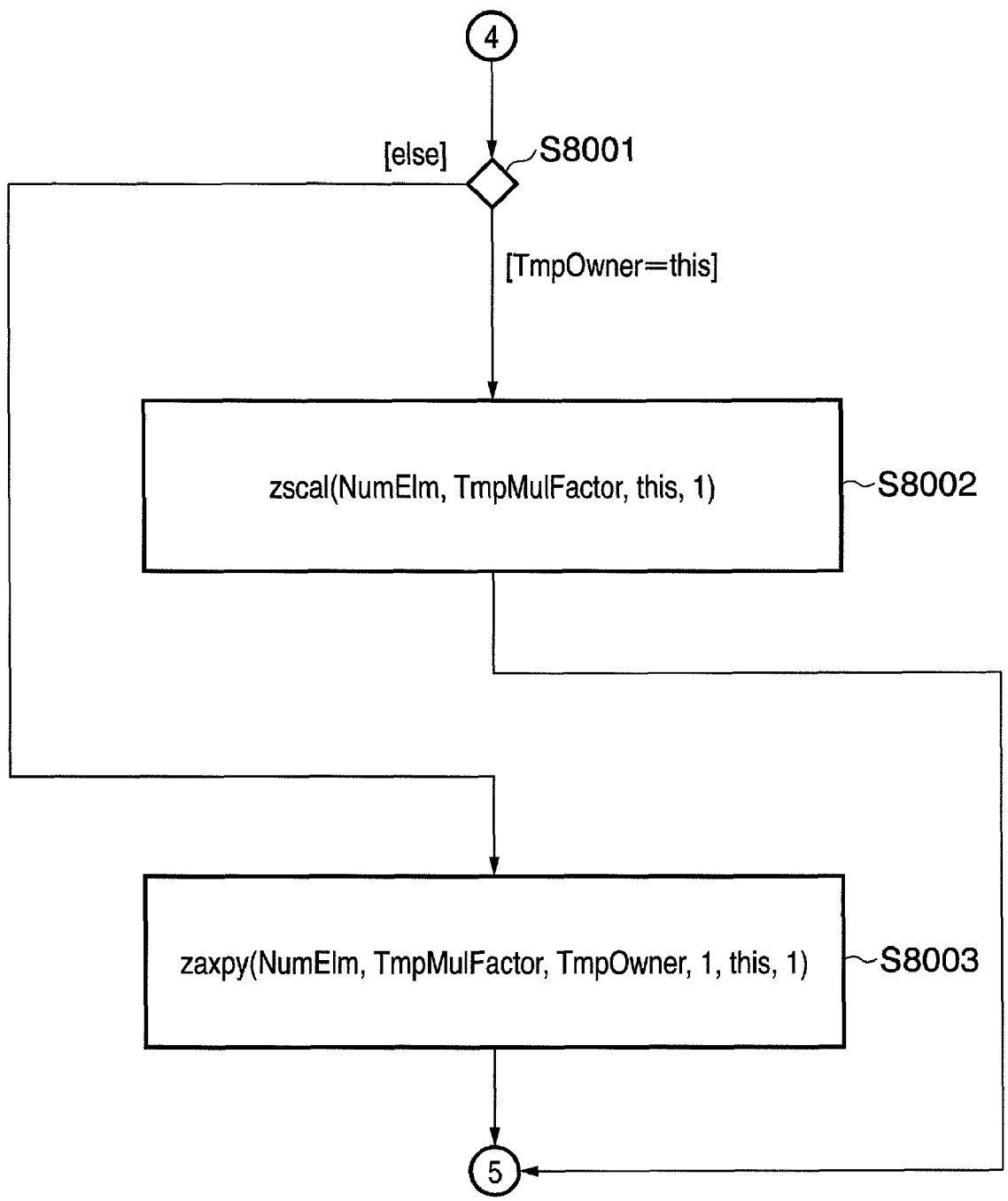
FIG. 80 shows processing to be executed by the method evaluate of Vector class having a reference to a Vector object as an argument.

FIG. 75 is an activity diagram of a method Dot used to calculate an inner product of Vector objects. Arguments of this method are references, LeftVector and RightVector, to two Vector objects.

If UnEvaluated of LeftVector is ON in step S7501, the process advances to step S7502; otherwise, the process advances to step S7503. In step S7502, the method evaluate is executed from LeftVector. If UnEvaluated of RightVector is ON in step S7503, the process advances to step S7504; otherwise, the process jumps to step S7505.

In step S7504, the method evaluate is executed from RightVector. In step S7505, a BLAS function zdotu_sum is executed with arguments (NumElm, LeftVector, 1, RightVector, 1, ReturnValue), and the process returns with a return value ReturnValue.

FIGS. 76 to 80 are activity diagrams of the method evaluate used to execute the postponed calculation of a Vector object. An argument of this method is a reference argObj to a Vector object.

In step S7601, "0" is set in ToBeRemovedOwner, "0" is set in ToBeRemovedAddingObj, and "0" is set in ToBeRemovedMultiplyingObj. Note that ToBeRemovedOwner, ToBeRemovedAddingObj, and ToBeRemovedMultiplyingObj are references to Array objects. Also, MulFactor of argObj is set in a Complex object TmpMulFactor, AddFactor of argObj is set in a Complex object TmpAddFactor, and Owner of argObj is set in a reference TmpOwner to an Array object. Furthermore, AddingObj of argObj is set in a reference TmpAddingObj to an Array object, and MultiplyingObj of argObj is set in a reference TmpMultiplyingObj to an Array object.

If TmpOwner of the object argObj is not "0" and a TemporalOwner value of TmpOwner of argObj is ON in step S7602, the process advances to step S7603; otherwise, the process jumps to step S7604. In step S7603, TmpOwner of argObj is set in ToBeRemovedOwner. If TmpAddingObj of argObj is not "0" and the TemporalOwner value of TmpAddingObj of argObj is ON in step S7604, the process advances to step S7605; otherwise, the process jumps to step S7606.

In step S7605, TmpAddingObj of argObj is set in ToBeRemovedAddingObj. If TmpMultiplyingObj of argObj is not "0" and the TemporalOwner value of TmpMultiplyingObj of argObj is ON in step S7606, the process advances to step S7607; otherwise, the process jumps to step S7608.

In step S7607, TmpMultiplyingObj of argObj is set in ToBeRemovedMultiplyingObj. In step S7608, the method getEvaluationType is called from argObj to set its return value in eval_type. If the self object (this) matches argObj in step S7609, the process advances to step S7610; otherwise, the process advances to step S7614.

If a return value of the method isOwner is false in step S7610, the process advances to step S7611; otherwise, the process jumps to step S7618. If Owner≠0 in step S7611, the process advances to step S7612; if Owner=0, the process jumps to step S7613. In step S7612, the method resetOwner is executed. In step S7613, the method get memory is executed, and the flag IsCleared is set to ON.

If the return value of the method isOwner is false in step S7614, the process advances to step S7615; otherwise, the process advances to step S7618. If Owner≠0 in step S7615, the process advances to step S7616; if Owner=0, the process jumps to step S7617. In step S7616, the method resetOwner is executed. In step S7617, the method getMemory is executed, the flag IsCleared is set to ON, and TemporalOwner is set to ON.

If eval_type is a value ArrL_Add_ArrR in step S7618, the process advances to step S7801; if eval_type is a value MatA_Mul_VecX, the process advances to step S7806; if eval_type is a value MatA_Mul_VecX_Add_VecY, the process advances to step S7901; or if eval_type is a value EvaluationNormal, the process advances to step S8001.

If ToBeRemovedOwner≠0 in step S7701, the process advances to step S7702; otherwise, the process jumps to step S7703. In step S7702, the method freeMemory is executed from the object ToBeRemovedOwner. If ToBeRemovedAddingObj≠0 in step S7703, the process advances to step S7704; if ToBeRemovedAddingObj=0, the process jumps to step S7705.

In step S7704, the method freeMemory is executed from ToBeRemovedAddingObj. If ToBeRemovedMultiplyingObj≠0 in step S7705, the process advances to step S7706; if ToBeRemovedMultiplyingObj=0, the process jumps to step S7707. In step S7706, the method freeMemory is executed from ToBeRemovedMultiplyingObj.

By releasing the memory in this way, even when a mathematical expression becomes long, a memory area used to store array elements is prevented from exceeding a given size. Note that a temporary object cannot be deleted at this timing in case of C++. This is because deletion of a temporal object is executed by a compiler at the last position (immediately before semicolon) of the mathematical expression.

In step S7707, a method resetVector is executed, and OFF is then set in UnEvaluated. If argObj≠this in step S7708, the process advances to step S7709; otherwise, the process ends. In step S7709, the method resetVector is executed from argObj, and UnEvaluated of argObj is set to OFF.

If TmpOwner≠this and TmpAddingObj≠this in step S7801, the process advances to step S7802; if TmpOwner=this and TmpAddingObj=this, the process advances to step S7803. Also, if TmpOwner=this and TmpAddingObj≠this, the process advances to step S7804; if TmpOwner≠this and TmpAddingObj=this, the process advances to step S7805.

In step S7802, the BLAS function zaxpy is called with arguments (NumElm, TmpMulFactor, TmpOwner, . . . 1, . . . this, . . . 1), and the BLAS function zaxpy is called with arguments (NumElm, TmpAddFactor, TmpAddingObj, 1, . . . this, . . . 1).

In step S7803, the sum of TmpAddFactor and TmpMulFactor is set in a Complex object SumFactor, and the BLAS function zscal is called with arguments (NumElm, SumFactor, . . . this, 1).

In step S7804, the BLAS function zscal is called with arguments (NumElm, TmpMulFactor, . . . this, 1), and the BLAS function zaxpy is called with arguments (NumElm, TmpAddFactor, TmpAddingObj, . . . 1, . . . this, . . . 1).

In step S7805, the BLAS function zscal is called with arguments (NumElm, TmpAddFactor, . . . this, 1), and the BLAS function zaxpy is called with arguments (NumElm, TmpMulFactor, TmpOwner, . . . 1, . . . this, . . . 1).

The reason why some processes are separately executed is that when the self object (this), TmpAddingObj, and TmpOwner are identical objects, it is generally faster to calculate the coefficient SumFactor and to multiply respective array elements of the self object by SumFactor than to add respective elements of two objects.

If this=TmpAddingObj or TmpMultiplyingObj in step S7806, the process advances to step S7807; otherwise, the process advances to step S7808. In step S7807, a Vector object tVector is generated by a constructor with an argument BaseObj. In step S7808, tVector is defined as a reference of argObj.

If MulReverse of argObj is OFF in step S7809, the process advances to step S7810; otherwise, the process advances to step S7811.

In step S7810, a BLAS function zgemv is called with arguments (CblasRowMajor, argObj.MyArrayState.Transpose, Nx, Nx, TmpMulFactor, TmpOwner, Nx, TmpMultiplyingObj, Nx, TmpAddFactor, tVector, 1).

In step S7811, the BLAS function zgemv is called with arguments (CblasRowMajor, argObj.MultiplyingArrayState.Transpose, Nx, Nx, TmpMulFactor, TmpMultiplyingObj, Nx, TmpOwner, 1, TmpAddFactor, tVector, 1).

If this=TmpAddingObj in step S7901, the process returns to step S7701; otherwise, the process advances to step S7902. If this=TmpOwner or this=TmpMultiplyingObj in step S7902, the process advances to step S7903; otherwise, the process jumps to step S7908.

In step S7903, a Vector object tVector is generated by a default constructor, and the BLAS function zcopy is called with arguments (NumElm, this, 1, tVector, 1). If MulReverse of argObj is OFF in step S7904, the process advances to step S7905; otherwise, the process jumps to step S7906.

In step S7905, the BLAS function zgemv is called with arguments (CblasRowMajor, argObj.MultiplyingArrayState.Transpose, Nx, Nx, TmpMulFactor, TmpMultiplyingObj, Nx, TmpOwner, 1, TmpAddFactor, tVector, 1).

In step S7906, the BLAS function zgemv is called with arguments (CblasRowMajor, argObj.MyArrayState.Transpose, Nx, Nx, TmpMulFactor, TmpOwner, Nx, TmpMultiplyingObj, 1, TmpAddFactor, tVector, 1).

In step S7907, the BLAS function zcopy is called with arguments (NumElm, tVector, 1, this, 1), and the process returns to step S7701. If MulReverse of argObj is OFF in step S7908, the process advances to step S7909; otherwise, the process advances to step S7910.

In step S7909, the BLAS function zgemv is called with arguments (CblasRowMajor, argObj.MyArrayState.Transpose, Nx, Nx, TmpMulFactor, TmpOwner, Nx, TmpMultiplyingObj, 1, TmpAddFactor, this, 1), and the process returns to step S7701.

In step S7910, the BLAS function zgemv is called with arguments (CblasRowMajor, argObj.MultiplyingArray- State.Transpose, Nx, Nx, TmpMulFactor, TmpMultiplyingObj, Nx, TmpOwner, 1, TmpAddFactor, this, 1), and the process returns to step S7701.

In step S7911, a Vector object tVector is generated by a default constructor, and the BLAS function zcopy is called with arguments (NumElm, this, 1, tVector, 1). If MulReverse of argObj is OFF in step S7912, the process advances to step S7913; otherwise, the process jumps to step S7914.

In step S7913, the BLAS function zgemv is called with arguments (CblasRowMajor, argObj.MyArrayState.Transpose, Nx, Nx, TmpMulFactor, TmpOwner, Nx, TmpMultiplyingObj, 1, TmpAddFactor, this, 1), and the process returns to step S7701.

In step S7914, the BLAS function zgemv is called with arguments (CblasRowMajor, argObj.MultiplyingArrayState.Transpose, Nx, Nx, TmpMulFactor, TmpMultiplyingObj, Nx, TmpOwner, 1, TmpAddFactor, this, 1), and the process returns to step S7701.

If TmpOwner=this in step S8001, the process advances to step S8002; otherwise, the process jumps to step S8003. In step S8002, the BLAS function zscal is called with arguments (NumElm, TmpMulFactor, this, 1). In step S8003, the BLAS function zaxpy is called with arguments (NumElm, TmpMulFactor, TmpOwner, 1, this, 1).

Figure 81:
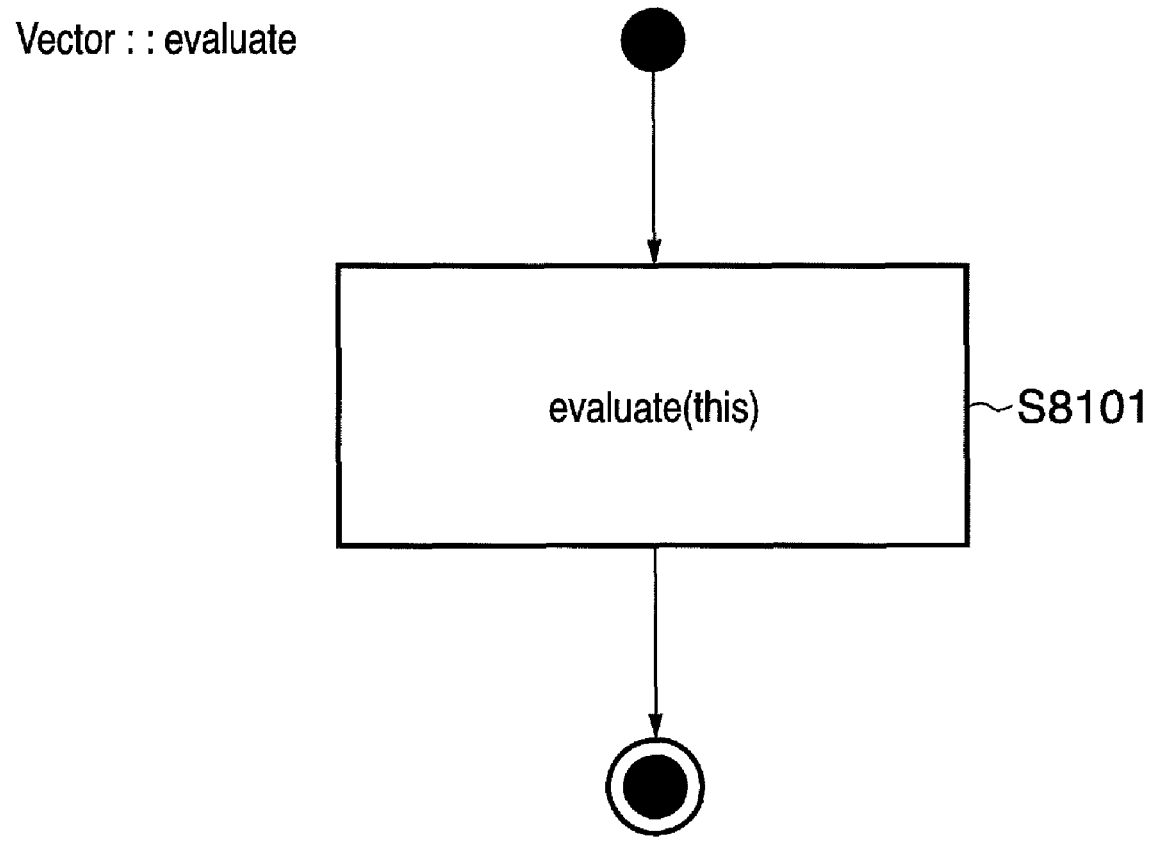
FIG. 81 shows processing to be executed by the method evaluate of Vector class without any argument.

FIG. 81 is an activity diagram of the method evaluate without any argument so as to complete the postponed operation of a Vector object. In step S8101, the method evaluate is executed with an argument this.

According to the embodiment described above, in a product operation between a Complex object m and Matrix object, the product operation between the Complex object m and member variables of a Complex object that the Matrix object has is executed. In a product operation and sum operation between Matrix objects, the objects are associated to postpone actual operations, and calculations are executed together upon execution of substitute operations.

In this manner, linear algebra operations exploiting operator overloading based on the object-oriented programming language can be executed at high speed.

Note that the present invention may be applied to either a system constituted by a plurality of devices or an apparatus including one device.

Also, the objects of the present invention can be achieved when a computer of a system or apparatus which receives a storage medium that records a program code of software for implementing the functions of the above embodiments reads out and executes that program code.

In this case, the program code itself read out from the storage medium implements the functions of the above embodiments, and the storage medium that stores the program code constitutes the present invention. Also, the present invention includes a case in which an operating system or the like that runs on a computer executes some or all of actual processes based on instructions of the program code read out by the computer, and the functions of the aforementioned embodiment are implemented by these processes.

Furthermore, the program code read out from the storage medium may be written in a memory equipped on a function expansion card or function expansion unit, which is inserted in or is connected to the computer in some cases. The present invention also includes a case in which the functions of the above embodiments are implemented when a CPU or the like equipped on the function expansion card or unit executed some or all of actual processes.

According to the present invention, algebra operations based on the object-oriented programming language can be executed at high speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2006-161031 filed on Jun. 9, 2006, which is hereby incorporated by reference herein in its entirety.

What is claimed is:

1. An algebra operation method performed by a computer, the method comprising the steps of:
    converting algebra operations for a plurality of objects which appear in a program into an algebra operation sequence object described using object access data used to access the plurality of objects and object state data used to store states associated with the plurality of objects without immediately evaluating the algebra operations;
    determining a function to be applied to the algebra operation sequence object; and
    evaluating the algebra operations by executing the function by designating an argument group required for the function in response to a call of a substitute operator,
    wherein, when the algebra operations cannot be converted into one algebra operation sequence object in the converting step, operations for objects as left operands or right operands of operators in the algebra operations are executed, and the converting step is then executed,
    wherein the object access data has a reference to an array object which includes an array memory area, a reference to a multiplying object, and a reference to an adding object, and
    wherein the object state data has a complex number object group including a complex number object for a product operation required to execute a product operation with a self object and a complex number object for a sum operation required to execute a sum operation with the adding object, a flag group indicating an algebraic state of the self object, a flag group indicating an algebraic state of another object, and a flag group indicating a calculation state of the self object.

2. The method according to claim 1, wherein the flag group indicating the algebraic state of the self object has a Hermitian conjugate flag indicating whether or not an object of interest is a Hermitian conjugate, and a product operation order flag indicating, when there is a multiplying object of the object of interest, whether the self object applies to the object of interest from the left side or the right side.

3. The method according to claim 2, wherein the converting step includes the step of
    generating a copy of an object by copying the object access data and the object state data;
    inverting a Hermitian conjugate flag of the generated object,
    inverting, when a reference to the multiplying object of the self object is set, the product operation order flag of the self object,
    converting the complex number object for the product operation into a complex conjugate,
    inverting a Hermitian conjugate flag of the multiplying object of the self object,
    converting, when a reference to the adding object of the self object is set, the complex number object for the sum operation into a complex conjugate,
    inverting a Hermitian conjugate flag of the adding object of the self object, and
    setting the unevaluated flag to ON.

4. The method according to claim 2, wherein in the evaluating step, when the product operation order flag is OFF, the function is executed to set an argument so that the self object is a left side of a product operation, and the multiplying object is a right side of the product operation, and when the product operation order flag is ON, the function is executed to set an argument so that self object is a right side of a product operation, and the multiplying object is a left side of the product operation.

5. The method according to claim 1, wherein the flag group indicating the calculation state of the self object has a temporal object flag indicating whether or not the self object is an object that temporarily includes an array memory area, and an unevaluated flag indicating whether or not evaluation is incomplete.

6. The method according to claim 5, further comprising the steps of:
setting, when an object to be evaluated is the self object after execution of evaluation in the evaluating step, the temporal object flag of the self object to ON; and
checking the temporal object flag of one of the multiplying object, the adding object, and the array object, and releasing, when the flag is ON, the array memory area of the self object.

7. The method according to claim 1, wherein the converting step includes a copying step of copying the object access data and the object state data.

8. The method according to claim 7, wherein the converting step includes the step of
performing a product operation of the complex number object for a product operation of the object state data generated in the copying step and another complex number object,
storing the product operation result in the complex number object for the product operation,
performing a sum operation of the complex number object for a sum operation of the generated object state data and another complex number object,
storing the sum operation result in the complex number object for the sum operation, and
setting the unevaluated flag to ON.

9. The method according to claim 7, wherein the converting step includes the step of
generating a copy of one of two objects as operands of a binary operator in the copying step,
setting the other object in a reference to a multiplying object of the generated object,
performing a product operation of a complex number object for a product operation of the generated object with a complex number object for a product operation of the other object,
storing the result in the complex number object for the product operation of the generated object,
storing a flag group indicating an algebraic state of the multiplying object in a flag group indicating an algebraic state of the multiplying object of the self object, and
setting the unevaluated flag to ON.

10. The method according to claim 7, wherein the converting step includes the step of
generating a copy of one of two objects as operands of a binary operator in the copying step,
setting the other object in a reference to an adding object of the generated object,
storing a complex number object for a sum operation of the other object in a complex number object for a sum operation of the generated object,
storing a flag group indicating a state of the adding object in a flag group indicating an algebraic state of the adding object of the self object, and
setting the unevaluated flag to ON.

11. An algebra operation apparatus comprising:
a storage unit configured to store object access data required to access a plurality of objects, and object state data required to store states associated with the plurality of objects;
a conversion unit configured to convert algebra operations for the plurality of objects which appear in a program into an algebra operation sequence object described using the object access data and the object state data without immediately evaluating the algebra operations;
a function determination unit configured to determine a function to be applied to the algebra operation sequence object; and
an evaluation unit configured to evaluate the algebra operations by executing the function by designating an argument group required for the function in response to a call of a substitute operator,
wherein, when the conversion unit cannot convert the algebra operations into one algebra operation sequence object, operations for objects as left operands or right operands of operators in the algebra operations are executed, and the conversion unit converts the algebra operations into one algebra operation sequence object,
wherein the object access data has a reference to an array object which includes an array memory area, a reference to a multiplying object, and a reference to an adding object, and
wherein the object state data has a complex number object group including a complex number object for a product operation required to execute a product operation with a self object and a complex number object for a sum operation required to execute a sum operation with the adding object, a flag group indicating an algebraic state of the self object, a flag group indicating an algebraic state of another object, and a flag group indicating a calculation state of the self object.

12. A non-transitory computer-readable storage medium storing a program for causing a computer to execute an algebra operation method, said method comprising the steps of:
converting algebra operations for a plurality of objects which appear in a program into an algebra operation sequence object described using object access data used to access the plurality of objects and object state data used to store states associated with the plurality of objects without immediately evaluating the algebra operations;
determining a function to be applied to the algebra operation sequence object; and evaluating the algebra operations by executing the function by designating an argument group required for the function in response to a call of a substitute operator,
wherein, when the algebra operations cannot be converted into one algebra operation sequence object in the converting step, operations for objects as left operands or right operands of operators in the algebra operations are executed, and the converting step is then executed,
wherein the object access data has a reference to an array object which includes an array memory area, a reference to a multiplying object, and a reference to an adding object, and
wherein the object state data has a complex number object group including a complex number object for a product operation required to execute a product operation with a self object and a complex number object for a sum operation required to execute a sum operation with the adding object, a flag group indicating an algebraic state of the self object, a flag group indicating an algebraic state of another object, and a flag group indicating a calculation state of the self object.

* * * * *